United States Patent [19]

Chadima, Jr. et al.

[11] Patent Number: 4,894,523

[45] Date of Patent: Jan. 16, 1990

[54] INSTANT PORTABLE BAR CODE READER

[75] Inventors: George E. Chadima, Jr., Cedar Rapids, Iowa; Vadim Laser, Cincinnati, Ohio

[73] Assignee: Norand Corporation, Cedar Rapids, Iowa

[21] Appl. No.: 339,953

[22] Filed: Apr. 18, 1989

Related U.S. Application Data

[60] Continuation of Ser. No. 234,880, Aug. 19, 1988, said Ser. No. 234,880, is a division of Ser. No. 827,286, Feb. 7, 1986, Pat. No. 4,766,300, said Ser. No. 827,286, is a continuation of Ser. No. 637,693, Aug. 6, 1984, Pat. No. 4,570,057, said Ser. No. 637,693, is a continuation of Ser. No. 334,811, Dec. 28, 1981, abandoned.

[51] Int. Cl.[4] .................... G06K 7/10

[52] U.S. Cl. .................... 235/472; 235/455; 235/462

[58] Field of Search .................... 235/472, 455, 462

[56] References Cited

U.S. PATENT DOCUMENTS

| | | | |
|---|---|---|---|
| 4,072,859 | 2/1978 | McWaters | 250/214 R |
| 4,114,030 | 9/1978 | Nojiri et al. | 235/464 |
| 4,140,271 | 2/1979 | Nojiri et al. | 235/440 |
| 4,143,809 | 3/1979 | Uebbing et al. . | |
| 4,210,802 | 7/1980 | Sakai | 235/483 |
| 4,250,526 | 2/1981 | Fuwa et al. . | |
| 4,251,798 | 2/1981 | Swartz et al. . | |
| 4,282,425 | 8/1981 | Chadima, Jr. et al. . | |
| 4,570,057 | 2/1986 | Chadima, Jr. et al. | 235/472 |
| 4,766,300 | 8/1988 | Chadima | 235/472 |

FOREIGN PATENT DOCUMENTS

| | | |
|---|---|---|
| 024543 | 2/1979 | Japan . |
| 120330 | 8/1979 | Japan . |

OTHER PUBLICATIONS

Patent Abstracts of Japan, 1977, p. 76 E 105, the abstract of JP 54 024 543.

Grabowski et al, "Code Reading Mechanical Scanning Gun"; IBM Technical Disclosure Bulletin, vol. 5, No. 5, Oct. 1962, p. 78.

Burke, "High-Performance Optical Sensing System for Reading Bar Code", IBM Technical Disclosure Bulletin, vol. 17, No. 3, Aug. 1974, p. 694.

*Primary Examiner*—Harold I. Pitts

*Attorney, Agent, or Firm*—Neuman, Williams, Anderson & Olson

[57] ABSTRACT

In an exemplary embodiment, a hand-held bar code reader has an elongated relatively narrow hand grip portion and an enlarged reader head portion with an extended window of greater width than the hand grip portion. Light energy is directed outwardly through the extended window so as to flood a bar code sensing region in front of the window having a depth dimension of at least about ten millimeters, and an optical system focuses bar code patterns in the sensing region onto an image plane in the reader unit with a resolution so as to read bars/spaces with a minimum width of about 0.0075 inch, or even less. Preferably the lens system provides a depth of focus for such bar code patterns of at least ten millimeters, so that a bar code pattern of marked curvature can be read in its entirety by means of an instant reading operation.

20 Claims, 7 Drawing Sheets

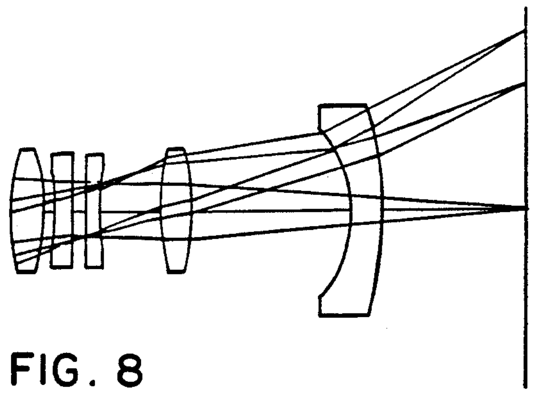
FIG. 8
FIG. 9
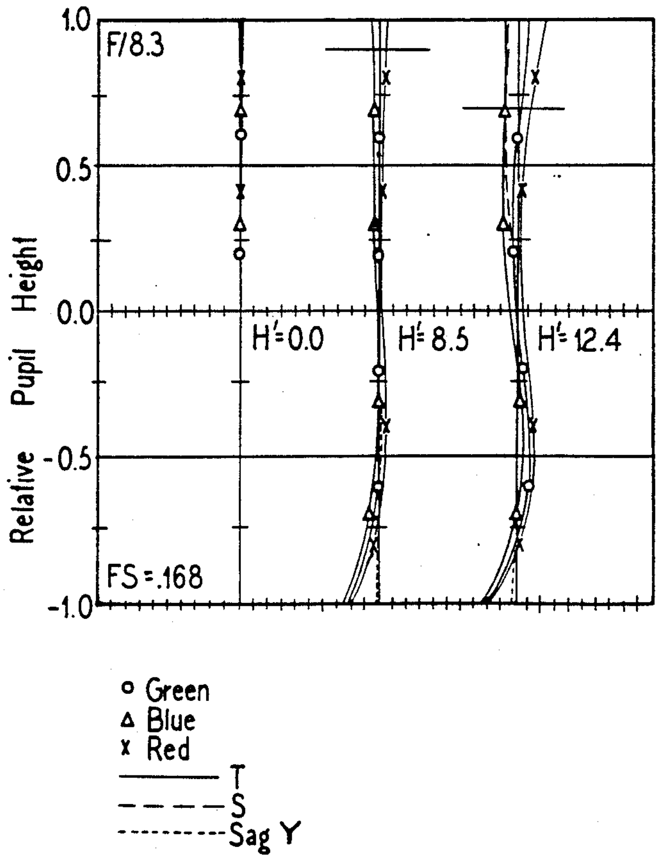

INSTANT PORTABLE BAR CODE READER

CROSS-REFERENCE TO RELATED APPLICATIONS

This is a continuation of our pending application Ser. No. 07/234,880 filed Aug. 19, 1988. Said application Ser. No. 07/234,880 is in turn a division of our application Ser. No. 06/827,286 filed Feb. 7, 1986, now U.S. Pat. No. 4,766,300 issued Aug. 23, 1988. Said application Ser. No. 06/827,286 is a continuation of our prior application U.S. Ser. No. 06/637,693 filed Aug. 6, 1984, now U.S. Pat. No. 4,570,057 issued Feb. 11, 1986. Said application Ser. No. 06/637,693 is in turn a continuation of our earlier application Ser. No. 06/334,811 filed Dec. 28, 1981, now abandoned.

Reference is also made to a divisional application of U.S. Ser. No. 07/234,880, namely Ser. No. 07/325,177 filed Mar. 17, 1989.

BACKGROUND OF THE INVENTION

The present application is particularly directed to improvements in the invention of our U.S. Pat. No. 4,282,425 issued Aug. 4, 1981. The disclosure of said patent is incorporated herein by reference, particularly for purposes of background information.

SUMMARY OF THE INVENTION

The present invention, in one important aspect, is directed to the provision of a particularly facile and effective hand held reader unit for the instantaneous reading of complete bar code patterns of curved or irregular configuration, and comprising an optical system which accomodates itself to a compact and rugged, yet lightweight construction capable of economical manufacture.

In another aspect, the invention provides a high speed bar code reader system and method which is capable of reading a complete bar code pattern as an entity for computer processing without requiring the reader unit to be moved during the read-in operation; such system and method being further optimized by the provision of a flash illuminator of special configuration for providing a particularly uniform obliquely directed light output over the full depth of the optical field of the reader lens system, and by the provision of a lens system which is adjusted in its spectral response and stop aperture characteristics so as to achieve a high resolution and accuracy over a sufficient depth of field to read high density bar patterns with marked curvature or surface irregularity.

It is therefore an important object of the invention to provide a portable instant bar code reader and method providing improved optical characteristics.

Another object resides in the provision of a bar code reader system and method exhibiting an improved flash type illuminator.

It is also an object of the invention to provide a portable instant bar code reader system and method wherein the optical and electronic construction are interrelated so as to provide for quick-repeat, more accurately focussed reading where an initial reading is ineffective because of marginal reading conditions or the like.

Still another object resides in the provision of a hand held bar code scanner having novel electronic, optical and structural features adapted to the implementation of the various objects set forth above.

Features of the invention include the provision of a reader unit with a wide field of view and substantial focal depth, which yet has a narrow hand grip configuration, and a compact optical system, an optics system which accomodates a single unitary circuit board configuration, a rigid lens mounting arrangement which furthers the achievement of a precise and reliable optical system with a dust and moisture proof enclosure and substantial impact resistance; and an optical system providing an optical field of extended depth coupled with an optimum focus at a selected close up position and electronics for signalling an inaccurate reading and automatically repeating the read operation if necessary as the operator adjusts the unit toward the optimum reading position until a valid reading is achieved.

These and other features, objects and advantages of the present invention will be understood in greater detail from the drawings and the following description wherein reference numerals illustrate a preferred embodiment.

BRIEF DESCRIPTION OF THE DRAWINGS

FIG. 8 is a somewhat diagrammatic view illustrating the basic optics of the illustrated embodiment and showing the lens arrangement generally in the plane of FIG. 3;

FIG. 9 is a plot illustrating lateral aberrations for the system of FIGS. 1 through 8;

DETAILED DESCRIPTION

Figure 1:
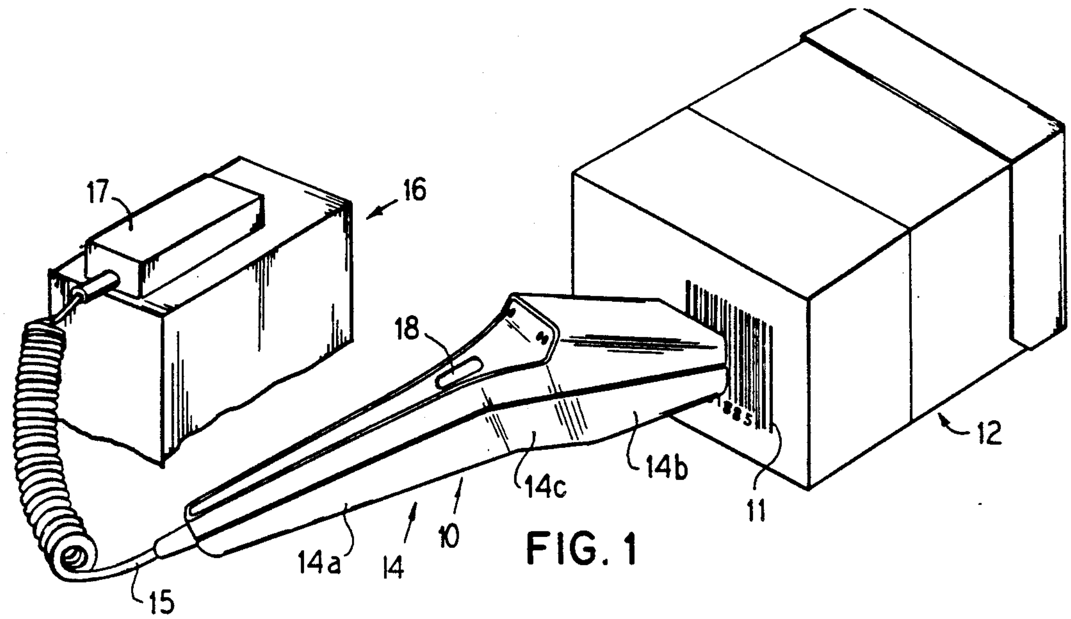
FIG. 1 is a somewhat diagrammatic perspective view illustrating a hand-held reader unit and associated components in operative reading association with a bar code pattern on a container.

Referring to FIG. 1 there is illustrated an overall bar code reader system in accordance with the present invention, and showing a hand-held reader unit 10 in scanning relation to a bar code pattern 11 associated with a product container 12. By way of example, the bar pattern 11 may be formed in accordance with the universal product code and may have a length of 65 millimeters. Various other bar code types are known in the art, such as EAN, CODBAR, CODE 39, INTER-LEAVED 2/5, etc.

The hand-held unit is shown as comprising a case 14 including a portion 14a of a size to be gripped by the user, a head portion 14b for containing the reading optics and a connecting portion 14c integrally connecting the hand-grip portion 14a with the optical reading head portion 14b. The head portion 14b has a width so as to be operative to receive a sufficient portion of the bar pattern 11 so as to completely read the same while the head portion 14b is in essentially stationary relationship to the bar pattern 11. Thus, the head portion 14b may have an overall width of 3.0 inches and may have an overall height dimension of one inch. On the other hand, the hand grip portion 14a may taper from an overall width of about one and one-half inches adjacent the intermediate portion 14c to a width of about 0.828 inch at its rear end. The height dimension of the hand grip portion 14a may likewise taper slightly from the intermediate portion toward the rear end portion, from a height dimension of about one and one-quarter inches to about three-quarter inches. The lower margins such as 14d of the hand grip portion 14a are smoothly rounded for example with a radius of curvature of 0.46 inch, the bottom wall of the hand grip portion 14a being formed on a radius of 5.00 inch in the transverse direction so as to enhance the comfort with which the hand grip portion can be grasped. The forward portion of the hand grip portion 14a has a perimeter such that the thumb and first finger of the hand are normally overlapping or touching during handling of the reader unit 10.

With the reader unit 10 resting on a horizontal surface, the intermediate portion 14c will have a separation of approximately three-eighth inch above the horizontal surface, while the top surface 14e of the head portion 14b will extend at a pronounced acute angle to he horizontal which facilitates observation of the bar code pattern as the unit 10 is placed in scanning relation thereto by the user. For example, with the unit 10 resting on a horizontal surface, the upper surface 14e of the head portion 14b may be inclined at an angle of 25° to the horizontal.

The length of the hand grip portion 14a may be about four inches so as to be comparable to the width of the hand when placed in comfortable gripping relation to the unit 10. The overall length of the head portion 14b with the unit 10 resting on a horizontal surface may be about two and one quarter inches measured in a horizontal direction.

A cable 15 is indicated as connecting the unit 10 with host equipment 16 via a suitable link or interface 17. For the case of portable equipment, unit 15 may include a battery, and link 17 may include a battery operated high voltage power supply as well as suitable signal interface circuitry. In this way the complete system of FIG. 1 may be completely portable, without requiring any connecting wires to stationary equipment.

The reader unit 10 may have a weight of eight ounces, an overall length of 7.38 inches, an overall width of 2.63 inches, and a thickness generally of one inch except at a raised section 14f at the rear end of the head portion 14b.

An important feature of the unit 10 of FIG. 1 relates to the provision of a hand-held reader configuration whereby the unit can be readily manipulated in all degrees of freedom and be held at a desired angular relationship to a product container or the like with the four fingers and palm of the hand while the thumb of the user is utilized to depress an operating button 18 located centrally of the top surface of the unit and at the forward end of the hand grip porton 14a. While with the illustrated embodiment a complete reading of the bar pattern 11 takes place in an extremely brief instant, a stable gripping of the hand-held unit during operation is still desirable for the sake of comfort and to minimize fatigue over an extended period of use.

While the bar code pattern 11 is shown on a flat planar surface, it is significant that the reader unit 10 is also effective with curved or irregularly shaped labels. Thus, the bar code pattern 11 may be read even though it extends along a curved surface having a radius of curvature of 1.25 inches, for example. Such a label with a 1.25 inch radius of curvature and with a length dimension of 1.8 inches requires reading of a field with a depth of about 0.4 inch, for example. Thus, certain portions of the bar code pattern 11 may be in direct contact with the operative end of the unit 10 while other portions of the bar code pattern may be spaced by distances of up to 0.4 inch. The illustrated unit is thus effective in reading bar code patterns applied about the curved perimeter of cylindrical containers such as cans, as well as bar code patterns applied to flexible bag type containers and the like.

Figure 2:
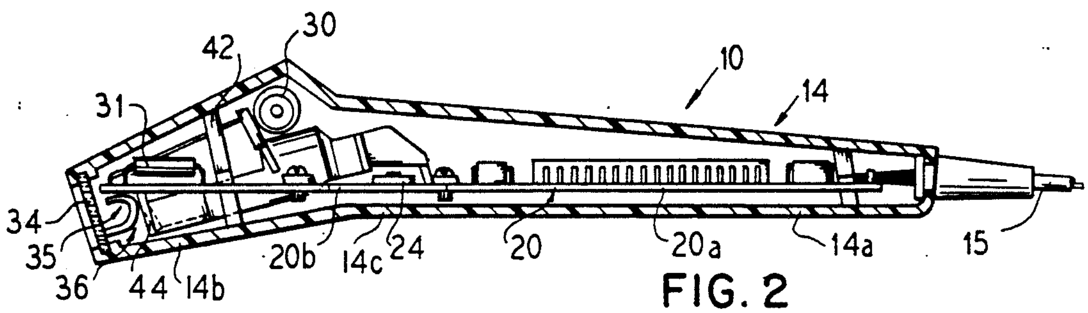
FIG. 2 is a somewhat diagrammatic longitudinal sectional view showing the general layout and configuration of the reader unit of FIG. 1.
Figure 3:
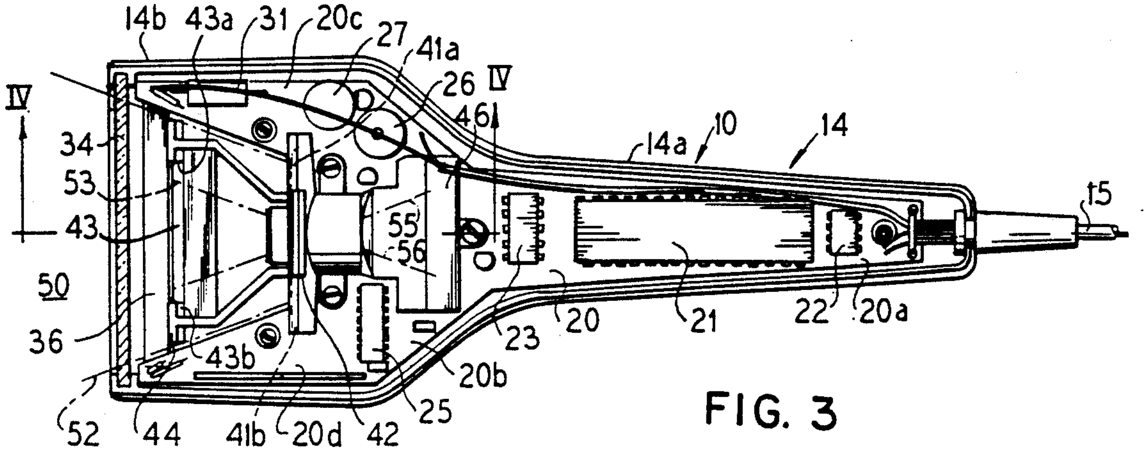
FIG. 3 is a somewhat diagrammatic plan view of the reader unit of FIG. 2 with a top casing part removed and internal components diagrammatically indicated.

Description of FIGS. 2 and 3

FIG. 2 is a longitudinal sectional view of the hand-held reader unit 10 of FIG. 1 illustrating the arrangement of parts therein; and FIG. 3 is a plan view of the reader unit 10 with an upper section of the case 14 removed to show the layout of parts internally of the unit. These views show a printed circuit board 20 having a rear section 20a with a microcomputer integrated circuit pack 21, a bidirectional line driver integrated circuit pack 22, and an analog switch integrated circuit pack 23, for example. Referring to FIG. 2, an intermediate portion 20b of the circuit board 20 carries centrally thereof a photodetector integrated circuit pack 24. As seen in FIG. 3, the intermediate portion 20b of the circuit board carries other components such as an operational amplifier pack 25, a "beeper" component 26 and a transformer 27. In FIG. 2 at a forward portion of the casing 14, a flash energy storage capacitor assembly is physically designated by reference numeral 30, and a triggering capacitor is indicated physically by reference numeral 31. As seen in FIG. 3, the forward portion of the circuit board 20 is separated into two finger portions 20c and 20d arranged at the lateral margins of the case portion 14b.

At the extreme forward end of the casing 14 is an optical window 34 which serves for the optical coupling of the unit 10 with a bar code pattern such as indicated at 11 in FIG. 1. Adjacent a lower portion of window 34 is a flash reflector 35 forming a part of a reading light source assembly 36, shown in furter detail in FIG. 4. The light source 36 serves to project a sheet of light through the window 34 for flooding a sensing region of substantial depth in front of the window 34, in which region the bar code pattern 11, FIG. 1, is to be located. The light reflected by a bar code pattern in the sensing region is reflected back through the window 34 so as to impinge on a first mirror 41 of a mirror assembly 42. Light incident upon the mirror 41 is reflected forwardly toward a second mirror 43 of a second mirror assembly 44. From the second mirror 43, light from the sensing region is directed rearwardly into an optical housing 46. The optical housing 46 together with the mirror mounts 42 and 44 are parts of a unitary optical framework which rigidly mounts all of the optical parts including mirrors 41 and 43 and the other optical components including an infrared rejecting filter 47. Further details of the optical system will be apparent from the following description of FIGS. 4–6.

Referring to FIGS. 2 and 3, the width dimension of the reflector 35 of light source 36 may be approximately 2.29 inches, so as to effectively illuminate a sensing region in front of the optical window 34 which may have an extent of about 2.5 inches directly in front of the optical window 34 and an extent of about 2.7 inches at a depth of one inch in front of the window 34. Thus, the total width of the image field may be taken as approximately 65 millimeters at a distance of approximately four millimeters from the center line of the optical window 34. Thus, as viewed in FIG. 3, the marginal rays of the light image entering the unit 10 through the window 34 from the sensing region and converging on the first mirror 41 may each form an angle of convergence relative to a central longitudinal axis of the optical system having a value in the range from about ten degrees to about twenty degrees. Thus, as viewed in FIG. 3, a sensing region 50 in front of the optical window 34 may be defined by marginal light, rays such as indicated at 51 and 52 which are directed through the optical window 34 and converge toward the respective lateral margins of the first mirror 41. The width of the sensing region 50 may be at least fifty millimeters, and the depth of the sensing region 50 may be at least about three millimeters, and preferably at least about ten millimeters. The optical system should be effective to focus the bar code pattern 11, FIG. 1, onto the photodetector 24 for positions within the sensing field 50 with a resolution of at least about forty line pairs per millimeter for an angle of convergence of each marginal ray 51, 52 of about fifteen degrees relative to the central longitudinal axis of the optics as viewed in FIG. 3. This corresponds to resolving bars having a width dimension in the direction of high resolution of about 125 microns (five mils, one mil equals 0.001 inch).

The first mirror 41 may have a length dimension of about 1.6 inches, while the second mirror 43 may have a length dimension of about 1.2 inches, for example. The lateral margins of the first mirror 41 are indicated at **41*a* and 41*b* in FIG. 3, while the lateral margins of the mirror 43 are indicated at 43*a* and 43*b* in FIG. 3. The marginal light rays as reflected from the mirror 43 toward the filter 47 are indicated at 53 and 54 in FIG. 3. The further margins of the light energy from the sensing region as it passes through the lenses of the optical system are indicated by the dash lines 55 and 56 in FIG. 3. As will be described particularly with reference to FIG. 6 hereafter, the light energy transmitted by the optical system is converged so as to pass through an aperture with a width in the high resolution direction of the bar code pattern 11 with a dimension of about two millimeters, for example, For the illustrated embodiment, the light energy from the sensing region 50 after passing through the narrow optical aperture within the housing 46, diverges over a substantial distance and comes to a focus at a light sensing region of the photodetector 24 having a dimension in the high resolution direction of 26 millimeters, for example, the image from the bar code region 50 being focused in inverted relation onto the light sensitive region of the photodetector 24**.

The infrared filter 47 may serve to essentially block infrared radiation having a wave length greater than about 700 nanometers. It is considered that better contrast is obtained by filtering the infrared portion of the light spectrum entering the window 34 from the sensing region 50. Further, it is considered that improved resolution is obtained over the desired depth of the sensing region 50 because of the presence of the infrared filter 47.

The optical window 34 may have a thickness of about 2.5 millimeters and be of a tempered glass material so as to be readily cleaned while resisting breakage. The image of the bar code pattern may be focused onto the light sensitive region of the photodetector 24 through a quartz window having a thickness of 0.5 millimeter and across an air gap of 1.14 millimeter, for example. Thus, the ratio of the length of the image at the bar code sensing region 50 to the length of the focussed image at the light sensitive region of the photodetector 24 may be about 2.5, for example.

Figure 4:
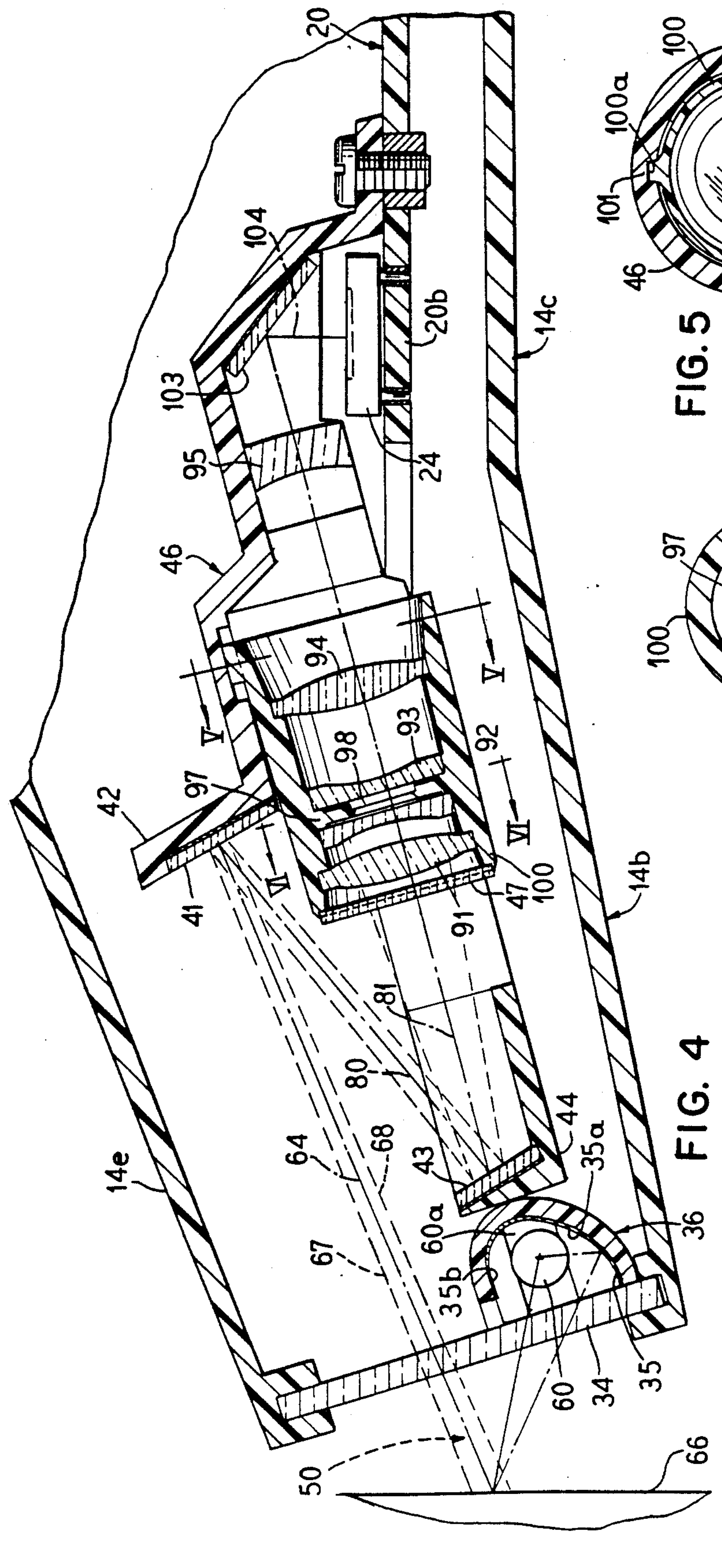
FIG. 4 is an enlarged partial somewhat diagrammatic view of the reader unit of FIG. 3, the section of FIG. 4 being taken along the lines IV—IV of FIG. 3.
Figure 5:
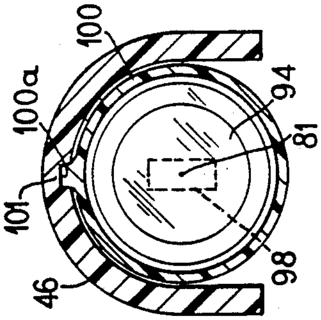
FIG. 5 is a somewhat diagrammatic, cross-sectional view taken along the line V—V of FIG. 4.
Figure 6:
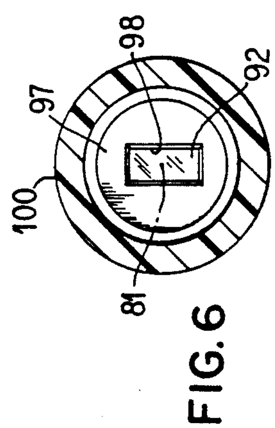
FIG. 6 is a somewhat diagrammatic, cross-sectional view taken along the line VI—VI in FIG. 4.

Description of FIGS. 4, 5 and 6

FIG. 4 is a partial enlarged longitudinal sectional view of the reader unit 10, taken along the lines IV—IV of FIG. 3.

From FIG. 4 it will be seen that light source 36 includes a flash tube 60 which extends for the length of the light source assembly 36. For example, flash tube 60 may have an overall length of 68 millimeters, and may have right angle end portions such as indicated at **60*a* extending rearwardly from the assembly 36 through slots such as indicated at 61. The tube 60 may have a diameter of four millimeters and may have its center located at a focus of an eliptical portion 35*a* of reflector 35. Thus, a light ray such as indicated at 62 emitted from the center of the tube 60 will be reflected at the eliptical portion 35*a* and impinge in the bar code sensing region 50 at a point 63 representing a second focal point with respect to the eliptical configuration of reflector portion 35*a*. Point 63 is illustrated as lying on an optical axis 64 which intersects the first mirror 41 at a central point. Line 66 in FIG. 4 may represent a surface of a container such as 12 containing a bar code pattern such as indicated at 11 in FIG. 1. Marginal rays of light reflected from the surface 66 in the plane of FIG. 4 are indicated at 67 and 68**, for example.

The eliptical portion **35*a* has an axis such as indicated at 70 which in inclined relative to a normal to the surface of window 34 by an acute angle such as 21°. Thus, light reflected from the eliptical portion 35*a* is generally directed upwardly and obliquely to the central optical axis 64**.

Light directed away from the eliptical portion **35*a* from the center of tube 60 impinges on a segmental cylindrical portion 35*b* which serves to redirect the light onto the eliptical portion 35*a*, again for further reflection in a generally upward direction and obliquely to the central axis 64**.

The direct light from tube 60 which penetrates the sensing region 50 is also directed generally upwardly and obliquely to the central optical axis 64.

The resultant direct and reflected light from tube 60 floods the sensing region 50 and defines a sheet of light directed into region 50 obliquely to the central optical axis 64.

As illustrated by dot dash line 80, mirror 41 reflects incoming light energy along an axis 80 from its front surface, and mirror 43 reflects light impinging thereon along a central axis 81 from its front surface.

The light energy directed along the axis 81 impinges on the infrared filter 47 in a substantially normal or perpendicular direction, and the transmitted light energy then traverses a lens system including lenses 91–95. Between lenses 92 and 93 there is provided a light stop member 97 providing a rectangular optical aperture 98. The aperture 98 has a width dimension extending in the high resolution direction of the optical image being transmitted which is substantially less than the vertical dimension corresponding to the direction of low resolution (parallel to the bars of the bar code pattern 11). By way of example, the horizontal dimension of the aperture 98 may be about two millimeters while the vertical dimension may be about four millimeters.

The lenses 91–94 are rigidly mounted by means of a lens barrel 100 having a key 100a fitting into a slot 101 of the optical housing 46. The light stop member 97 may be integral with this light barrel 100. Each of the lenses 91–94 may be symmetrical with respect to the central longitudinal axis 81 passing through the center of the rectangular aperture 98.

As seen at the right in FIG. 4, the optical axis 81 intersects a reflecting mirror 103 whose front surface is reflective so as to direct the light energy along an axis 104 normal or perpendicular to the light sensitive surface of the photodetector 24 which is mounted on the printed circuit board 20 at the intermediate region 20b.

Figure 7:
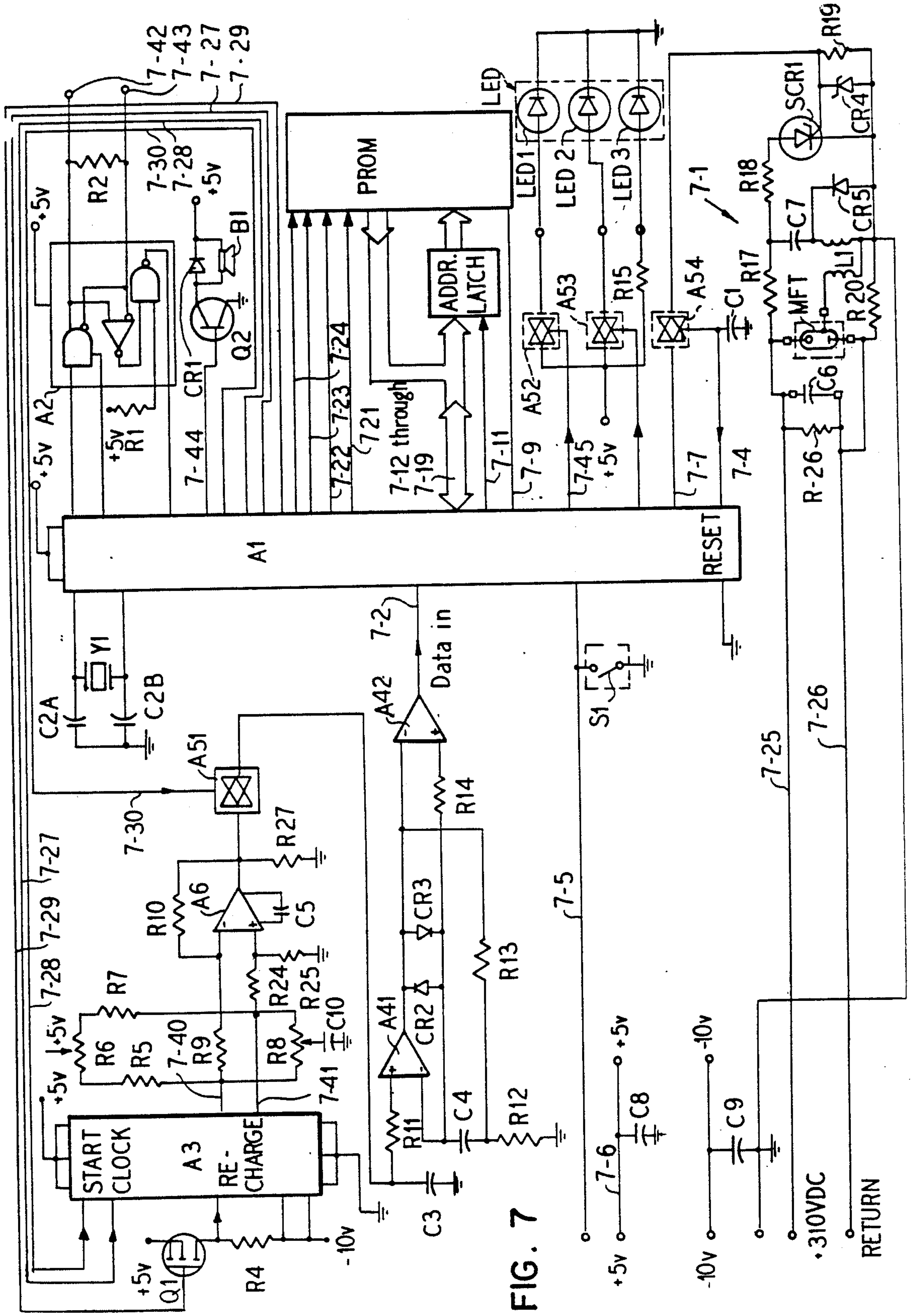
FIG. 7 is a diaagrammatic illustration showing exemplary details of a suitable electric circuit configuration for the system of FIGS. 1 through 6.

Description of FIG. 7

FIG. 7 is an overall diagrammatic view showing the electric circuitry which is housed within the portable hand-held unit itself. The following description applies to the operation of this circuitry whether it is associated with a portable battery operated terminal or with a fixed installation such as a cash register, computer port or the like.

The hand-held unit is placed near the bar code pattern to be read and the trigger switch actuator associated with switch S1, FIG. 7 is momentarily depressed. In response to such signal from switch S1 or a comparable proximity sensor, microprocessor A1 outputs a signal to the flash tube section indicated at 7-1 in the lower right portion of FIG. 7. The tube MFT flashes and the bar code image is reflected through an optical system to a 1024 element diode array line scanner indicated at A3 in the upper left of FIG. 7. This image is rapidly shifted out, filtered, amplified and squared up before passing to the "Data In" input 7-2 of the microprocessor A1.

The microprocessor A1 processes this input data, calculates bar spacing and widths and derives the bar code number. If the number is not valid, the microprocessor retriggers the flash tube MFT and repeats the reading process. The final valid number is serially shifted out of the microprocessor A1 and into the data device such as a Norand model 101 terminal, a cash register, a computer port or the like.

In point of sale (POS) applications, the microprocessor A1 is left on continuously. When first turned on, input 7-4 of microprocessor A1 (RESET) is held low by capacitor C1. The capacitor C1 charges and when input line 7-4 exceeds 2.5 volts, the microprocessor is ready to begin program execution.

In a portable application utilizing battery power, the reader unit operates from a battery pack, and to prolong its life, the microprocessor is powered down when not needed. With such portable operation, when trigger switch S1 is closed, a scan proximity line 7-5 goes low, this line being connected with a model 101 terminal. Such terminal then applies 5 volts at input line 7-6 so as to supply power to the microprocessor A1. With power applied, capacitor C1 charges and when its voltage value is above 2.5 volts, the microprocessor is placed in operational condition. In addition, output line 7-7 from microprocessor A1 is isolated from the flash tube circuit 7-1 by means of a bilateral switch A54. During power up and down, the potential on output line 7-7 changes unpredictably and could flash the lamp MFT; to prevent this, bilateral switch A54 is opened during this interval.

The microprocessor A1 controls all functions within the hand-held unit. For the illustrated embodiment, the application program may reside in an external programmable read only memory PROM. To access the PROM, the microprocessor outputs the address as two data groups. The low address bits are placed onto the data bus 7-12 through 7-19 and are latched by a data latch associated with the PROM circuit when output 7-11 goes high then low again. The microprocessor then outputs the remaining address on output lines 7-21 through 7-24. The PROM retrieves the data byte from the location chosen by the address bus. When output line 7-9 from the microprocessor goes low, the PROM outputs are enabled and output the data byte onto the data bus for transfer to microprocessor A1. In another embodiment of the invention, the microprocessor A1 will include up to four kilobytes (4K) of internal factory masked program read only memory.

The flash tube section 7-1 is powered via lines 7-25 and 7-26 from an external power source. A voltage of 310 volts is supplied from a user supplied source of power. A voltage of 400 volts may be supplied from the model 101 previously mentioned. The applied power charges a charge storage capacitor C6 connected across the miniature flash tube MFT. The flash tube contains two electrodes with Xenon gas separating them. A fine wire is wound around the cathode end of the tube. When a high voltage is applied to this wire, the Xenon gas is ionized, lowering the resistance between the end electrodes. The gas breaks down, releasing light energy in the process. The capacitor is rapidly discharged as a very high current spike creating the intense light output. When the current and voltage fall below the gas sustaining potential, the flash is extinguished and the gas again becomes non-conductive. The actual flash is of very short duration.

To create the trigger voltage, the 310 volts is stepped up by a trigger transformer L1 and capacitor C7. In the quiescent state, a silicon controlled rectifier SCR1 is non-conducting and the trigger circuit is open. The capacitor C7 in series with the primary of transformer L1 is charged to 310 volts peak through a current limiting resistor R17.

When the microprocessor is ready for a flash it drives output line 7-7 high so as to cause the silicon controlled rectifier SCR1 to conduct and to complete the trigger circuit. Current flows from the capacitor C6 through SCR1 to the other side of the trigger transformer L1. The 310 volt capacitor pulse is stepped up through transformer action to over 4,000 volts (4 KV) and is sent to the flash tube MFT, triggering a flash. The capacitor C6 is discharged, and the loop current decays toward zero. Output line 7-7 returns to a low potential condition and when the current through SCR1 is less than its latch-up value, SCR1 returns to the non-conducting state and the capacitor C6 begins recharging.

For point of sale applications, capacitor C6 is a low leakage electrolytic and is constantly across the power supply. This allows rapid recharge and flash rates to occur.

For the case of a portable power supply, power for capacitor C6 is generated by a small step-up converter that is located in the portable interface module. There is also a sense circuit that monitors the voltage on the charged storage capacitor C6 and turns off the converter when the capacitor is charged, and turns it back on again after a flash or when the capacitor charge has leaked down to approximately 375 volts (375VDC). Because this unit is operating off of battery power, it takes much longer to recharge the capacitor than in the case of a point of sale unit. Recharge time takes from 300 to 500 milliseconds (300 to 500 MSEC), depending on the state of the batteries.

Component A3 in FIG. 7 is a 1024 element line scanner, for example, Reticon RL 1024 G integrated circuit pack. The scanner component A3 comprises a row of silicon photodiodes, each with an associated storage capacitor on which to integrate photocurrent, and a multiplex switch for periodic readout via an integrated shift register scanning circuit. Each photo diode capacitor is charged to a known level; then the array is exposed to the bar code. Light areas cause the photodiodes to discharge their associated capacitors while dark area photodiode capacitors retain full charges. The shift register scanner is stepped from element to element and the capacitor voltage level is read out to the microprocessor until all 1024 elements have been read.

Within the scanner are two photodiode arrays. Both arrays contain photodiodes and capacitors. The video array produces the actual bar code image while the dummy array is masked from the light source. Scanner switching noises are induced capacitively into both arrays and interfere with the video signal. As the scanner is stepped, the video and dummy outputs are presented to an external differential operational amplifier A6. The common mode noise on the lines is effectively cancelled, leaving only the video differential signal for further processing.

The microprocessor A1 controls all signals that cause the scanner A3 to operate. Before the flash tube is fired, the scanner capacitors are charged to +5 volts (+5 V). Microprocessor output 7-28 goes high then low at the START input of scanner A3 to reset the scanner internal shift register to the first element. Processor output line 7-29 goes low turning on the transistor Q1 and thus bringing the scanner recharge input to plus five volts. Internally the first scanner element capacitors are charged in the dummy and video arrays through their respective MOS transistors. Processor output line 7-27 sends one pulse to the scanner CLOCK input and the scanner shift register turns off the first element, then turns on the second element MOS transistor, and the second set of capacitors in the dummy and video arrays are recharged. Processor output 7-27 continues pulsing the clock input of scanner A3 until all 1024 capacitor elements have been charged. In addition, the integrating charge capacitor is charged to plus five volts.

The processor initiates the signal at 7-7 that fires the flash tube, and the bar code pattern is reflected through optics onto the scanner photodiode video array. Where light falls, the photodiode capacitors discharge.

Processor output 7-28 leading to the START input of the scanner goes high then low, resetting the scanner shift register to the first element position.

The MOS transistor is turned on and the charge from the integrating charge capacitor discharges into the photodiode's associated capacitor. If the element was exposed to white light, i.e. a white bar, the capacitor is discharged. The integrating charge capacitor equalizes with the photodiode capacitor. If the element was dark, the capacitor would not discharge and the integrating charge capacitor would discharge very little. A MOS buffer amplifier senses the capacitor charge and places the voltage level on scanner output line 7-40 of component A3. The dummy array element capacitor also is charged by the integrating charge capacitor associated with this array. A second MOS amplifier places the capacitor voltage level on scanner output line 7-41.

Scanner output lines 7-40 and 7-41 change simultaneously in potential as a result of switching noises coupled into the arrays but only output 7-40 contains valid video information. The small capacitor size limits the charge that can be held and it begins dissipating rapidly. This factor plus various circuit losses limits the output voltage swings at output lines 7-40 and 7-41 between zero and four millivolts (4 mV).

Processor output lines 7-29 returns low and the transistor Q1 turns on and biases the scanner RECHARGE input to five volts so that the photodiode's capacitor and integrating charge capacitor recharge to plus five volts in both arrays.

Processor output 7-27 pulses high then low to the scanner CLOCK input, stepping the internal shift register to the second element in both the video and dummy arrays. The above sequence repeats and the second element capacitor is read out to the processor via output lines 7-40 and 7-41.

Scanner outputs 7-40 and 7-41 contain noise impulses from various switching circuits. These outputs are presented to a balanced differential input operational amplifier A6. The operational amplifier A6 cancels the noise of equal amplitude and phase.

The video output 7-40 of scanner component A3 contains valid data not present on output 7-41 so that this valid data is not cancelled and instead is amplified to a usable level for the following circuits. The amplifier provides a voltage input to output gain of approximately 68 times. Across the scanner output is a DC balancing network R6 through R9 and a simple noise filter to permit the differential amplifier A6 to produce a cleaner output.

Before the processor steps the scanner to the next element, it samples the differential output from amplifier A6. For this purpose output line 7-30 goes high to the bilateral switch A51 enabling it to pass the signal output from operational amplifier A6 to charge capacitor C3 of a sample and hold circuit. After a preset period processor line 7-30 returns low and capacitor C3 holds the output of operational amplifier A6.

A zero crossing detector is associated with the output of capacitor C3 and comprises an operational amplifier A41, two diodes CR2 and CR3, resistors R12, R13 and R14 and capacitor C4. The signal from the scanner is a sine wave signal and this signal is squared by means of the zero crossing detector. The operational amplifier gain is set at four and amplifies the incoming wave form. Capacitor C4 is also charged but at a slower rate and its voltage remains lower. When the incoming wave form rises to within 0.7 volt of the capacitor peak voltage the second operational amplifier A42 senses the voltage change and its output snaps to the opposite state. The diode CR2 is forward biased and discharges capacitor C4 while the input falls. When the input begins to rise and comes within 0.7 volt, the other diode CR3 is turned on and the second operational amplifier A42 senses this difference and the output changes to the opposite state.

The processor A1 samples input 7-2 (DATA IN) for a signal level. After opening the sample gate A51 by means of line 7-30 the program waits for several milliseconds to allow the operational amplifiers to stabilize. The processor A1 checks the input port 7-2 at a time when the operational amplifier output will be a valid high or low level.

The processor shifts the scanner to look at the next element then samples if the level is high (corresponding to a white bar area) or low (corresponding to a dark bar area). The processor keeps track of the number of elements that are high (white) and when the black area starts, stores the number of white elements in memory and begins counting the dark elements. When the white area begins, the dark element count is stored and the processor begins counting the white elements. After all 1024 elements have been read, the processor has a pattern of white and dark element counts corresponding to the dark and white widths of the code pattern. The processor program algorithm uses these counts to derive the bar code number.

If the final number does not match its check number or the number of bars is incorrect, the processor repeats the read process again until a correct number is produced. For a point of sale unit, the processor will retry for twenty times, then turns off. Releasing the switch S1 resets the processor for the next read cycle. For a portable unit, because it runs at a slower rate, the processor will continue flashing of the light source MFT until the pattern number is recognized or the unit switch S1 is opened.

When a valid pattern number is derived, the processor converts the number to an ASCII character string and outputs these to a bidirectional line driver A2 shown at the upper right in FIG. 7. The TTL (transistor transistor logic) level data is converted to a differential signal and is sent to a suitable receiver via output lines 7-42 and 7-43.

On a portable unit, the processor output port is tied directly to the portable interface module. The portable interface module then gates the data signal to the model 101 unit previously mentioned. The portable interface module also converts the EIA level signals from the model 101 unit to the TTL level required by the circuitry of FIG. 7.

For use with a point of sale unit, the processor will provide an output at line 7-44 to beep the small on board speaker B1 when there is a good scan, as well as supplying an enabling signal to output line 7-45 so as to light a green LED indicated at LED1 at the lower right of FIG. 7. The diode LED2 emits red light so as to indicate an error condition. The portable unit does not require a speaker and relies upon the model 101 to sound its internal beeper element for a valid number.

FIG. 8 is a plot of a specific exemplary optical system embodying lenses 91-95, stop aperture member 97 with aperture 98, and showing optical surfaces S1-S4 and S6-S11 of the lenses 91-95 in a plane through the respective vertices at axis 81.

The system of FIGS. 8-14 has essentially the characteristics previously described including a resolution at ±fifteen degree converging marginal rays 51, 52, FIG. 3, of forty line pairs per millimeter, and a depth of focus of about twenty-five millimeters, and a close-in optimum focal plane located about six millimeters in front of the front surface of window 34. The system can resolve the previously described high density bar code with five mil code intervals and a 1.8 inch length on a surface with a radius of curvature of about 1.25 inch. Thus the depth of field for sensing sharply curved bar code patterns extends to at least ten millimeters in front of the front surface of window 34.

In FIGS. 8-14, the focal length of the system is 24.23 millimeters and the magnification is −0.3300. The f-number is f/8.3.

FIG. 9 is a plot showing lateral aberrations of the lens system for green, blue and red wavelengths of light. The ordinate shows relative pupil height, and the abscissa is plotted for image heights H' in millimeters. In each of FIGS. 8-14, the solid lines T refer to the tangential plane while the dash lines refer to the sagittal plane. In FIG. 9, the dotted lines refer to the "SAG Y" or Y component of the sagittal ray fan.

Figure 10:
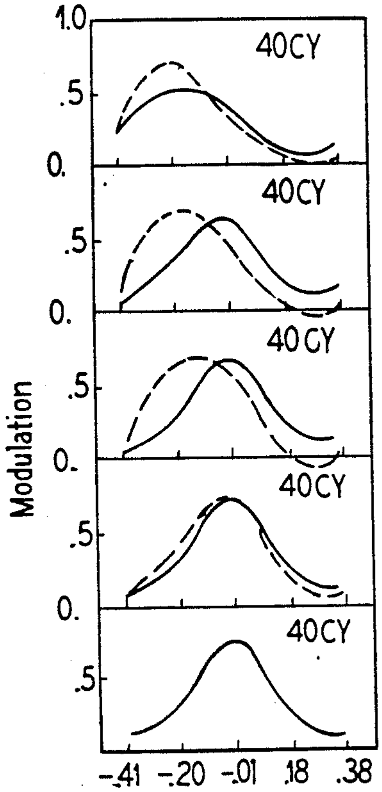
FIGS. 10 and 11 show optical transfer functions for the system of FIGS. 1 through 9, FIG. 10 being for the "Through Focus" condition and FIG. 11 being for the "Best Focus" condition.
Figure 11:
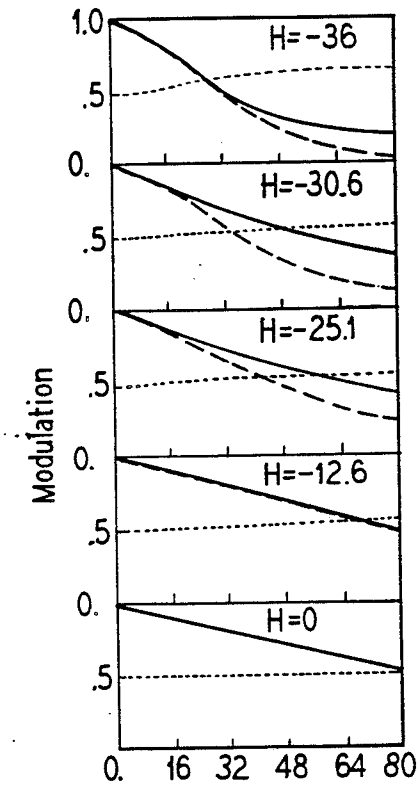

FIGS. 10 and 11 show plots of the optical transfer function with ordinate scales of relative values from zero to one for modulation, and with abscissa values in millimeters. FIG. 10 is taken for the "Through Focus" condition and FIG. 11 refers to the "Best Focus" condition of −0.01 millimeter as shown in FIG. 10, the lowermost plot, FIGS. 10 and 11 show the desired resolution of forty cycles per millimeter. Again the solid lines are for the T or tangential plane and the dash lines are for the S or sagittal plane. The dotted lines in FIG. 11 show the phase variation of the optical transfer function.

The five plots in each of FIGS. 10 and 11 are for respective object heights H in millimeters, namely H=−36 mm, H=−30.6 mm, H=−25.1 mm, H=−12.6 mm, and H=0 mm.

Figure 12:
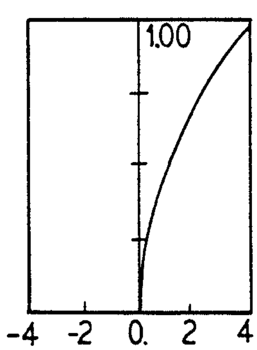
FIGS. 12, 13 and 14 illustrate radial distortion, geometrical astigmatism, and MTF astigmatism, respectively, for the system of FIGS. 1 through 11.
Figure 13:
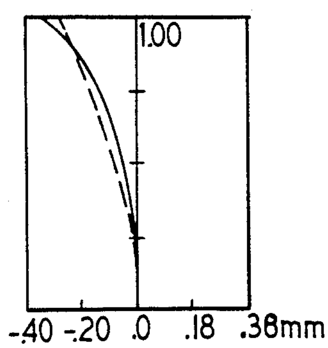
Figure 14:
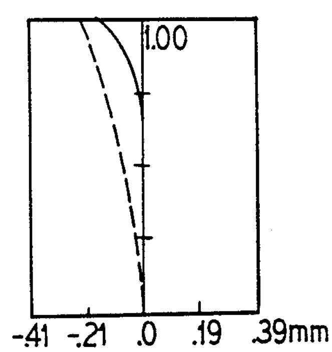

FIGS. 12-14 are plots showing radial distortion, geometrical (classical) astigmatism, and MTF astigmatism. The ordinate scale shows relative values between zero and one, while the abscissa scale is in millimeters relative to the focus position.

An exemplary set of specifications of the lens system which gave the results of FIGS. 8 through 14, is as follows, (the optical surfaces being indicated in parenthesis for the respective lenses):

Exemplary Lens System Specification

| Lens Ref. Number (and Lens Surface) | Radius (millimeters) | Thickness (millimeters) | Clear Aperture (diameter millimeters) |
|---|---|---|---|
| 91(S1) | 13.5153 | 2.40000 | 6.98 |
| 91(S2) | −17.1251 | 1.10247 | 6.04 |
| 92(S3) | −10.8715 | 1.40000 | 4.75 |
| 92(S4) | −37.7869 | .50000 | 4.03 |
| 97(S5) | plano | .50000 | 3.69 |
| 93(S6) | 37.7869 | 1.40000 | 3.83 |
| 93(S7) | 10.8715 | 4.31965 | 4.31 |
| 94(S8) | 17.1251 | 2.40000 | 8.50 |
| 94(S9) | −13.5153 | 12.00000 | 8.91 |
| 95(S10) | −7.9373 | 2.00000 | 11.08 |
| 95(Sll) | −37.4635 | 12.04436 | 13.68 |

Lenses 91, 94 and 95 are of an acrylic lens material known as type 493, 572, and lenses 92 and 93 are of a polystyrene lens material, type 592 307.

In FIG. 8, the following dimensions apply as system first order properties:

f/9.00, H=−30.000 mm magnification −0.4000

OBD=−92.9562 mm (object plane 0 to S1)

BRL=28.0221 mm (S1 to S11 along axis 81)

IMD=12.0444 mm (S11 to image plane I)

OVL=133.023 mm (object plane O to image plane I)

In FIG. 4, the axis of the elliptical reflector portion 35*a* may intersect axis 64 at ten millimeters in front of the front surface of window 34.

The details of a lens system which is effective to transmit an optical image of a bar code pattern from a sensing field 50 with a depth of about one inch and a width of about 2.5 inches to a flat photodetector surface twenty-five microns wide and about one inch in length, is as follows:

mirror 41 at an angle of 57.5 degrees to axis 81, plus or minus fifteen minutes of arc;

distance along axis 64 from bar code sensing region 50 to the front reflective surface of mirror 41, about 46.5 millimeters;

distance along axis 80 from the front reflective surface of mirror 41 to the front reflective surface of mirror 43, about 20.5 millimeters;

mirror 43 at an angle of 75 degrees plus or minus ten minutes of arc, relative to axis 81;

distance along axis 81 from front reflective surface of mirror 43 to first lens surface (S1) of lens 91, about 19.5 millimeters;

distance along axis 81 from first lens surface (S1) of lens 91 to back lens surface (S9) of lens 94, about fourteen millimeters;

distance along axis 81 from the back lens surface (S9) of lens 94 to the vertex of the concave front surface (S10) of lens 95, about twelve millimeters;

distance along axis 81 from the back convex surface (S11) of lens 95 to the front reflective surface of mirror 103, about 7.5 millimeters plus or minus 0.1 millimeter;

distance along axis 104 from the front surfave of mirror 103 to the image plane of photodetector 24, about 3.5 millimeters plus or minus 1 millimeter mirror 103 at an angle of about 37.5 degrees plus or minus ten minutes of arc, relative to axis 81;

angle between axis 81 and the plane of the printed circuit board 20, about fifteen degrees.

Thus, the total optical distance along axes 64, 80, 81 and 104 is about 125 millimeters. This optical path occupies a physical length of the casing 14 of about seventy-five millimeters, so that a substantial reduction in the length of the forward portion of unit 10 is achieved.

Figure 15:
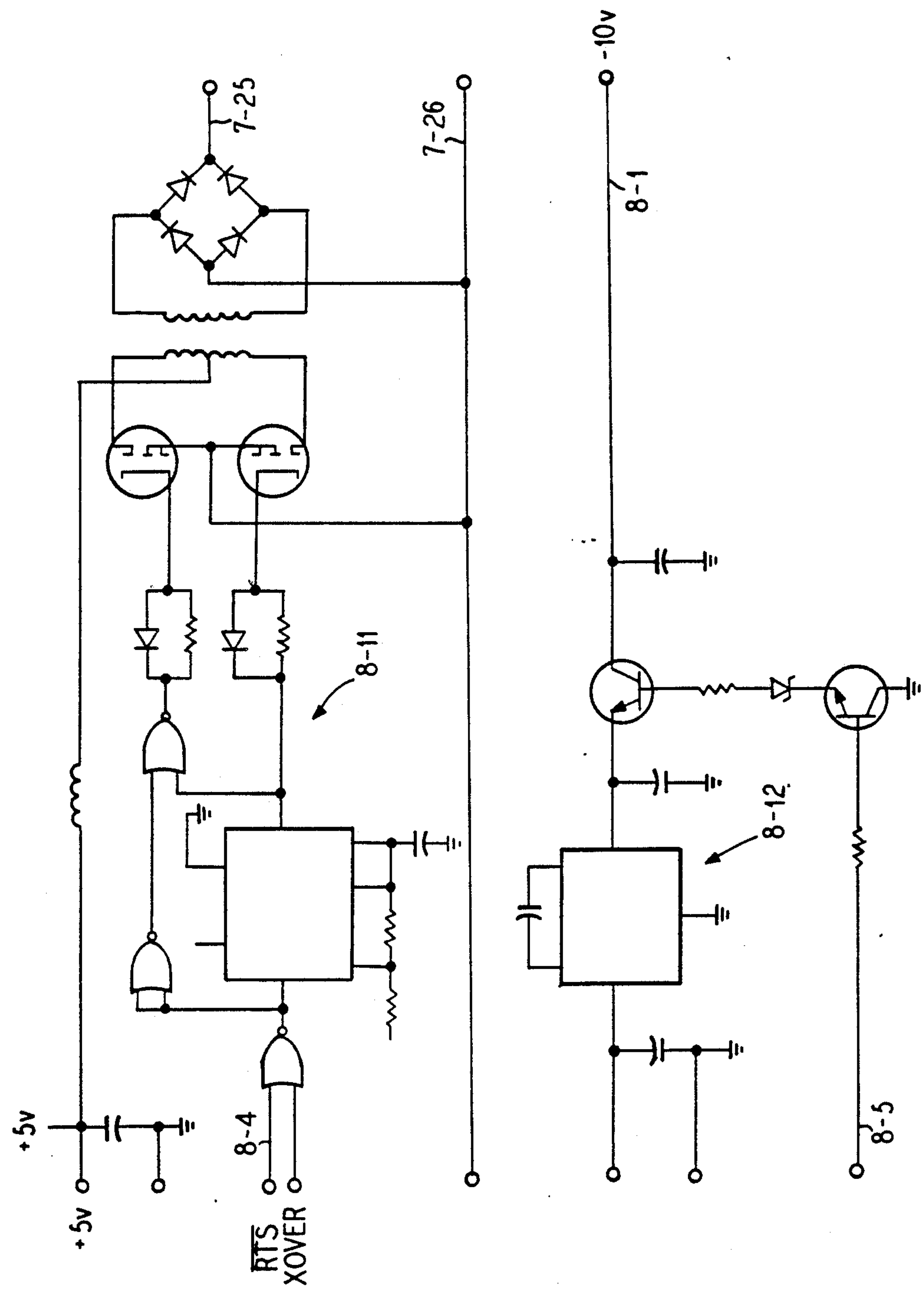
FIGS. 15 and 16 together provide a diagrammatic showing of the electric circuitry for the interface component 17, FIG. 1, where the unit 16 is itself battery operated and portable.
Figure 16:
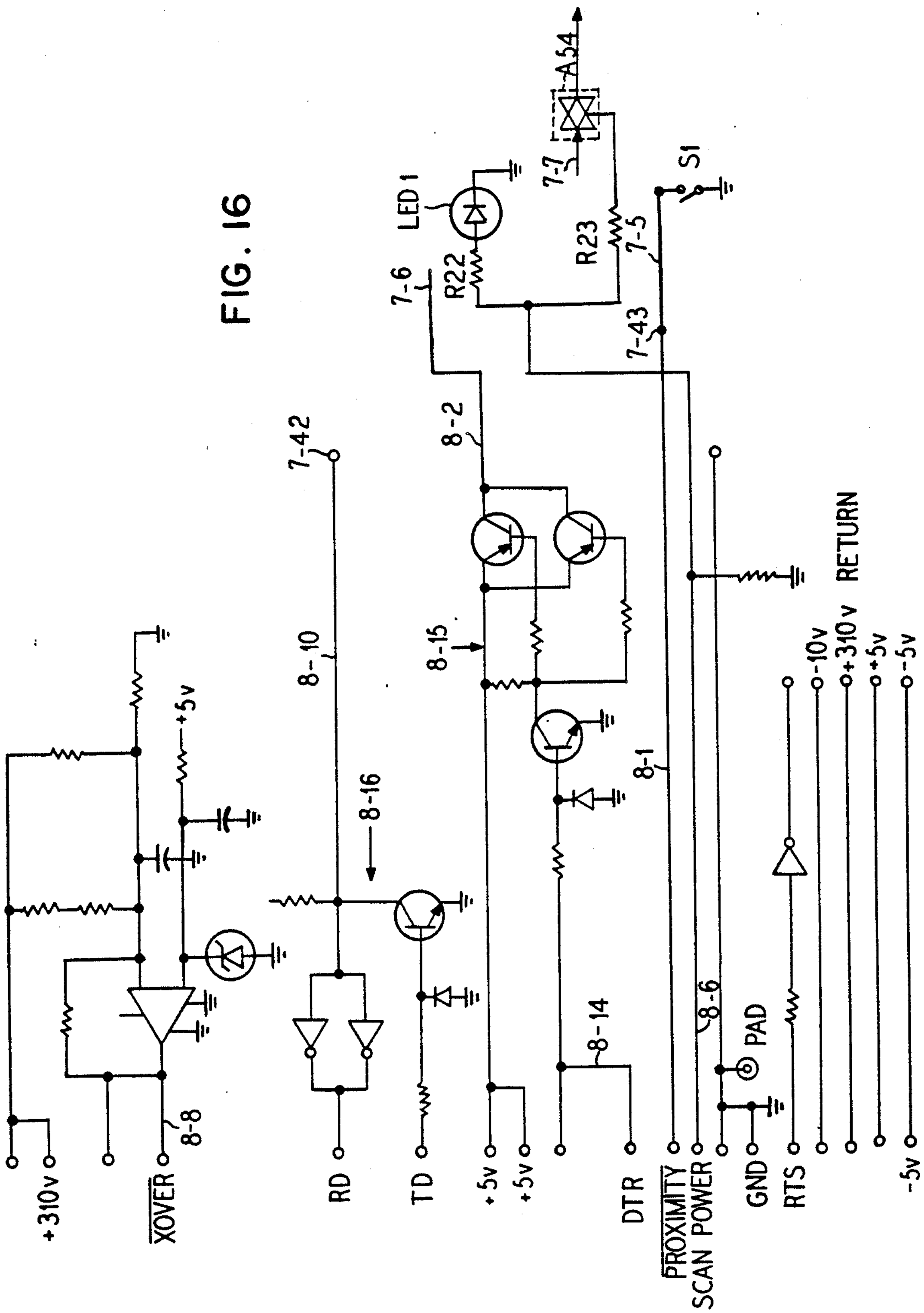

FIGS. 15 and 16 show the circuitry for interface 17 when it is associated with a Model 101 portable system corresponding to component 16 in FIG. 1.

For the case where the circuitry of FIGS. 15 and 16 is associated with the reader circuit of FIG. 7, switch S1 will be decoupled from processor A1, and actuation of button 18 to close switch S1 will be transmitted via conductors 7-5, FIG. 7 to point 7-43 shown at the upper right of FIG. 7, and from this point via conductor 8-1, FIG. 16, to the "$\overline{\text{PROXIMITY}}$". The interface module 17 of FIGS. 15 and 16 plugs into the model 101 unit 16 and provides any required level conversion between the model 101 and the reader unit of FIG. 7. The interface module of FIG. 16 generates plus 400 volts for the flash tube and the minus ten volts for the scanner module A3. Both of these supplies and the plus five volts from output 8-2 of FIG. 16 are switched at the interface module under Model 101 control.

A scan is initiated when the trigger switch S1, FIG. 7, is depressed. This gives a "$\overline{\text{PROXIMITY}}$" signal to the model 101 via conductor 8-1 in the same manner as a prior art scanning wand. After receiving $\overline{\text{PROXIMITY}}$, the model 101 checks $\overline{\text{XOVER}}$ to verify that the high voltage is charged to an acceptable level. If not, the model 101 circuit raises RTS at 8-4, FIG. 15 to enable the high voltage charge circuit. The model 101 then waits for $\overline{\text{XOVER}}$ to go low, or up to 750 milliseconds, whichever comes first, If the $\overline{\text{XOVER}}$ signal does not indicate a valid high voltage within the 750 millisecond time out, a charge error is indicated. If $\overline{\text{XOVER}}$ goes valid within the 750 millisecond time-out then the model 101 drops RTS and raises DTR at 8-5, FIG. 15. The DTR signal is used by the interface module to switch the low voltage supplies to the reader unit of FIG. 7.

After raising DTR, the model 101 waits for a Bell (07 HEX) from the reader circuit of FIG. 7. The time-out for this is also 750 milliseconds. If the Bell is not received, a bad scan is assumed. After receiving the Bell, the model 101 sends a three character control word to the reader of FIG. 7. The first character is the minimum length expected, added to an ASCII O (30 HEX), the second character is the maximum length expected, added to an ASCII O and third character is an ASCII ACK (06 HEX). The minimum and maximum are sent in this fashion to reduce communication overhead and still maintain an ASCII protocol.

After the control word is sent, the model 101 turns on SCAN POWER at 8-6, FIG. 16 to enable the strobe. The model 101 monitors $\overline{\text{XOVER}}$ to detect a flash and waits up to 100 milliseconds before assuming a bad scan. AFter $\overline{\text{XOVER}}$ at 8-8, FIG. 16, goes low, the model 101 waits up to 750 milliseconds for the reader to send the decoded bar code data. If not data is received at line 8-10, FIG. 16, within 750 milliseconds or if the reader sends an ASCII "*", a bad scan is indicated and a retry will be attempted if $\overline{\text{PROXIMITY}}$ at line 8-1 is still present.

If valid data is received from the reader, then the first character indicates which type of label was scanned. The decoded label then follows with a modulus ten hash digit, and ASCII carriage return, and an ASCII line feed added onto the end.

If the data meets the model 101 requirements for a good scan, then the model 101 drops DTR at conductor 8-5 and powers off the reader unit. If not, then an ASCII NAK is sent to the reader, and a retransmission is requested. If the data was good, then the model 101, under application control, can indicate a good scan on the reader by turning on SCAN POWER at 8-6, FIG. 16.

FIG. 15 shows the circuitry at 8-11 for the flash tube firing. When the RTS input 8-4 is active, the 300 volt direct current generator charges its output capacitor to the maximum voltage $V_M$ and is shut off by the signal XOVER until the output voltage reaches a fixed lower voltage $V_L$ at which point the 300 volt generator is started until the output reaches $V_M$. If RTS is inactive, the 300 volt generator is off.

Section 8-12 in FIG. 15, supplies minus ten volts to output 8-1, which in turn supplies component A3, the diode array chip A3 of FIG. 7. When DTR at 8-5 is active, conductor 8-14, FIG. 16 is also active so as to switch plus five volts from the model 101 to output line 8-2 via circuit block 8-15, so that the processor A1 is powered up.

A data link circuit is indicated at 8-16 in FIG. 16 which interfaces the READ (RD) signal and the TRANSMIT DATA (TD) signals from the model 101 over a single line 8-10 to the reader processor A1 via terminal 7-42 at the upper right in FIG. 7.

The proximity line 8-1 of FIG. 16 is an input to the model 101 indicating that the operator has depressed the reader button 18 requesting a read operation.

The SCAN POWER line 8-6 is an output from the model 101 allowing the flash tube to be fired by the reader processor A1 (via output 7-7).

In operation, the model 101 receives a request to scan (PROXIMITY) signal via conductor 8-1 FIG. 16 from the reader circuit of FIG. 17. The model 101 raises DTR at 8-14 which turns on the reader processor A1. The reader processor sends a "BELL" signal to the model 101 via terminal 7-42 and conductor 8-10, FIG. 16. The model 101 checks XOVER at 8-8 for full charge. When 300 volts is charged (XOVER) the model 101 sends the reader a go ahead character via conductor 8-10, FIG. 16, and terminal 7-42, and enables the flash via SCAN POWER at 8-6, FIG. 16. The reader decodes the data from the scanner A3, FIG. 7, and sends a character or characters back to the model 101 via terminal 7-42 and conductor 8-10, FIG. 16. If a valid character is read, it is passed to the model 101. The cycle is complete and will not start again until the button 18 is released and depressed again by the operator. If the reader gets an invalid code a character (*) is sent to the model 101 indicating no read and the cycle starts again.

In the portable application, the reader unit operates from the battery pack of the model 101 and to prolong its life, the central processing unit A1, FIG. 7, is powered down when not needed.

When the trigger switch S1 is closed, the model 101 proximity line, 7-5, FIG. 7, 8-1, FIG. 16, goes low. The model 101 applies five volts to the central processing unit A1. The capacitor charges and above 2.5 volts at C1, FIG. 7, releases the central processing unit A1 to operate. In this mode, however, conductor 7-4 and the upper plate of capacitor C1 are disconnected from the gate of switch A54, switch A54 instead being controlled via line 7-6 as shown in FIG. 16. In addition, output line 7-7 from processor A1, FIG. 7, is isolated from the flash tube circuit by the bilateral switch A54. During power-up and down, conductor 7-7 from the processing unit A1 changes unpredictably and could flash the lamp, so that the bilateral switch A54 is opened. Because the bilateral switch A54 is controlled by the same signal that drives the green LED 1 (good scan), FIG. 16, the switch A54 is only turned on for a short time. It is timed to coincide with the reader flash signal from conductor 7-7 at the output of processor A1. The switch A54 is also turned on during the time the green LED 1 is on to indicate a good scan.

In the commercial equipment, fixed base, versus portable components 16 were implemented by a circuit arrangement which eliminated the need for jumpers by going to a cut-only arrangement.

To correct a band width problem, the op-amp A6 was changed to a type CA3130E. This part has a much higher gainband width product than the amplifier previously used. It is also more stable over the temperature range and voltage range. The second and third stages use an LM358N, (A41 and A42, FIG. 7) which was comparable to a previous part.

The recharge control transistor Q1 was changed from a 2N3906 to a VP0106 to eliminate the need for two resistors. The existing circuit was stabilized over temperature by the addition of a 2.2 kilohm resistor, but it became apparent that there was no room for the extra resistor. The VP0106 also eliminated a further rsistor allowing other parts to be moved around.

In checking the alternating current noise adjustment at R8, FIG. 7, it became apparent that there was an unknown noise element. This was found to be caused by the lack of output load on amplifier A6. By adding R27, a ten thousand ohm pull-down resistor to the output of the CA3130E operational amplifier, the noise was eliminated. After adding R27, the adjustment of R8 was easy to complete.

The circuits as shown herein were deemed ready for release to production. The changes indicated were considered to accomplish some significant improvements.

Exemplary product specifications for a commercial reader unit in accordance with the present invenion are as follows:

Using a standard UPC-A label, the read rate design goals are:

| | |
|---|---|
| First Read Rate | 95% |
| Second Read Rate | 98% |
| Third Read Rate | 99.5% |

Not more than 7.3 errors in ten thousand accepted reads (per "The Effect of the Design of the IBM Proposed UPC Symbol and Code on Scanner Decoding Reliability").

Depth of field: Up to 0.4 inch (ten millimeters)

The reader will read bar codes with a minimum bar/space width of 7.5 mils (0.0075 inch) at a contrast ratio of 50% or greater. Each bar or space must be within plus ten percent of its nominal size, and the maximum width of a bar code is 1.8 inches from first start bar to last stop bar, including add on, if any. A quiet zone of not less than five times the narrowest element of the start or stop bars is required on each end.

Minimum label radius must be greater than 1.25 inches for a 1.8 inch label.

The reader will currently support the following codes: UPC-A, UPC-E, EAN-13, and EAN-8 or without add-on 2 or 5.

The scanning modules are encoded in ROM and can be modified to support other bar codes at the factory.

Pursuant to 37 CFR 1.96 (a)(2)(ii), a computer printout (in continuous web form) is found in an accompanying protective cover and is designated "COMPUTER PRINTOUT APPENDIX PURSUANT TO 37 CFR 1.96(a)(2)(ii)". For the sake of identification of this material, it may be noted that the printout sheets are numbered beginning with the third sheet as "PAGE 1" through "PAGE 57". PAGE 57 begins a "CROSS REFERENCE" listing which continues for five sheets without page numbers.

The first page (without a page number) of listing includes the following notation:

"JOB=RDXIL PRINTED ON 17-DEC-81 at 03:09 PM FOR USER [1, 160]"

It will be apparent that many modifications and variations may be effected without departing from the scope of the novel concepts and teachings of the present invention.

IN THE UNITED STATES PATENT AND TRADEMARK OFFICE

APPLICANTS: George E. Chadima, Jr., Vadim Laser

TITLE: "Instant Portable Bar Code Reader" (Attorney's Case No. P-81,663)

COMPUTER PRINTOUT
APPENDIX
PURSUANT TO 37 CFR 1.96(a)(2)(ii)

```
   111                              111         6u6u6u6u6u        u0u0u0u0u0
   111                              111         6u6u6u6u6u        u0u0u0u0u0
   111                              111         6u6u6u6u6u        u0u0u0u0u0
111111                           111111      6u6         6u6   0u0       u0u0u0
111111                           111111      6u6         6u6   0u0       u0u0u0
111111                           111111      6u6         6u6   0u0       u0u0u0
   111                              111      6u6               0u0       u0u0u0
   111                              111      6u6               0u0       u0u0u0
   111                              111      6u6               0u0       u0u0u0
   111                              111      6u6u6u6u6u6u6u    0u0   0u0   0u0
   111                              111      6u6u6u6u6u6u6u    0u0   0u0   0u0
   111                              111      6u6u6u6u6u6u6u    0u0   0u0   0u0
   111                              111      6u6         6u6   0u0u0u      0u0
   111                              111      6u6         6u6   0u0u0u      0u0
   111                              111      6u6         6u6   0u0u0u      0u0
   111                              111      6u6         6u6   0u0u0u      0u0
   111                              111      6u6         6u6   0u0u0u      0u0
   111                              111      6u6         6u6   0u0u0u      0u0
111111111                        111111111      6u6u6u6u6u        u0u0u0u0u0
111111111                        111111111      6u6u6u6u6u        u0u0u0u0u0
111111111                        111111111      6u6u6u6u6u        u0u0u0u0u0

[[[<<<<<<<<<<$$$$$$$$$$!!!!!!!!!!##########??????????==========0u0u0u0u0u**********&&&&&&&&&&++++++++++%%%%%%%%%%>>>>>>>>>>]]]
[[[<<<<<<<<<<$$$$$$$$$$!!!!!!!!!!##########??????????==========0u0u0u0u0u**********&&&&&&&&&&++++++++++%%%%%%%%%%>>>>>>>>>>]]]
```

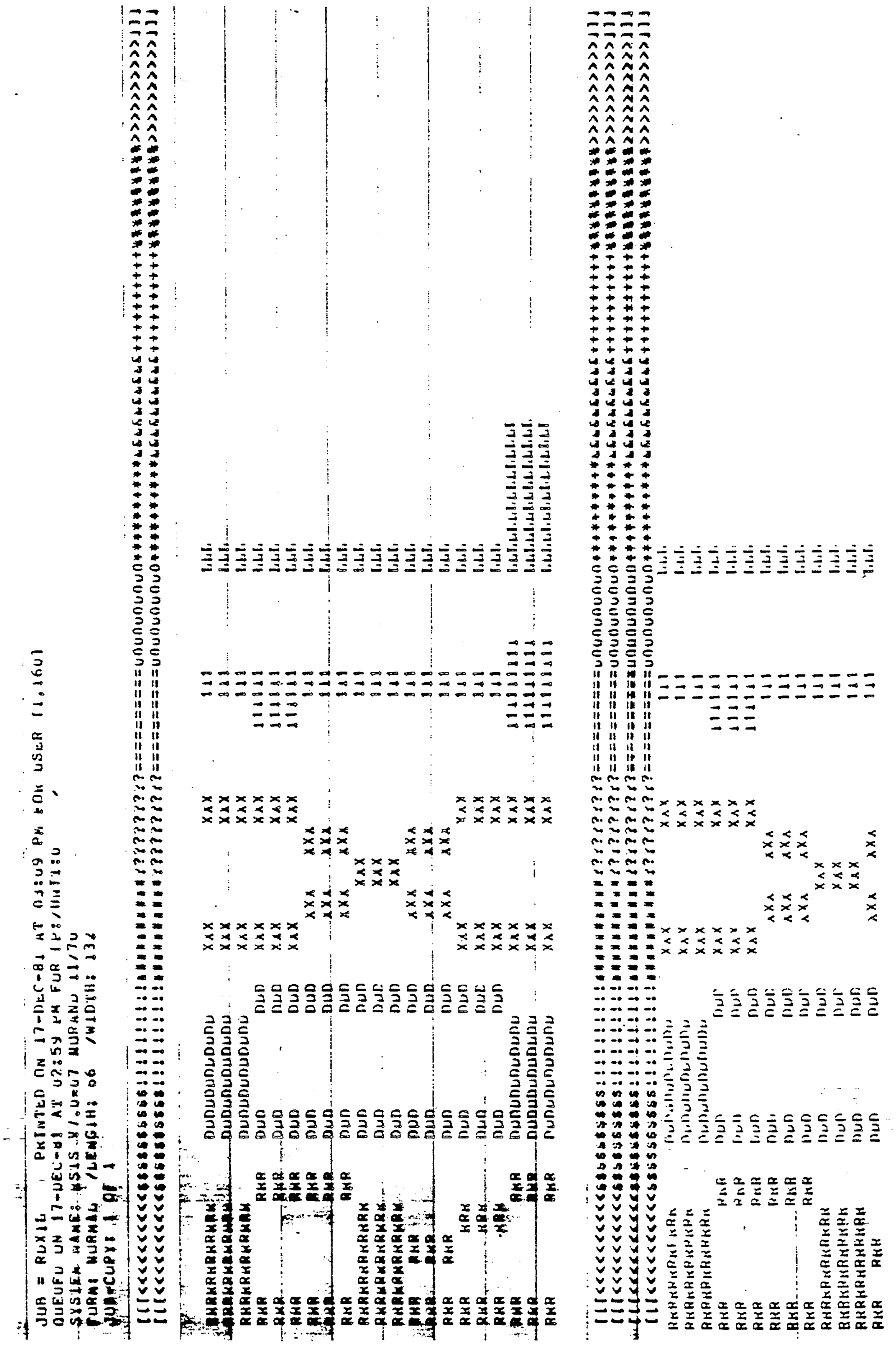
JOB = RDXIL PRINTED ON 17-DEC-81 AT 03:09 PM FOR USER [1,160]
QUEUED ON 17-DEC-81 AT 02:59 PM FOR LP0:/UNIT:0
SYSTEM NAME: RSTS V7.0-07 DURAND 11/70
FORM: NORMAL /LENGTH: 66 /WIDTH: 132
JOB COPY: 1 OF 1

```
RRR   RRR          DDD          DDD       XXX    XXX          111       LLL
RRR   RRR          DDD          DDD       XXX    XXX          111       LLL
RRR      RRR       DDD          DDD    XXX          XXX       111       LLL
RRR      RRR       DDD          DDD    XXX          XXX       111       LLL
RRR      RRR       DDD          DDD    XXX          XXX       111       LLL
RRR         RRR    DDDDDDDDDDDDD       XXX          XXX    111111111    LLLLLLLLLLLLLLL
RRR         RRR    DDDDDDDDDDDDD       XXX          XXX    111111111    LLLLLLLLLLLLLLL
RRR         RRR    DDDDDDDDDDDDD       XXX          XXX    111111111    LLLLLLLLLLLLLLL


444         444       88888888       LLL
444         444       88888888       LLL
444         444       88888888       LLL
444         444    888        888    LLL
444         444    888        888    LLL
444         444    888        888    LLL
444         444    888        888    LLL
444         444    888        888    LLL
444         444    888        888    LLL
444444444444444       88888888       LLL
444444444444444       88888888       LLL
444444444444444       88888888       LLL
            444    888        888    LLL
            444    888        888    LLL
            444    888        888    LLL
            444    888        888    LLL
            444    888        888    LLL
            444    888        888    LLL
            444       88888888       LLLLLLLLLLLLLLL
            444       88888888       LLLLLLLLLLLLLLL
            444       88888888       LLLLLLLLLLLLLLL

[[[<<<<<<<<<<<SSSSSSSSSS!!!!!!!!!!##########??????????==========UOUOUOUOUO**********&&&&&&&&&&++++++++++%%%%%%%%%%>>>>>>>>>>]]]
[[[<<<<<<<<<<<SSSSSSSSSS!!!!!!!!!!##########??????????==========UOUOUOUOUO**********&&&&&&&&&&++++++++++%%%%%%%%%%>>>>>>>>>>]]]

JOB = RDXIL      PRINTED ON 17-DEC-81 AT 03:09 PM FOR USER [1,160]
COPY    1 OF    2   /DELETE:  NO    FILE = DB1   :[50,52]RDXIL .48L
RECORD TYPE:  STREAM    FORMAT TYPE:  FORTRAN

[[[<<<<<<<<<<<SSSSSSSSSS!!!!!!!!!!##########??????????==========UOUOUOUOUO**********&&&&&&&&&&++++++++++%%%%%%%%%%>>>>>>>>>>]]]
[[[<<<<<<<<<<<SSSSSSSSSS!!!!!!!!!!##########??????????==========UOUOUOUOUO**********&&&&&&&&&&++++++++++%%%%%%%%%%>>>>>>>>>>]]]
```

```
LINE  ADDR  B1 B2 B3 B4 ERROR   RDXIL.48P,PORT,UPC-A,E(0,1),EAN-8,13,ADDON 2,5            PAGE    1

                                         TITLE   'RDXIL.48P,PORT,UPC-A,E(0,1),EAN-8,13,ADDON 2,5
                                * CONDITIONAL ASSEMBLY SWITCHES
      0000                      DEBUG    EQU      0        SWITCH FOR CONDITIONALLY INCLUDING DEBUG CODE
                                *
                                * AUTHOR JIM WAITE
                                *
                                * HISTORY
                                *
                                * RDXIL
                                * VER 1.0         12-10-81          CREATED FROM RDXIC VER 1.4
                                *                                   CHANGED RED LITE TO WHAT GREEN LITE MEANT.
                                *                                    CHANGED GREEN LITE TO MEAN GOOD READ,
                                *                                    OPPOSITE OF WHAT RED LITE MEANT.
                                *
                                * RDXIC
                                * VER 1.4         06-21-81          DELETED THE 1,2,7,8 25% TEST ADDED
                                *                                    IN VERSION 1.2. LEFT IN THE '='
                                *                                    TEST.
                                *                                   ADDED DL2 HOST READ COMMAND.
                                *                                   CHANGED 'OUTCHAR' TO WAIT 1 BIT TIME
                                *                                    BEFORE SENDING A CHARACTER SO THAT
                                *                                    THE OTHER END HAS TIME TO FINISH
                                *                                    SENDING THE STOP BIT BEFORE THIS
                                *                                    END MIGHT SEND A RESPONSE.
                                *
                                * VER 1.3         06-14-81          MODIFIED 'INIT' AND 'READ' TO HANDLE
                                *                                    RETICON AND DIGITIZER BETTER.
                                *                                    DOUBLES ANALOG SIGNAL STRENGTH.
                                *
                                * VER 1.2         06-19-81          MODIFIED 'CHAR' AND ADDED 'R4VSR7'
                                *                                    SO THAT C1/C2, C3/C4 COMPARISON FOR
                                *                                    DETERMINATION OF 1/7, 2/8 CHARACTERS
                                *                                    THE LARGER COUNT MUST BE LARGER
                                *                                    THAN THE SMALLER COUNT PLUS 25%.
                                *                                    THIS WILL HELP REDUCE SUBSTITUTIONS.
                                *
                                * VER 1.1         06-18-81          MODIFIED 'READUP' TO:
                                *                                    DELAY INPUTTING THE DATA AND SHIFT
                                *                                    THE INPUT TO A TIME WHEN CIRCUIT
                                *                                    NOISE FROM THE INPUT WOULD BE LESS
                                *                                    HARMFULL.
                                *                                   MODIFIED 'GUARD' TO:
                                *                                    CHANGE THE GUARD REQUIREMENT FROM
                                *                                    +/-25%+1 TO 50%.
                                *
                                * VER 1.0         04-16-81          RELEASED

LINE  ADDR  B1 B2 B3 B4 ERROR   RDXIL.48P,PORT,UPC-A,E(0,1),EAN-8,13,ADDON 2,5            PAGE    2

                                *
                                * MACROS
                                *
                                ERR      MACRO
                                         CLR      F0
                                         CPL      F0
                                         ENDM
                                *
                                JERR     MACRO    ADDR
                                         JF0      ADDR
                                         ENDM
                                *
                                JOK      MACRO    ADDR
                                         LOCAL    LAB1
                                         JF0      LAB1
                                         JMP      ADDR
                                LAB1     SET      $
                                         ENDM
                                *
                                JOER     MACRO    ADDR
                                         JT0      ADDR
                                         ENDM
                                *
                                JPORT    MACRO    ADDR
                                         JNT0     ADDR
                                         ENDM
                                *
                                PAGE     MACRO    SIZE
                                         ORG      (($+SIZE-1)/SIZE)*SIZE
                                         ENDM
                                *
                                OK       MACRO
                                         CLR      F0
                                         ENDM
                                *
                                RETERR   MACRO
                                         CLR      F0
                                         CPL      F0
                                         RET
                                         ENDM
                                *
                                RETOK    MACRO
                                         CLR      F0
                                         RET
                                         ENDM
```

```
LINE  ADDR  B1 B2 B3 B4 ERROR   RDX11.48P,PORT,UPC-A,E(0,1),EAN-8,13,ADDON 2,5             PAGE    3

                                *
                                * TESTABLE FLAGS AND INPUT DEFINITIONS
                                *
                                * F0     ERROR FLAG
                                * F1     NOT USED
                                * T0     LOW = PORTABLE MODE
                                * T1     NOT USED
                                * INT    RECEIVE DATA
                                *
                                * EQUATES
                                *
                                * PORT 1 BITS
      0080                      BEEPER  EQU     128     BEEPER CONTROL
      0040                      GREEN   EQU     64      GREEN LITE - LAST READ WAS GOOD
      0020                      RED     EQU     32      RED LITE - ENABLED
      0010                      FLASH   EQU     16      IMAGE ARRAY CONTROL SIGNAL
      0008                      SAMPLE  EQU     8       IMAGE ARRAY CONTROL SIGNAL
      0004                      RECHARG EQU     4       IMAGE ARRAY CONTROL SIGNAL
      0002                      START   EQU     2       IMAGE ARRAY CONTROL SIGNAL
      0001                      CLOCK   EQU     1       IMAGE ARRAY CONTROL SIGNAL
                                *
                                * PORT 2 BITS
      0080                      TXD     EQU     128     TRANSMIT DATA OUTPUT BIT
      0040                      TXEN    EQU     64      TRANSMIT ENABLE - RECEIVE ALWAYS ENABLED
      0020                      TRIGR   EQU     32      TRIGGER SWITCH BIT - LOW EQUALS TRUE
      0010                      BARBIT  EQU     16      BAR DATA INPUT BIT
                                *
                                * HOST COMMUNICATION CONTROL CHARACTERS
      0006                      ACK     EQU     6       FROM HOST TO INDICATE LAST DATA WAS OK
                                *                        HANDLED IN 'SEND'
      0015                      NAK     EQU     21      FROM HOST TO INDICATE LAST DATA WAS BAD
                                *                        HANDLED IN 'SEND'
      0011                      DC1     EQU     17      FROM HOST TO ENABLE DATA TRANSFER
                                *                        TRAPPED IN 'GETCHAR'
      0012                      DC2     EQU     18      FROM HOST TO INITIATE A READ CYCLE
                                *                        TRAPPED IN 'WAITON'
      0013                      DC3     EQU     19      FROM HOST TO DISABLE DATA TRANSFER
                                *                        TRAPPED IN 'GETCHAR'
      0007                      BEL     EQU     7       TO HOST AS POWER-UP SIGNAL
      0005                      ENQ     EQU     5       FROM HOST TO REQUEST ID MESSAGE
                                *                        TRAPPED IN 'GETCHAR'
      0003                      ETX     EQU     3       FROM HOST TO RESTART THIS PROCESSOR
                                *                        TRAPPED IN 'INT'
      0000                      NULL    EQU     0       USED TO INDICATE EMPTY RECEIVE BUFFER
                                *
                                * ASCII CHARACTER EQUATES
      000D                      CR      EQU     13      CARRIAGE RETURN
      000A                      LF      EQU     10      LINE FEED
      0020                      SP      EQU     32      SPACE
      0000                      EOD     EQU     0       INDICATES END-OF-DATA WITHIN A BUFFER
                                *
                                * BARCODE TYPE EQUATES
      0000                      UPC     EQU     0       UPC - MUTUALLY EXCLUSIVE WITH EAN
      0001                      EAN     EQU     1       EAN - MUTUALLY EXCLUSIVE WITH UPC
      0000                      SHORT   EQU     0       SHORT - MUTUALLY EXCLUSIVE WITH LONG
      0002                      LONG    EQU     2       LONG -  MUTUALLY EXCLUSIVE WITH SHORT
LINE  ADDR  B1 B2 B3 B4 ERROR   RDX11.48P,PORT,UPC-A,E(0,1),EAN-8,13,ADDON 2,5             PAGE    4

      0004                      ADDON2  EQU     4       MUTUALLY EXCLUSIVE WITH ADDON5
      0008                      ADDON5  EQU     8       MUTUALLY EXCLUSIVE WITH ADDON2
                                *
      0080                      BACKCHR EQU     128     DECODED CHARACTER BACKWARD BIT FLAG
                                *
                                * ADDRESS EQUATES
      0000                      ROMBEG  EQU     0
      0003                      VECTOR3 EQU     3       EXTERNAL INTERRUPT VECTOR
      0007                      VECTOR7 EQU     7       TIMER INTERRUPT VECTOR
      0020                      RAMBEG  EQU     32
      0100                      RAMEND  EQU     256
LINE  ADDR  B1 B2 B3 B4 ERROR   RDX11.48P,PORT,UPC-A,E(0,1),EAN-8,13,ADDON 2,5             PAGE    5

                                *
                                * RAM STORAGE AREA DEFINITIONS
                                *
      0008                      STACK   EQU     8
                                        ORG     RAMBEG
      0020                      INCHAR  DS      1            RECEIVE DATA BUFFER - INTERRUPT LOADED
      0021                      TRYS    DS      1            BAD SCAN RETRY COUNTER
                                *
      0022                      FRAMPTR DS      1            PTR TO COUNT'S FRAMING BOOT
      0023                      CHARPTR DS      1            PTR TO LOCATION OF NEXT DECODED CHARACTER
      0024                      ADDPTR  DS      1            PTR TO RIGHT END OF COUNTS AFTER DECODE
      0025                      EODPTR  DS      1            POINTER TO END OF COUNTS
      0026                      BACKSW  DS      1            BACKWARDS SWITCH, <>0 = BACKWARDS
                                *
      0027                      CHARS   EQU     $
      0027                      CHARTYP DS      1            DECODED BARCODE TYPE - 1ST BYTE OF CHARS
      0028                      CHARF1  DS      1            DECODED BARCODE F1 CHARACTER FOR EAN-13
      0029                      CHARBEG DS      12           DECODED BARCODE CHARACTERS
      0035                              DS      1            PLUS 1 FOR EOD
                                *
      0036                      CHARADD DS      5            DECODED BARCODE ADDON CHARACTERS
      003B                              DS      1            PLUS 1 FOR EOD
                                *
      003C                      CNTBEG  DS      RAMEND-$     BAR COUNTS OCCUPY REST OF RAM LESS 1 FOR EOD
      0100                      CNTEND  EQU     $
```

```
LINE  ADDR  B1 B2 B3 B4 ERROR   RDX11,40P,POP1,UPC-A,E(0,1),FAN=8,13,ADDON 2,5          PAGE    6

 188                            *
 189                            * ROM CODE
 190                            *
 191                                    ORG     ROMBEG
 192  0000                      BEGIN
 193  0000  04 05                       JMP     BEGIN2
 194                                    ORG     VECTR3
 195  0003  A4 05                       JMP     INT
 196                            * INIT PROGRAM VARIABLES AND I/O
 197  0005  F4 7F               BEGIN2  CALL    INIT            INITIALIZE VARIABLES AND I/O
 198                            *
 199                            * MAIN SCAN LOOP STARTS HERE
 200                            *
 201  0007                      SCAN
 202                             IF DEBUG
 203                             ENDIF
 204  0007                              JPORT   SCAN2           IF PORTABLE THEN SKIP TRIGGER WAIT
 206  0009  E4 AE                       CALL    WAIT            WAIT FOR ENABLE AND SCAN TRIGGER
 207  000B  B9 21               SCAN2   MOV     R1,#TRYS        INIT BAD SCAN RETRY COUNTER
 208  000D  B1 EC                       MOV     @R1,#-20        (UPCOUNTER)
 209  000F  99 9F                       ANL     P1,#-1-GREEN-RED        TURN OFF GOOD READ, READY LITES
 210  0011  14 3B               SCANLP2 CALL    READ    READ BARCODE BIT ARRAY INTO MEMORY AS BARCODE COUNTS
 211  0013  14 B8                       CALL    FILTER          FILTER OUT INVALID COUNTS
 212  0015  14 B5                       CALL    ADJUST          ADJUST COUNT VALUES BY A FACTOR
 213                             IF DEBUG
 214                             ENDIF
 215  0017  34 00                       CALL    DECODE          DECODE BARCODE COUNTS INTO CHARACTERS
 216  0019                              JPORT   SCAN4           IF PORTABLE THEN SEND THE DATA
 218  001B                              JERR    SCNERR2
 220  001D  54 00               SCAN4   CALL    SEND            SEND DECODED BAR CODE TO HOST
 221  001F                              JERR    SCNERR2         DATA NOT ACCEPTED
 223  0021                              JPORT   S               LOOP HERE IF PORTABLE - WE GET POWERED DOWN
 225  0023  89 40                       ORL     P1,#GREEN       TURN ON GOOD READ LITE
 226  0025  94 00                       CALL    BEEP            SHORT BEEP MEANS GOOD
 227  0027  04 07                       JMP     SCAN            GOTO WAIT FOR NEXT TRIGGER
 228  0029  F4 CB               SCNERR2 CALL    TRIGGER         IF NO TRIGGER
 229  002B  C6 37                       JZ      SCNERR4         THEN EXIT WITH ERROR
 230  002D  B9 21                       MOV     R1,#TRYS        ELSE CHECK FOR LAST TRY
 231  002F  11                          INC     @R1
 232  0030  F1                          MOV     A,@R1
 233  0031  C6 37                       JZ      SCNERR4         LAST RETRY - EXIT WITH ERROR
 234  0033  94 16                       CALL    DELAYE          WAIT 40MS BEFORE RE-FLASHING
 235  0035  04 11                       JMP     SCANLP2
 236  0037  99 BF               SCNERR4 ANL     P1,#-1-GREEN    TURN OFF GOOD READ LITE
 237  0039  04 07                       JMP     SCAN

LINE  ADDR  B1 B2 B3 B4 ERROR   RDX11,40P,POP1,UPC-A,E(0,1),FAN=8,13,ADDON 2,5          PAGE    7

 239                            *
 240                            * CLEAR DIODE BIT ARRAY AND FLASH
 241                            * READ 1024 BIT ARRAY
 242                            * COUNT EACH SERIES OF 1 OR 0 BITS AND STORE THE COUNTS IN RAM
 243                            * ONE BIT REPRESENTS 0.0025": 255 BITS REPRESENTS 0.6375"
 244                            * BIT COUNTS ARE LIMITED AT 255 - THEY ARE NOT ALLOWED TO WRAP.
 245                            *
 246  003B                      READ
 247                            * INIT READ VARIABLES
 248  003B  27                          CLR     A               INITIALIZE REGISTERS
 249  003C  AA                          MOV     R2,A            0/1 COUNT SWITCH
 250  003D  AB                          MOV     R3,A            COUNT
 251  003E  BC 04                       MOV     R4,#4           LOOP COUNTER - 1024
 252  0040  AD                          MOV     R5,A            LOOP COUNTER - 1024
 253  0041  B8 3C                       MOV     R0,#CNTBEG      PTR TO COUNTS
 254                            * CLEAR BIT ARRAY
 255  0043  89 06                       ORL     P1,#START+RECHARG       INITIATE ARRAY RECHARGE CYCLE
 256  0045  99 FE                       ANL     P1,#-1-CLOCK
 257  0047  99 FD                       ANL     P1,#-1-START
 258  0049  89 01               RDCLRB  ORL     P1,#CLOCK
 259  004B  99 FE                       ANL     P1,#-1-CLOCK    CLEAR REMAINING BITS
 260  004D  ED 49                       DJNZ    R5,RDCLRB
 261  004F  EC 49                       DJNZ    R4,RDCLRB
 262                            * FLASH
 263  0051  89 13                       ORL     P1,#FLASH+START+CLOCK   INITIATE ARRAY READ-OUT CYCLE
 264  0053  ED 53                       DJNZ    R5,$            DELAY FOR FLASH TUBE TO FINISH FLASHING
 265  0055  99 EF                       ANL     P1,#-1-FLASH-CLOCK
 266  0057  99 FD                       ANL     P1,#-1-START
 267  0059  BC 04                       MOV     R4,#4           RE-INIT HIGH BYTE OF BIT COUNTER
 268                            * READ ARRAY
 269  005B  0A                  READLP  IN      A,P2            DATA FROM SAMPLE OF PREV LOOP CYCLE
 270  005C  89 08                       ORL     P1,#SAMPLE      DATA FROM CLOCK OF PREV LOOP CYCLE
 271  005E  99 F7                       ANL     P1,#-1-SAMPLE
 272  0060  89 05                       ORL     P1,#CLOCK+RECHARG       400S CIRCUIT DELAY AND POSITIONS
 273  0062  00                          NOP
 274  0063  00                          NOP
 275  0064  99 FB                       ANL     P1,#-1-RECHARG          THE 'IN' TO CAUSE MINIMUM NOISE.
 276  0066  99 FE                       ANL     P1,#-1-CLOCK
 277  0068  1B                          INC     R3              BUMP BAR COUNT
 278  0069  2B                          XCH     A,R3            IF BAR BIT COUNT
 279  006A  96 6D                       JNZ     READ2           ZERO
 280  006C  07                          DEC     A               THEN SET BAR/SPACE COUNT BACK TO 255
 281  006D  2B                  READ2   XCH     A,R3
 282  006E  53 10                       ANL     A,#BARBIT       MASK BAR BIT
 283  0070  2A                          XCH     A,R2            SAVE NEW BIT LEVEL
 284  0071  DA                          XRL     A,R2            IF BIT LEVEL
 285  0072  C6 7D                       JZ      READ6           CHANGED
 286  0074  27                          CLR     A               THEN CLEAR NEW COUNT
 287  0075  2B                          XCH     A,R3            AND
 288  0076  A0                          MOV     @R0,A           STORE OLD COUNT.
```

```
0077  18                       INC    R0             ADJUST COUNT PTR
0078  F8                       MOV    A,R0
0079  D3 FF                    XRL    A,#CNTEND-1
007B  C6 84                    JZ     READEX         EXIT - COUNT AREA FULL
007D  ED 5B          READOB    DJNZ   R5,READLP      LOOP 256 X 4 TIMES
007F  EC 5B                    DJNZ   R4,READLP
LINE  ADDR  B1 B2 B3 B4 ERROR  RDXIT.46P,PORT,UPC=A,E(0,1),FAN=8,13,ADDON 2,5      PAGE 8

0081  FD                       MOV    A,R5           WRITE LAST COUNT
0082  A0                       MOV    @R0,A
0083  18                       INC    R0
0084  89 05          READEX    ORL    P1,#RECHARG+CLOCK
0086  C4 E9                    JMP    CNTEND         GOTO END COUNT BUFFER
LINE  ADDR  B1 B2 B3 B4 ERROR  RDXIT.46P,PORT,UPC=A,E(0,1),FAN=8,13,ADDON 2,5      PAGE 9

                     *
                     * FILTER ELIMINATES AN INVALID COUNT BY ADDING IT INTO THOSE COUNTS
                     * ON EACH SIDE. THIS ASSUMES THAT A BAD ARRAY BIT(S) CAUSED AN
                     * INVALID TRANSITION. THIS INVALID TRANSITION OR COUNT SHOULD
                     * REALLY BE PART OF THE COUNTS ON EACH SIDE OF IT. WITH PRESENT
                     * 2.5/1 OPTICS THE NARROWEST UPC BAR COULD BE AS LOW AS 2.
                     * THEREFORE INVALID COUNTS ARE 0 < BAD COUNT < 2.
                     *
                     *
                     * COUNT      : 0   1   2   3   4   5   6
                     *            :---     ---     ---     ---
                     * VALUE      :   :   :   :   :   :   :   :
                     * BEFORE     : 1 : 3 : 5 : 1 : 6 : 1 : 3 : END
                     *            :   :---:   :---:   :---:   :---- . . .
                     *            :
                     *            :---     ---
                     * VALUE      :   :    :   :
                     * AFTER      : 4 : 13: 3 : END
                     *            :   :---:   :---- . . .
                     *            :
                     *            :
                     *
0088  B8 3C          FILTER    MOV    R0,#CNTBEG     INIT COUNT PTRS
008A  F0                       MOV    A,@R0
008B  C6 B3                    JZ     FILTEX         NO COUNTS
008D  B9 3D                    MOV    R1,#CNTBEG+1   NEXT COUNT PTR
008F  03 FF                    ADD    A,#-2          INVALID COUNT?
0091  F0                       MOV    A,@R0
0092  E6 A0                    JNC    FIL12          (YES)
0094  F1             FILTLP    MOV    A,@R1          IS NEXT COUNT PTR AT END?
0095  C6 B2                    JZ     FILTEND        (YES)
0097  03 FE                    ADD    A,#-2          IS NEXT COUNT < MINIMUM COUNT?
0099  F6 AC                    JC     FILNAT         (NO)
009B  F1                       MOV    A,@R1          THEN NEXT COUNT
009C  60                       ADD    A,@R0          PLUS FIRST COUNT
009D  19                       INC    R1
009E  F6 A3                    JC     FIL14
00A0  61             FIL12     ADD    A,@R1          PLUS COUNT AFTER NEXT COUNT
00A1  E6 A5                    JNC    FIL16
00A3  23 FF          FIL14     MOV    A,#255         (COUNT OVERFLOW - SET TO COUNT LIMIT)
00A5  A0             FIL16     MOV    @R0,A          TO FIRST COUNT
00A6  F1                       MOV    A,@R1          IS NEXT COUNT PTR AT END?
00A7  C6 B2                    JZ     FILTEND        YES
00A9  19                       INC    R1
00AA  04 94                    JMP    FILTLP
00AC  18             FILNAT    INC    R0             NOT BAD COUNT - BUMP FIRST COUNT PTR
00AD  F1                       MOV    A,@R1          MOVE NEXT COUNT
00AE  A0                       MOV    @R0,A          TO FIRST COUNT
00AF  19                       INC    R1             BUMP NEXT COUNT PTR
00B0  04 94                    JMP    FILTLP
00B2  18             FILTEND   INC    R0
00B3  C4 E9          FILTEX    JMP    CNTEND         GOTO END COUNT BUFFER
LINE  ADDR  B1 B2 B3 B4 ERROR  RDXIT.46P,PORT,UPC=A,E(0,1),FAN=8,13,ADDON 2,5      PAGE 10

                     *
                     * ADJUST COUNTS BY 4 TIMES.
                     * BIGGEST COUNT SHOULD BE LESS THAN 64 BEFORE ADJUSTMENT.
                     * MULTIPLY COUNTS BY 4 LIMITING RESULT TO 255.
                     * THIS ALLOWS MORE ACCURACY IN BINARY APPROXIMATION ALGORITHMS
                     * USED IN 'FINDT' AND 'DELTAT'.
                     *
00B5  B8 3C          ADJUST    MOV    R0,#CNTBEG
00B7  F0             ADJLP     MOV    A,@R0          GET COUNT
00B8  C6 C8                    JZ     ADJEX          END
00BA  F7                       RLC    A              TIMES 2
00BB  12 C2                    JB0    ADJ2           VALUE OVERFLOW
00BD  F7                       RLC    A              TIMES 2
00BE  12 C2                    JB0    ADJ2
00C0  04 C4                    JMP    ADJ4
00C2  23 FF          ADJ2      MOV    A,#255         MULTIPLY OVERFLOW - SET COUNT TO MAX VALUE
00C4  A0             ADJ4      MOV    @R0,A          PUT BACK COUNT
00C5  18                       INC    R0
00C6  04 B7                    JMP    ADJLP
00C8  83             ADJEX     RET
LINE  ADDR  B1 B2 B3 B4 ERROR  RDXIT.46P,PORT,UPC=A,E(0,1),FAN=8,13,ADDON 2,5      PAGE 11

                     *
                     * COMPARE OF R4 TO R7.
                     * RETURN ERROR IF = ELSE OK AND CARRY INDICATES WHICH IS LARGER.
                     *
00C9  F0             R4VSR7    MOV    A,@R0          C2
00CA  AC                       MOV    R4,A           R4 = C2
```

```
00CB  37           CPL   A
00CC  17           INC   A
00CD  6F           ADD   A,R7
00CE  C6 D2        JZ    R4R7ERR        R4 = R7
             *     RRC   A              SAVE CARRY
             *     MOV   R1,A
             *     RLC   A
             ** MAKE SURE SMALLER COUNT IS IN R4
             ** AND LARGER COUNT IS IN R7
             *     MOV   A,R4
             *     JC    R4R72          R7 IS LARGER
             *     XCH   A,R7           R4 IS LARGER; SWAP R4/R7
             *     MOV   R4,A
             *R4R72 RR   A              50%
             *     RR    A              25%
             *     ANL   A,#03
             *     JNZ   R4R74
             *     INC   A              MAKE SURE % IS AT LEAST 1
             *R4R74 ADD  A,R4           SMALLER+%
             *     CPL   A
             *     ADD   A,R7           PLUS SMALLER
             *     JNC   R4R7ERR        LARGER <= SMALLER+%; ERROR
             *     MOV   A,R1           RESTORE CARRY
             *     RLC   A
00D0               RETURN
00D2         R4R7ERR RETERR
```

LINE ADDR B1 B2 B3 B4 ERROR MCX11.48P,PUR1,UPC-A,E(0,1),EAN-8,13,ADDON 2,5 PAGE 12

```
00D3               PAGE  256            NEXT PAGE
             *
0100  B8 22  DECODE MOV  R0,#FRAMPTR    INIT FRAMING COUNTS PTR
0102  B0 3D        MOV   @R0,#LPTBEG+1  (SKIP QUIET ZONE COUNT)
0104         DECODLP
              IF DEBUG
              ENDIF
0104  D4 05        CALL  FRAME          FRAME COUNTS, RETURN TYPE INDEX IN R1,
0106               JERR  DECODLP        RETURN COUNT POINTER IN R0.
0108  23 20        MOV   A,#' '
010A  F4 DB        CALL  F1STR          BLANK F1
010C  B4 B0        CALL  CLRBACK        CLEAR BACKWARDS SWITCH
010E  B4 F4        CALL  SETCPTR        INIT CHARACTER BUFFER POINTER
             * INDEX JUMP TABLE VIA R7 FOR DECODE
0110  23 14        MOV   A,#.LOW.DECTAB
0112  6F           ADD   A,R7
0113  B3           JMPP  @A
0114  18     DECTAB DB   .LOW.UPCEAN1   R7=0 UPC-A, EAN-13
0115  53           DB    .LOW.EAN8      R7=1 EAN-8
0116  90           DB    .LOW.UPCEB     R7=2 UPC-E BACKWARD
0117  6E           DB    .LOW.UPCEF     R7=3 UPC-E FORWARD
             *
             * UPC-A OR EAN-13
0118  54 32  UPCEAN1 CALL CHAR6TS       DECODE 6 CHARACTERS - LEFT HALF
011A  54 32        CALL  CHAR6TS        DECODE 6 CHARACTERS - RIGHT HALF
011C               JERR  DECODLP
011E  B8 2E        MOV   R0,#CHARBEG+6  RIGHT HALF INDICATES DIRECTION OF SCAN
0120  94 AE        CALL  DIRIS1
0122               JERR  UELB           MIXED DIRECTION - MIGHT BE BACKWARDS
0124  E6 38        JNC   UELF           FORWARD
0126  B9 34  UELB  MOV   R1,#CHARBEG+11
0128  94 CC        CALL  SWAP           BACKWARDS - SWAP CHARACTERS END-FOR-END
012A  D4 D0        CALL  SETBACK        SET BACKWARDS SWITCH
012C  B8 29        MOV   R0,#CHARBEG
012E  94 C2        CALL  DIRCOMP        COMPLEMENT DIRECTION BITS AFTER SWAP
0130  B8 2F        MOV   R0,#CHARBEG+6
0132  94 AE        CALL  DIRIST
0134               JERR  DECODERR       DIRECTION SHOULD BE 'ALL SAME'
0136  F6 0C        JC    DECODERR       DIRECTION SHOULD BE 'LEFT'
0138  94 47  UELF  CALL  DIRCHKE        GET EAN-13 F1 CHAR PER DIRECTION PATTERN
013A               JERR  DECODERR       SHOULD FIND A F1 OF '0' FOR UPC-A
013C  B8 A3        MOV   R0,#.LOW.CHKA13 13 DIGIT FIELD CHECK MULTIPLIER TABLE
013E  74 82        CALL  MODCHK         CHECK MOD CHECK CHARACTER
0140               JERR  DECODERR
             * UPC-A OR EAN-13: IF F1 IS 0 THEN EAN ELSE UPC.
0142  B8 28        MOV   R0,#CHARF1
0144  F0           MOV   A,@R0
0145  D3 30        XRL   A,#'0'         F1 = 0?
0147  96 4F        JNZ   UELEAN1        NO - EAN LONG
0149  B0 20        MOV   @R0,#' '       UPC LONG - BLANK F1
014B  23 02        MOV   A,#LONG+UPC
014D  24 B4        JMP   DECUT
014F  23 03  UELEAN1 MOV A,#LONG+EAN
0151  24 B4        JMP   DECUT
             *
             * EAN-8
```

LINE ADDR B1 B2 B3 B4 ERROR MCX11.48P,PUR1,UPC-A,E(0,1),EAN-8,13,ADDON 2,5 PAGE 13

```
0153  54 36  EAN8  CALL  CHAR4TS        DECODE 4 CHARACTERS - LEFT HALF
0155  54 36        CALL  CHAR4TS        DECODE 4 CHARACTERS - RIGHT HALF
0157               JERR  DECODERR
0159  B8 29        MOV   R0,#CHARBEG    BOTH HALVES INDICATE DIRECTION
015B  94 AE        CALL  DIRIS1
015D               JERR  DECODERR       DIRECTION SHOULD BE 'ALL SAME'
015F  F6 67        JNC   E8F            FORWARD
0161  B9 30        MOV   R1,#CHARBEG+7
0163  94 CC        CALL  SWAP           BACKWARDS - SWAP CHARACTERS END-FOR-END
0165  D4 D0        CALL  SETBACK        SET BACKWARDS SWITCH
0167  B8 A1  E8F   MOV   R0,#.LOW.CHKE8 EAN-8 CHECK MULTIPLIER TABLE
0169  74 82        CALL  MODCHK         CHECK MOD CHECK CHARACTER
016B  23 01        MOV   A,#EAN+SHORT
```

```
016D  24 B4                JMP    DECOUT
                 *
                 * UPC-E(0,1) FORWARDS
016F  54 32      UPCEF     CALL   CHAR6IS          DECODE 6 CHARACTERS - ZERO SUPRESSED FORWARDS
0171                       JERR   UEF2
0173  94 07                CALL   DIRCHK7          GET #SYS/CHECK CHARS PER DIRECTION PATTERN
0175                       JOK    UECHK            DIRECTION OK, GOTO DO MOD CHECK
0179  B8 27      UEF2      MOV    R0,#FRAMPTR      MIGHT BE A BACKWARDS SCAN CONFUSED
017B  F0                   MOV    A,@R0            BY A '6' AS THE 1ST (LEFT) CHARACTER.
017C  03 02                ADD    A,#2             ADJUST FRAMING POINTER AND
017E  A8                   MOV    R0,A
017F  D4 0F                CALL   FRAMP2           TRY TO FRAME A BACKWARDS UPC SHORT.
0181                       JERR   DECDERR          NO-GO
0183  34 C8                CALL   UPCDB            DECODE UPC-E BACKWARDS
0185                       JERR   DECDERR
0187  B8 29                MOV    R0,#CHARBEG      IF EVERYTHING ELSE WORKED THEN THE
0189  F0                   MOV    A,@R0            LEFT CHARACTER SHOULD BE A FORWARD '6'
018A  D3 36                XRL    A,#'6'
018C  96 BC                JNZ    DECDERR
018E  24 94                JMP    UECHK
                 *
                 * UPC-E(0,1) BACKWARDS
0190  34 C8      UPCEB     CALL   UPCDB            DECODE UPC-E BACKWARDS
0192                       JERR   DECDERR
0194  B8 2E      UECHK     MOV    R0,#CHARBEG+5    PER 6TH CHAR'S VALUE DO MOD10 CHECK
0196  F0                   MOV    A,@R0
0197  53 7F                ANL    A,#127           MASK OFF DIRECTION BIT
0199  03 CD                ADD    A,#-'3'
019B  E6 AE                JNC    UEC012           DIGIT 6 = 0, 1, OR 2
019D  C6 A6                JZ     UEC3             DIGIT 6 = 3
019F  07                   DEC    A
01A0  C6 AA                JZ     UEC4             DIGIT 6 = 4
01A2  BE A8                MOV    R6,#.LOW.CHK259  CHECK MULTIPLIER TABLE
01A4  24 B0                JMP    UECC
01A6  BE B7      UEC3      MOV    R6,#.LOW.CHK23   CHECK MULTIPLIER TABLE
01A8  24 B0                JMP    UECC
01AA  BE AC      UEC4      MOV    R6,#.LOW.CHK24   CHECK MULTIPLIER TABLE
01AC  24 B0                JMP    UECC
01AE  BE B4      UEC012    MOV    R6,#.LOW.CHK2012      CHECK MULTIPLIER TABLE
01B0  74 82      UECC      CALL   MODCHK           CHECK MOD CHECK CHARACTER
01B2  23 00                MOV    A,#UPC+SHORT     R1=4 UPC-E FORWARD
01B4             DECOUT    JERR   DECDERR
01B6  F4 00                CALL   TIPESIR
01B8  F4 00                CALL   DECADD           TRY TO DECODE AN ADDON CODE
LINE  ADDR  B1 B2 B3 B4 ERROR   RDXII.48P,PORI,UPC-A,E(0,1),EAN-8,13,ADDON 2,5          PAGE   14

01BA             DECDON
                  IF DEBUG
                  ENDIF
                           RETOK
01BA
01BC             DECDERR
                 * SET CHARTIP TO INVALID AND EOD THE 2 DATA BUFFERS
01BC  B9 27                MOV    R1,#CHARTYP
01BE  B1 2A                MOV    @R1,#'*'         '*' INDICATES BAD SCAN
01C0  19                   INC    R1
01C1  B1 00                MOV    @R1,#EOD         EOD WITH NO DATA FOR MAIN BARCODE
01C3  94 DC                CALL   CHADEOD          EOD WITH NO DATA FOR ADDON
                  IF DEBUG
                  ENDIF
01C5                       RETERR
                 *
                 *
                 *
01C8  B4 E4      UPCDB     CALL   SETCPTR          INIT CHARACTER BUFFER POINTER
01CA  54 32                CALL   CHAR6IS          DECODE 6 CHARACTERS - ZERO SUPRESSED BACKWARDS
01CC                       JERR   UPCDBX
01CE  D4 00                CALL   SETBACK
01D0  B9 2E                MOV    R1,#CHARBEG+5
01D2  94 CC                CALL   SWAP             BACKWARDS - SWAP CHARACTERS END-FOR-END
01D4  B8 29                MOV    R0,#CHARBEG
01D6  94 C2                CALL   DIRCMP           COMPLEMENT DIRECTION BITS AFTER SWAP
01D8  84 07                JMP    DIRCHK7          GET #SYS/CHECK CHARS PER DIRECTION PATTERN
01DA  83         UPCDBX    RET
LINE  ADDR  B1 B2 B3 B4 ERROR   RDXII.48P,PORI,UPC-A,E(0,1),EAN-8,13,ADDON 2,5          PAGE   15

01DB                       PAGE   256              NEXT PAGE
                 *
                 * TRANSMIT FORMATTED BARCODE TO TERMINAL, SKIP BLANKS,
                 * APPEND ASCII MOD 10 HASH CHARACTER, AND WAIT FOR RESPONSE.
                 *
0200             SEND
                  IF DEBUG
                  ENDIF
0200  BA 00                MOV    R2,#0            CLEAR HASH TOTAL
0202  B8 27                MOV    R0,#CHARS        SEND DECODED BARCODE
0204  B4 9E                CALL   SENDBUF
0206  B8 36                MOV    R0,#CHARADD      SEND DECODED ADDON BARCODE
0208  B4 9E                CALL   SENDBUF
020A  FA                   MOV    A,R2             SEND ASCII HASH TOTAL
020B  53 0F                ANL    A,#15
020D  43 30                ORL    A,#'0'           ADJUST TO ASCII
020F  B4 5B                CALL   OUTCHAR
0211  B4 55                CALL   OUTLINE
                 * 0.5 SEC TIMEOUT TO RECEIVE RESPONSE
0213  BC 18                MOV    R4,#24           TIME LIMIT FOR RESPONSE TO DATA
0215  B4 35      SENDPLP   CALL   GETCHAR          IF RECEIVE CHAR
0217  D3 06                XRL    A,#ACK           IS 'GOOD'
0219  C6 30                JZ     SENDOK           THEN EXIT OK
021B  D3 06                XRL    A,#ACK           (MASK ACCUM BACK TO WHAT IT WAS)
```

```
0210  D3 15          XRL     A,#BAR          TO 'BAD'
021F  96 27          JNZ     SENDR4
0221                 JOEM    SENDFRR         AND NOT PORTABLE THEN ERROR
0223  94 1A          CALL    DELAY1          ELSE DELAY 10MS THEN RE-SEND DATA
0225  44 00          JMP     SEND
0227         SENDR4  JPORT   SENDRLP         DON'T TIMEOUT IN PORTABLE
0229  FD 15          DJNZ    R5,SENDRLP      OUT OF TIME?
022B  EC 15          DJNZ    R4,SENDRLP      OUT OF TIME?
022D         SENDFRR RETERR                  EXIT WITH ERROR
0230         SENDOK  RETOK                   EXIT WITH NO ERROR
LINE  ADDR  B1 B2 B3 B4 ERROR   MDXIT.46P,PORT,OPC=A,E(0,1),FAN=8,13,ADDON 2,5      PAGE  16

                     *
                     * DECODE THE COUNTS INTO CHARACTERS
                     *
                     *
                     *       :<-------- T1 -------->:
                     *       :                      :
                     *       ---------------------------------------------
                     *       :   C1    :    C2   :    C3    :    C4    :
                     *       ---------------------------------------------
                     *                 :                    :
                     *                 :<------- T2 ------->:
                     *
                     *
0232  54 49  CHAR6IS CALL    CHAR            DECODE 6 CHARACTERS
0234  54 49          CALL    CHAR
0236  54 49  CHAR4IS CALL    CHAR            DECODE 4 CHARACTERS
0238  54 49          CALL    CHAR
023A  54 49          CALL    CHAR
023C  54 49          CALL    CHAR
023E  F8             MOV     A,R0
023F  03 05          ADD     A,#5            BUMP COUNT PTR 5 COUNTS
0241  A8             MOV     R0,A            TO SKIP CENTER GUARD BARS.
0242  83             RET
                     *
0243  54 47  CHAD3IS CALL    CHART
0245  54 47  CHAD2IS CALL    CHART
0247  18     CHART   INC     R0
0248  18             INC     R0
0249         CHAR    JERR    CHAREX
024B  74 00          CALL    FINDT
024D  C8             DEC     R0
024E  C8             DEC     R0
024F                 JERR    CHARERR         INVALID COUNT IN CHARACTER
0251  C8             DEC     R0
0252  C8             DEC     R0
0253  94 4A          CALL    DELTAS
0255                 JERR    CHARER1
0257  FE             MOV     A,R6
0258  AD             MOV     R5,A            R5 = T1
0259  94 4A          CALL    DELTAS
025B                 JERR    CHARERR
025D  FE             MOV     A,R6            R6 = T2
025E  D3 05          XRL     A,#5
0260  C6 82          JZ      C1EQ1           T2 = 5
0262  FD             MOV     A,R5
0263  D3 02          XRL     A,#2
0265  C6 82          JZ      C1EQ1           T1 = 2
0267  FD             MOV     A,R5
0268  D3 05          XRL     A,#5
026A  C6 A5          JZ      C3EQ1           T1 = 5
026C  FE             MOV     A,R6
026D  D3 02          XRL     A,#2
026F  C6 A5          JZ      C3EQ1           T2 = 2
0271  FD             MOV     A,R5
0272  D3 03          XRL     A,#3
0274  96 99          JNZ     CHAR2           T1 = 4
LINE  ADDR  B1 B2 B3 B4 ERROR   MDXIT.46P,PORT,OPC=A,E(0,1),FAN=8,13,ADDON 2,5      PAGE  17

0276  C8             DEC     R0              T1 = 3, COMPARE C1 VS. C2, 12 OR 21, TO TELL
0277  C8             DEC     R0              THE RIGHT 1/7'S AND LEFT 2/8'S APART
0278  F0             MOV     A,@R0           C1
0279  AF             MOV     R7,A            R7 = C1
027A  18             INC     R0              C2
027B  14 C9          CALL    R4VSR7          COMPARE LARGER-25% VS SMALLER
027D  18             INC     R0              (LEAVE R0 POINTING AT C3)
027E                 JERR    CHARERR
0280  F6 8F          JC      C2EQ1
0282  B9 01  C1EQ1   MOV     R1,#1           C1 = 1
0284  FD             MOV     A,R5
0285  07             DEC     A
0286  AA             MOV     R2,A            C2 = T1-C1
0287  37             CPL     A
0288  17             INC     A
0289  6E             ADD     A,R6
028A  AB             MOV     R3,A            C3 = T2-C2
028B  6D             ADD     A,R5            C4 = 7-T1-C3
028C  44 B1          JMP     CHAR4
028E  BA 01  C2EQ1   MOV     R2,#1           C2 = 1
0290  FD             MOV     A,R5
0291  07             DEC     A
0292  A9             MOV     R1,A            C1 = T1-C2
0293  FE             MOV     A,R6
0294  07             DEC     A
0295  AB             MOV     R3,A            C3 = T2-C2
0296  6D             ADD     A,R5            C4 = 7-T1-C3
0297  44 B1          JMP     CHAR4
```

```
0299  18          CHAR2   INC     R0           T1 = 4, COMPARE C3 VS. C4, 12 OR 21, TO TELL
029A  F0                  MOV     A,@R0        THE LEFT 1/7'S AND RIGHT 2/8'S APART
029B  AF                  MOV     R7,A         R7 = C4
029C  C8                  DEC     R0           C3
029D  14 C9               CALL    R4VSR7       COMPARE LARGER-25% VS SMALLER
029F                      JERR    CHARERR      75%LARGER < SMALLER = ERROR
02A1  BB 02               MOV     R3,#2        C3 = 2 UNLESS
02A3  E6 A7               JNC     C3EQ2        C3 > C4 THEN C3 = 2
02A5  BB 01       C3EQ1   MOV     R3,#1        C3 = 1
02A7  FB          C3EQ2   MOV     A,R3
02A8  37                  CPL     A
02A9  17                  INC     A
02AA  6E                  ADD     A,R6
02AB  AA                  MOV     R2,A         C2 = 12-C3
02AC  37                  CPL     A
02AD  17                  INC     A
02AE  6D                  ADD     A,R5
02AF  A9                  MOV     R1,A         C1 = 11-C2
02B0  6E                  ADD     A,R6         C4 = 7-C1-T2
02B1  37          CHAR4   CPL     A
02B2  03 07               ADD     A,#7
02B4  AC                  MOV     R4,A         LACK OF 'INC A' ZERO JUSTIFIES MODULE SIZE
02B5  C9                  DEC     R1           ZERO JUSTIFY MODULE SIZE
02B6  CA                  DEC     R2           ZERO JUSTIFY MODULE SIZE
02B7  CB                  DEC     R3           ZERO JUSTIFY MODULE SIZE
                  *
                  * CREATE TABLE LOOKUP MASK FROM 2-BIT VALUE OF C1, C2, C3, AND C4
                  * MASK IS R7=B0  C1C1 C2C2 C3C3 C4C4
                  * WHERE CACH HAS A VALUE OF 0 TO 3 WHICH REPRESENTS A TRUE COUNT WIDTH
LINE  ADDR  B1 B2 B3 B4 ERROR   RDX11.48P,PORT,UPC=A,E(0,1),FRN=8,13,ADDON 2,5          PAGE  18

                  * OF 1-4 MODULES.
                  *
02B8  F9                  MOV     A,R1         C1 VALUE OF 0-3
02B9  E7                  RL      A            SHIFT C1 LEFT 2 BITS
02BA  E7                  RL      A
02BB  4A                  ORL     A,R2         C2
02BC  E7                  RL      A
02BD  E7                  RL      A
02BE  4B                  ORL     A,R3         C3
02BF  E7                  RL      A
02C0  E7                  RL      A
02C1  4C                  ORL     A,R4         C4
02C2  AD                  MOV     R5,A         LOOK-UP MASK TO R5
02C3  BE 48               MOV     R6,#.LOW.CHRTABF       SEARCH FOR FORWARD CHARACTER
02C5  74 32               CALL    TABSRCH
02C7                      JNK     CHAR6
02CB  BE 55               MOV     R6,#.LOW.CHRTABB       SEARCH FOR BACKWARD CHARACTER
02CD  74 32               CALL    TABSRCH
02CF  43 80               ORL     A,#BACKCHR   TURN ON BACKWARDS BIT IN CHARACTER
02D1  44 D6               JMP     CHAR6
02D3  18          CHARER1 INC     R0
02D4  23 2A       CHARERR MOV     A,#'*'       BAD CHARACTER VALUE
                  IF DEBUG
                  ENDIF
02D6  AA          CHAR6   MOV     R2,A         SAVE CHARACTER
02D7  B9 23               MOV     R1,#CHARPTR  POINT TO CHARACTER BUFFER PTR
02D9  F1                  MOV     A,@R1        GET PTR
02DA  11                  INC     @R1          BUMP CHARACTER PTR
02DB  A9                  MOV     R1,A
02DC  FA                  MOV     A,R2
02DD  A1                  MOV     @R1,A        STORE CHARACTER
02DE  19                  INC     R1           APPEND NEW END
02DF  B1 00               MOV     @R1,#EOD
                  IF DEBUG
                  ENDIF
02E1  18                  INC     R0
02E2  18                  INC     R0           LEAVE R0 POINTING AT C1 OF NEXT CHARACTER
02E3  83          CHARFX  RET
LINE  ADDR  B1 B2 B3 B4 ERROR   RDX11.48P,PORT,UPC=A,E(0,1),FRN=8,13,ADDON 2,5          PAGE  19

02F4                      PAGE    256
                  *
                  *
                  * CONVERT 4 CHARACTER COUNTS TO:
                  *
                  *       R7 = 1 = C1+C2+C3+C4 = 7 MODULE CHARACTER COUNT
                  *       R2 = 2.5T/7 = .35T = 1/4+1/16+1/32+1/64 = 2 MODULE COUNT REFERENCE
                  *       R3 = 3.5T/7 = .50T = 1/2 = 3 MODULE COUNT REFERENCE
                  *       R4 = 4.5T/7 = .64T = 1/2+1/8+1/64 = 4 MODULE COUNT REFERENCE
                  *
0300  BF 00       FINDT   MOV     R7,#0
0302  BE 04               MOV     R6,#4
0304  F0          FINDTLP MOV     A,@R0        ADD 4 COUNTS TOGETHER TO CREATE T
0305  6F                  ADD     A,R7
0306  F6 2F               JC      FINDERR'     ADD OVERFLOW
0308  AF                  MOV     R7,A
0309  18                  INC     R0
030A  EE 04               DJNZ    R6,FINDTLP
030C  97                  CLR     C
030D  67                  RRC     A       T/2
030E  AB                  MOV     R3,A         R3 = T/2
030F  AC                  MOV     R4,A         R4 = T/2
0310  97                  CLR     C
0311  67                  RRC     A       T/4
0312  AA                  MOV     R2,A         R2 = T/4
0313  97                  CLR     C
0314  67                  RRC     A       T/8
```

```
0315  AE              MOV     R6,A
0316  6C              ADD     A,R4
0317  AC              MOV     R4,A                R4 = R4 + T/8
0318  FE              MOV     A,R6
0319  97              CLR     C
031A  67              RRC     A        T/16
031B  AE              MOV     R6,A
031C  6A              ADD     A,R2
031D  AA              MOV     R2,A                R2 = R2 + T/16
031E  FE              MOV     A,R6
031F  97              CLR     C
0320  67              RRC     A        T/32
0321  AE              MOV     R6,A
0322  6A              ADD     A,R2
0323  AA              MOV     R2,A                R2 = R2 + T/32
0324  FE              MOV     A,R6
0325  97              CLR     C
0326  67              RRC     A        T/64
0327  AE              MOV     R6,A
0328  6A              ADD     A,R2
0329  AA              MOV     R2,A                R2 = R2 + T/64
032A  FE              MOV     A,R6
032B  6C              ADD     A,R4
032C  AC              MOV     R4,A                R4 = R4 + T/64
032D                  RETUR
032F          FINDERR RETERR
LINE  ADDR  B1 B2 B3 B4 ERROR   ROX11.48P,PORT1,UPC=A,E(0,1),EAN=8,13,ADDON 2,5          PAGE  20

                      *
                      * SEARCH TABLE AT R0 FOR MATCH ON MASK IN R5.
                      * EACH TABLE IS 10 1-BYTE SEARCH ARGUMENTS.
                      * THE RETURNED VALUE IS THE TABLE INDEX AS AN ASCII '0' TO '9'.
                      *
0332  BF 0A   TABSRCH MOV     R7,#10              TABLE LENGTH
0334  F8              MOV     A,R0                SAVE TABLE ADDR FOR RETURN VALUE CALC
0335  AC              MOV     R4,A
0336  F0      TABSLP2 MOV     A,@R0
0337  A3              MOVP    A,@A                GET TABLE MASK
0338  DD              XRL     A,R5                COMPARE TO BAR CODE CHARACTER MASK
0339  C6 43           JZ      TABSFND
033B  18              INC     R0                  NOT EQUAL - BUMP TABLE INDEX TO NEXT MASK
033C  EF 36           DJNZ    R7,TABSLP2          LOOP THRU N TABLE ENTRIES
033E  23 2A           MOV     A,#'*'
                      IF DEBUG
                      ENDIF
0340                  RETERR
0343  FC      TABSFND MOV     A,R4                SUBTRACT TABLE BEGIN ADDR
0344  37              CPL     A
0345  17              INC     A
0346  68              ADD     A,R0                FROM MATCH ADDR
0347  43 30           ORL     A,#'0'              AND MAKE IT ASCII
                      IF DEBUG
                      ENDIF
0349                  RETUR
                      *
                      * MASK IS THE COUNT'S WIDTH IN MODULES ZERO NORMALIZED WITH
                      * B7,6=C1, B5,4=C2, B4,3=C3, B1,0=C4.
                      *
                      * TABLE OF LEFT SCANNED CHARACTERS              C1234   1123
034B  90      CHRTABF DB      10010000B      0          3211    532
034C  54              DB      01010100B      1          2221    443
034D  48              DB      01001000B      2          2122    334
034E  30              DB      00110000B      3          1411    552
034F  09              DB      00001001B      4          1132    245
0350  18              DB      00011000B      5          1231    354
0351  03              DB      00000011B      6          1114    225
0352  21              DB      00100001B      7          1312    443
0353  12              DB      00010010B      8          1213    334
0354  81              DB      10000001B      9          3112    423
                      *
                      * TABLE OF RIGHT SCANNED CHARACTERS
0355  06      CHRTABR DB      00000110B      0          1123    235
0356  15              DB      00010101B      1          1222    344
0357  51              DB      01010001B      2          2212    433
0358  0C              DB      00001100B      3          1141    255
0359  60              DB      01100000B      4          2311    542
035A  24              DB      00100100B      5          1321    453
035B  C0              DB      11000000B      6          4111    522
035C  48              DB      01001000B      7          2131    344
035D  84              DB      10000100B      8          3121    433
035E  42              DB      01000010B      9          2113    324
                      *
                      * DIRECTION BIT PATTERN FOR UPC-E
035F  38      DIRTABZ DB      111000B        0
LINE  ADDR  B1 B2 B3 B4 ERROR   ROX11.48P,PORT1,UPC=A,E(0,1),EAN=8,13,ADDON 2,5          PAGE  21

0360  34              DB      110100B        1
0361  32              DB      110010B        2
0362  31              DB      110001B        3
0363  2C              DB      101100B        4
0364  26              DB      100110B        5
0365  23              DB      100011B        6
0366  2A              DB      101010B        7
0367  29              DB      101001B        8
0368  25              DB      100101B        9
                      *
                      * DIRECTION BIT PATTERN FOR EAN
0369  00      DIRTABE DB      000000B        0
```

```
036A  0B                               DB      001011B         1
036B  0D                               DB      001101B         2
036C  0E                               DB      001110B         3
036D  13                               DB      010011B         4
036E  19                               DB      011001B         5
036F  1C                               DB      011100B         6
0370  15                               DB      010101B         7
0371  16                               DB      010110B         8
0372  1A                               DB      011010B         9
                               *
                               * DIRECTION BIT PATTERN FOR ADDON=5
0373  18                       DIRTAB5 DB      11000B          0
0374  14                               DB      10100B          1
0375  12                               DB      10010B          2
0376  11                               DB      10001B          3
0377  0C                               DB      01100B          4
0378  06                               DB      00110B          5
0379  03                               DB      00011B          6
037A  0A                               DB      01010B          7
037B  09                               DB      01001B          8
037C  05                               DB      00101B          9
LINE  ADDR  B1 B2 B3 B4 ERROR   RDXII.48P,PORT,UPC=A,E(0,1),EAN=8,13,ADDON 2,5          PAGE   22

                               *
                               * CALCULATES UPC MOD 10 CHECK AND COMPARES RESULT WITH DECODED
                               * CHECK DIGIT.  WAITING FACTOR IS IN TABLE ONE ON THIS PAGE
                               *
                               * ON ENTRY:
                               * R1 POINTS TO BUFFER AREA CONTAINING, FROM LEFT TO RIGHT, DATA
                               * DIGITS, CHECK DIGIT, END.
                               * R0 POINTS TO A TABLE OF WAITING FACTORS.
                               *
                               * ON EXIT:
                               * IF CHECKS MATCH THEN NO ERROR SET ELSE ERROR SET.
                               *
037D  B9 36                    MCHKAD5 MOV     R1,#CHARADD     DO CHECK ON ADDON CODE AREA
037F  AD                               MOV     R5,A            CHECK SEED PASSED IN ACCUMALATOR
0380  64 86                            JMP     MCHKLP2
0382  B9 28                    MODCHK  MOV     R1,#CHARF1
0384  BD 00                            MOV     R5,#0           CLEAR CHECK BUCKET
0386  F0                       MCHKLP2 MOV     A,@R0           GET WAITING FACTOR FOR THIS CHARACTER
0387  A3                               MOVP    A,@A
0388  C6 91                            JZ      MCHK2           SKIP IF FACTOR IS ZERO
038A  AF                               MOV     R7,A            USE FACTOR AS ADD-LOOP COUNTER
038B  FD                               MOV     A,R5            GET CHARACTER
038C  61                       MCHKLP4 ADD     A,@R1           ACCRUE CHARACTER N TIMES
038D  57                               DA      A
038E  EF 8C                            DJNZ    R7,MCHKLP4
0390  AD                               MOV     R5,A            SAVE CHECK RESULT
0391  F1                       MCHK2   MOV     A,@R1
0392  C6 98                            JZ      MCHK4           END
0394  18                               INC     R0              BUMP TABLE PTR
0395  19                               INC     R1              BUMP CHARACTER STRING PTR
0396  64 86                            JMP     MCHKLP2
0398  FD                       MCHK4   MOV     A,R5            CHECK SHOULD BE ZERO
0399  53 0F                            ANL     A,#15           MASK OFF ZONE
039B                                   OK
039C  C6 A0                            JZ      MCHKEX
039E                                   ERR
03A0                           MCHKEX
                                IF DEBUG
                                ENDIF
03A0  83                               RET
                               *
                               * CHECK MULTIPLIER TABLES ON SAME PAGE AS 'MODCHK'
                               *
03A1  00 03                    CHKE8   DB      0,3                     ; 0,3,1,3,1,3,1,3,1
03A3  01 03 01 03              CHKA13  DB      1,3,1,3,1               ; 1,3,1,3,1,3,1,3,1,3,1,3,1
03A7  01
03A8  03 01 03 01              CHK259  DB      3,1,3,1                 ; 3,1,3,1,3,1,3,1
03AC  03 01 03 01              CHK24   DB      3,1,3,1,3,3,0,1         ; 3,1,3,1,3,3,0,1
03B0  03 03 00 01
03B4  03 01 03                 CHK2012 DB      3,1,3                   ; 3,1,3,3,1,3,1,1
03B7  03 01 03 01              CHK23   DB      3,1,3,1,1,3,0,1         ; 3,1,3,1,1,3,0,1
03BB  01 03 00 01
                               *
03BF  03 09 03 09              CHKAD5  DB      3,9,3,9,3               ADDON=5 CHECK WEIGHTING FACTORS
03C3  03
LINE  ADDR  B1 B2 B3 B4 ERROR   RDXII.48P,PORT,UPC=A,E(0,1),EAN=8,13,ADDON 2,5          PAGE   23

                               *
                               * THIS ROUTINE DOES THE MOD CHECK ON ADDON=2 CODE
                               * THE BINARY RESULT OF A MOD4 FUNCTION ON THE 2 ADDON=2 DIGITS
                               * SHOULD MATCH THE DIRECTION BIT PATTERN OF THE 2 DIGITS.
                               *
03C4  94 9D                    MCHKAD2 CALL    DIRAD2          GET DIRECTION MASK (R5)
                               * CONVERT 2 ASCII BCD DIGITS OF ADDON=2 CODE TO 1-BYTE BINARY
03C6  B9 36                            MOV     R1,#CHARADD
03C8  F1                               MOV     A,@R1           GET 10'S DIGIT
03C9  53 0F                            ANL     A,#15
03CB  E7                               RL      A
03CC  AA                               MOV     R2,A            R2 = 2(10'S DIGIT)
03CD  E7                               RL      A
03CE  E7                               RL      A
03CF  6A                               ADD     A,R2            2(10'S DIGIT) + 8(10'S DIGIT)
03D0  19                               INC     R1
03D1  61                               ADD     A,@R1           10(10'S DIGIT) + 1'S DIGIT
03D2  53 03                            ANL     A,#3            MOD4
03D4  DD                               XRL     A,R5            COMPARE TO DIRECTION BIT PATTERN
03D5  96 D9                            JNZ     MAD2ERR
```

```
0307                    RETOK
0309           MADZERR  RETERR
                        *
                        * SEND DATA IN ROM TABLE POINTED TO BY R1
                        * DATA MUST BE ON SAME PAGE AS THIS ROUTINE
                        *
03DC  F9       OUTTAB   MOV   A,R1        R1 IS POINTER TO ROM DATA TO SEND
03DD  A3                MOVP  A,@A        GET CHAR @R1 ON THIS ROM PAGE
03DE  C6 E5             JZ    OUTABEX     UNTIL EOD
03E0  94 5B             CALL  OUTCHAR     SEND IT
03E2  19                INC   R1
03E3  64 DC             JMP   OUTTAB
03E5  83       OUTABEX  RET
                        *
03E6  4C 31 30 00  IDMESG DB  'L10',EOD
LINE  ADDR  B1 B2 B3 B4 ERROR  MDXII.46P,PORT,OPC=A,E(O,1),FAN=R,13,ADDON 2,5        PAGE  24

03EA                    PAGE  256         NEXT PAGE
                        *
                        * UTILITY ROUTINES
                        *
0400  B8 C8    BEEP     MOV   R0,#200     BEEP ON/OFF FOR 100MS
0402  89 60    BEEPLP   ORL   P1,#BEEPER  BEEP ON FOR 100US
0404  BF 12             MOV   R7,#18
0406  EF 06             DJNZ  R7,$
0408  99 7F             ANL   P1,#-1-BEEPER  BEEP OFF FOR 380US
040A  00                NOP
040B  BF 4B             MOV   R7,#75
040D  EF 0D             DJNZ  R7,$
040F  E8 02             DJNZ  R0,BEEPLP   BEEPED FOR 100MS?
0411  83                RET
                        *
                        *
                        *
0412  23 32    DELAY50  MOV   A,#50
0414  84 1C             JMP   DELAY
0416  23 04    DELAY4   MOV   A,#4
0418  84 1C             JMP   DELAY
041A  23 01    DELAY1   MOV   A,#1
041C  AD       DELAY    MOV   R5,A        PASSED COUNT OF 10MS DELAYS
041D  B8 0A    DELP2    MOV   R0,#10      10 TIMES
041F  BF C8    DELP4    MOV   R7,#200     1000US
0421  EF 21             DJNZ  R7,$        EQUALS 10MS
0423  E8 1F             DJNZ  R0,DELP4
0425  ED 1D             DJNZ  R5,DELP2
0427  83                RET
                        *
                        * OUTPUT IN ASCII-HEX THE COUNTS IN MEMORY
                        *
0428  BC 04    DUMPC4   MOV   R4,#4
042A  84 30             JMP   DMPLP2
042C           DUMPCNTS
042C  B9 3C             MOV   R1,#CNTBEG            COUNT ADDR
042E  BC FF             MOV   R4,#255
0430  BB 08    DMPLP2   MOV   R3,#8                 GROUPS PER LINE
0432  BA 04    DMPLP4   MOV   R2,#4                 COUNTS PER GROUP
0434  F1       DMPLP6   MOV   A,@R1
0435  B4 12             CALL  OUTHEX
0437  C6 48             JZ    DUMPEX      '0' CHAR IS END-OF-COUNTS
0439  19                INC   R1
043A  FC 3E             DJNZ  R4,DUMP6
043C  A4 0A             JMP   OUTSP
043E  EA 34    DUMP6    DJNZ  R2,DMPLP6
0440  B4 0A             CALL  OUTSP
0442  EB 32             DJNZ  R3,DMPLP4
0444  B4 55             CALL  OUTLINE
0446  84 30             JMP   DMPLP2
0448  A4 55    DUMPEX   JMP   OUTLINE
LINE  ADDR  B1 B2 B3 B4 ERROR  MDXII.46P,PORT,OPC=A,E(O,1),FAN=R,13,ADDON 2,5        PAGE  25

                        *
                        * ADDS COUNTS @R0 AND @R0+1 CALLED 'T'.
                        * COMPARES THIS RESULT TO THE MODULE REFERENCES CALCULATED BY 'FINDT'.
                        * THEN RETURNS THE WIDTH OF THE 2 COUNTS AS 2, 3, 4, OR 5 MODULES.
                        *
044A  BE 02    DELTAT   MOV   R6,#2       INIT T VALUE
044C  F0                MOV   A,@R0
044D  AF                MOV   R7,A
044E  18                INC   R0
044F  F0                MOV   A,@R0
0450  6F                ADD   A,R7
0451  F6 66             JC    DELTERR     T TOO LARGE - FAIL WITH ERROR
0453  37                CPL   A
0454  17                INC   A
0455  AF                MOV   R7,A
0456  6A                ADD   A,R2
0457  F6 64             JC    DELTOK      T <= 2.5T/7 THEREFORE T = 2
0459  1E                INC   R6
045A  FF                MOV   A,R7
045B  6B                ADD   A,R3
045C  F6 64             JC    DELTOK      T <= 3.5T/7 THEREFORE T = 3
045E  1E                INC   R6
045F  FF                MOV   A,R7
0460  6C                ADD   A,R4
0461  F6 64             JC    DELTOK      T <= 4.5T/7 THEREFORE T = 4
0463  1E                INC   R6          T >  4.5T/7 THEREFORE T = 5
0464           DELTOK   RETOK
0466  83       DELTERR  RET
```

```
LINE  ADDR  B1 B2 B3 B4 ERROR   RDXII.46P,PORT,UPC-A,E(0,1),EAN-8,13,ADDON 2,5           PAGE   26

                                *
                                * USE THE DIRECTION PATTERN OF THE 6 CHARACTERS AT R0 TO LOOK-UP
                                * A CHARACTER; FOR EAN-13 IT IS THE F1 CHARACTER, FOR UPC-E IT IS
                                * THE CHECK CHARACTER.
                                *
      0467  B8 29               DIRCHR2 MOV   R0,#CHARBEG     ADDR
      0469  23 06                       MOV   A,#6            LENGTH
      046B  94 A1                       CALL  DIRCHR          GET DIRECTION MASK
      046D  BE 5F                       MOV   R6,#.LOW.DIRTAB2      UPC-E
      046F  74 32                       CALL  TABSRCH
      0471                              JERR  DIRC12                NOT FOUND - TRY UPC-E(1)
      0473  F4 DF                       CALL  CHK2STR         STORE CHECK DIGIT
      0475  23 30                       MOV   A,#'0'
      0477  E4 DB                       JMP   F1STR           STORE NUMBER SYSTEM NUMBER IN F1
      0479  FD                  DIRC12  MOV   A,R5            COMPLEMENT MASK AND TRY AGAIN
      047A  D3 3F                       XRL   A,#63           LOW 6 BITS ONLY
      047C  AD                          MOV   R5,A
      047D  BE 5F                       MOV   R6,#.LOW.DIRTAB2
      047F  74 32                       CALL  TABSRCH
      0481  F4 DF                       CALL  CHK2STR         STORE CHECK DIGIT
      0483  23 31                       MOV   A,#'1'
      0485  E4 DB                       JMP   F1STR           STORE NUMBER SYSTEM NUMBER IN F1
                                *
                                *
                                *
      0487  B8 29               DIRCHRE MOV   R0,#CHARBEG     ADDR
      0489  23 06                       MOV   A,#6            LENGTH
      048B  94 A1                       CALL  DIRCHR          GET DIRECTION MASK
      048D  BE 69                       MOV   R6,#.LOW.DIRTABE      EAN-13
      048F  74 32                       CALL  TABSRCH
      0491  E4 DB                       JMP   F1STR
                                *
                                *
                                *
      0493  B8 36               DIRAD5  MOV   R0,#CHARADD     ADDR
      0495  23 05                       MOV   A,#5            LENGTH
      0497  94 A1                       CALL  DIRCHR          GET DIRECTION MASK
      0499  BE 73                       MOV   R6,#.LOW.DIRTAB5      ADDON-5
      049B  64 32                       JMP   TABSRCH
                                *
                                * PUT DIRECTION BITS OF N CHARACTERS AT R0 INTO R5
                                *
      049D  B8 36               DIRAD2  MOV   R0,#CHARADD     ADDR
      049F  23 02                       MOV   A,#2            LENGTH
      04A1                      DIRCHR
                                 IF DEBUG
                                 ENDIF
      04A1  AF                          MOV   R7,A            LENGTH PASSED IN ACCUMALATOR
      04A2  BD 00                       MOV   R5,#0           CLEAR DIR BIT BUCKET
      04A4  F0                  DCHRLP2 MOV   A,@R0
      04A5  53 80                       ANL   A,#128          GET CHAR'S DIR BIT
      04A7  4D                          ORL   A,R5            .OR. IT WITH PREVIOUS BUCKET VALUE
      04A8  E7                          RL    A               SHIFT BUCKET LEFT 1 BIT
      04A9  AD                          MOV   R5,A
      04AA  18                          INC   R0
      04AB  EF A4                       DJNZ  R7,DCHRLP2
LINE  ADDR  B1 B2 B3 B4 ERROR   RDXII.46P,PORT,UPC-A,E(0,1),EAN-8,13,ADDON 2,5           PAGE   27

      04AD  83                          RET
LINE  ADDR  B1 B2 B3 B4 ERROR   RDXII.46P,PORT,UPC-A,E(0,1),EAN-8,13,ADDON 2,5           PAGE   28

                                *
                                * SCAN DIRECTION BITS OF CHARACTERS FROM @R0 TO EOD.
                                * IF DIRECTION BITS ARE MIXED THEN RETURN ERROR.
                                * IF ALL LEFT THEN NO ERROR, NO CARRY.
                                * IF ALL 'RIGHT' THEN NO ERROR, CARRY.
                                *
      04AE                      DIRTST
                                 IF DEBUG
                                 ENDIF
      04AE  F0                          MOV   A,@R0
      04AF  C6 BD                       JZ    DIRERR          EOD - FAIL ERROR
      04B1  F7                          RLC   A               1ST CHARACTER'S DIRECTION BIT TO CARRY
      04B2  18                  DIRTSLP INC   R0
      04B3  F0                          MOV   A,@R0           COMPARE DIRECTION BITS OF REST OF CHARACTERS
      04B4  C6 C0                       JZ    DIRTSEX         EOD - FAIL OK
      04B6  F2 BB                       JB7   DIRTS4
      04B8  E6 B2                       JNC   DIRTSLP         'LEFT' SCANNED - FORWARDS
      04BA  A7                          CPL   C               CAUSE DROP-THRU TO 'DIRERR'
      04BB  F6 B2               DIRTS4  JC    DIRTSLP         'RIGHT' SCANNED - BACKWARDS
      04BD                      DIRERR
                                 IF DEBUG
                                 ENDIF
      04BD                              RETERR
      04C0                      DIRTSEX
                                 IF DEBUG
                                 ENDIF
      04C0                              RETOK
                                *
                                * COMPLEMENT DIRECTION BITS FROM @R0 TO EOD
                                *
      04C2                      DIRCOMP
      04C2  F0                  DIRCLP  MOV   A,@R0           GET CHARACTER
      04C3  C6 CB                       JZ    DIRCEX          EOD
      04C5  D3 80                       XRL   A,#128          COMPLEMENT DIRECTION BIT
      04C7  A0                          MOV   @R0,A           PUT CHARACTER
      04C8  18                          INC   R0
```

```
04C9  84 C2              JMP     DIRCLP
04CB  83         DIRCEX  RET
                 *
                 * SWAP BYTES AT R0 END-FOR-END WITH THOSE AT R1
                 *
04CC             SWAP
                  IF DEBUG
                  ENDIF
04CC  B8 29              MOV     R0,#CHARBEG
04CE  F9         SWAPLP  MOV     A,R1
04CF  37                 CPL     A
04D0  17                 INC     A
04D1  68                 ADD     A,R0
04D2  F6 DB              JC      SWAPEX         EXIT WHEN R1 <= R0
04D4  F0                 MOV     A,@R0          (R0) --> A
04D5  21                 XCH     A,@R1          A <--> (R1)
04D6  A0                 MOV     @R0,A          A --> (R0)
04D7  18                 INC     R0
04D8  C9                 DEC     R1
04D9  84 CE              JMP     SWAPLP
LINE  ADDR  B1 B2 B3 B4 ERROR  ROXII.46P,PORT,UPC=A,E(0,1),FAN=R,13,ADDON 2,5      PAGE   29

04DB  83         SWAPEX  RET
                 *
                 *
                 *
04DC  B9 36      CHABUF  MOV     R1,#CHARADD    NULL ADDON CHARACTER BUFFER WITH AN 'EOD'
04DE  B1 00              MOV     @R1,#EOD
04E0  83                 RET

LINE  ADDR  B1 B2 B3 B4 ERROR  ROXII.46P,PORT,UPC=A,E(0,1),FAN=R,13,ADDON 2,5      PAGE   30

04E1                     PAGE    256            NEXT PAGE
                 *
0500  AD         OUTERR  MOV     R5,A
0501  94 0A              CALL    OUTSP
0503  FD                 MOV     A,R5
0504  94 5B      OUTCHS  CALL    OUTCHAR
0506  23 2D      OUTDASH MOV     A,#'-'
0508  84 5B              JMP     OUTCHAR
                 *
                 *
                 *
050A  23 20      OUTSP   MOV     A,#SP
050C  84 5B              JMP     OUTCHAR
                 *
                 *
                 *
050E  94 5B      OUTCLIN CALL    OUTCHAR
0510  A4 55              JMP     OUTLINF
                 *
                 *
                 *
0512  AD         OUTHEX  MOV     R5,A           SAVE ACC.
0513  47                 SWAP    A              CONVERT LOW NIBBLE TO ASCII-HEX
0514  53 0F              ANL     A,#15
0516  03 25              ADD     A,#.LOW.HEXTAB
0518  A3                 MOVP    A,@A           GET ASCII-HEX FROM TABLE
0519  94 5B              CALL    OUTCHAR
051B  FD                 MOV     A,R5           DISPLAY LSB NIBBLE OF ACCUMULATOR
051C  53 0F              ANL     A,#15
051E  03 25              ADD     A,#.LOW.HEXTAB
0520  A3                 MOVP    A,@A
0521  94 5B              CALL    OUTCHAR
0523  FD                 MOV     A,R5           RESTORE ACC.
0524  83                 RET
0525  30 31 32 33 HEXTAB DB      '0123456789ABCDEF'    TABLE ON SAME PAGE AS 'OUTHEX'
0529  34 35 36 37
052D  38 39 41 42
0531  43 44 45 46

LINE  ADDR  B1 B2 B3 B4 ERROR  ROXII.46P,PORT,UPC=A,E(0,1),FAN=R,13,ADDON 2,5      PAGE   31

0535             GETCHAR
                 *
                 * IF DISABLE COMMAND RECEIVED
                 * THEN WAIT FOR ENABLE COMMAND AND RETURN NULL CHARACTER
                 * ELSE IF ENQ THEN SEND ID MESSAGE AND RETURN NULL CHARACTER
                 * ELSE RETURN RECEIVED CHARACTER IN ACCUMULATOR
0535  B9 20              MOV     R1,#INCHAR
0537  27                 CLR     A              CLEAR RECEIVE BUFFER AT SAME TIME
0538  21                 XCH     A,@R1          AS GETTING RECEIVE CHARACTER
0539  D3 13              XRL     A,#DC3         DISABLE CHAR?
053B  C6 4A              JZ      GETCLP2        YES
053D  D3 13              XRL     A,#DC3         (PUT ACCUM BACK THE WAY IT WAS)
053F  D3 05              XRL     A,#ENQ
0541  C6 46              JZ      GETCH2
0543  D3 05              XRL     A,#ENQ         (PUT ACCUM BACK THE WAY IT WAS)
0545  83                 RET                    RETURN - ACCUMULATOR IS RECEIVED CHARACTER
0546  94 51      GETCH2  CALL    OUTID          SEND ID MESSAGE
0548  27                 CLR     A              THEN RETURN WITH NULL CHARACTER
0549  83                 RET
054A  27         GETCLP2 CLR     A              (CLEAR RECEIVE BUFFER)
054B  21                 XCH     A,@R1          THEN WAIT FOR ENABLE CHAR
054C  D3 11              XRL     A,#DC1
054E  96 4A              JNZ     GETCLP2
0550  83                 RET                    RETURN - ACCUMULATOR IS NULL
```

```
LINE  ADDR  B1 B2 B3 B4 ERROR   RDXII.46P,PORT,OPC=R,E(0,1),FAN=R,13,ADDON 2,5      PAGE  32

                        *
      0551  B9 E6       OUTIF   MOV     R1,#.LOW.IDMFSG
      0553  74 0C               CALL    OUTIAD
      0555  23 0D       OUTLINF MOV     A,#CR
      0557  84 5B               CALL    OUTCHAR
      0559  23 0A               MOV     A,#LF
                        *
                        * ADD START BIT, PARITY BIT, AND STOP BIT TO 7-BIT DATA
                        * CHARACTER IN ACCUMULATOR.
                        * SEND AT 1200 BAUD.
                        * BIT TIME IS 833.3US.
                        *
      055B              OUTCHAR
      055B  15                  DIS     I               DISABLE RECEIVE INTERRUPTS
                        * DELAY FOR OTHER END TO FINISH SENDING STOP BIT BEFORE WE
                        * SEND A RESPONSE.
      055C  BF A2               MOV     R7,#162
      055E  EF 5E               DJNZ    R7,$
                        * START BIT
      0560  8A 40               ORL     P2,#TXEN        ENABLE DATA TRANSMIT
      0562  97                  CLR     C               CLEAR PARITY
      0563  9A 7F               ANL     P2,#-1-TXD      0 BIT
      0565  BE 07               MOV     R6,#7           BIT COUNTER - 7 DATA, 1 PARITY
      0567  BF A2               MOV     R7,#162
      0569  EF 69               DJNZ    R7,$            (9+(162+2)*2.5) = 832.5US
                        * DATA BITS
      056B  77          OUTLP   RR      A
      056C  F2 72               JB7     OUT2
      056E  9A 7F               ANL     P2,#-1-TXD      0 BIT
      0570  A4 76               JMP     OUT4
      0572  8A 80       OUT2    ORL     P2,#TXD         1 BIT
      0574  A7                  CPL     C               COMP CARRY EACH TIME A '1' BIT IS SENT
      0575  00                  NOP
      0576  BF A2       OUT4    MOV     R7,#162
      0578  EF 78               DJNZ    R7,$            (9+(162+2)*2.5) = 832.5US
      057A  EE 6B               DJNZ    R6,OUTLP
                        * PARITY BIT
      057C  77                  RR      A               LEAVE ACCUMULATOR THE WAY WE FOUND IT
      057D  E6 83               JC      OUT6
      057F  9A 7F               ANL     P2,#-1-TXD      PARITY BIT IS A '0'
      0581  A4 87               JMP     OUT8
      0583  8A 80       OUT6    ORL     P2,#TXD         PARITY BIT IS A '1'
      0585  00                  NOP
      0586  00                  NOP
      0587  BF A6       OUT8    MOV     R7,#166
      0589  EF 89               DJNZ    R7,$
                        * STOP BIT
      058B  8A 80               ORL     P2,#TXD         1 BIT
      058D  BF A8               MOV     R7,#168
      058F  EF 8F               DJNZ    R7,$            ((168+2)*2.5) = 840.0US
      0591  9A BF               ANL     P2,#-1-TXEN     TRANSMIT DISABLE
      0593  05                  EN      I               ENABLE RECEIVE INTERRUPT
      0594  83                  RET
                        *
                        *
                        *
LINE  ADDR  B1 B2 B3 B4 ERROR   RDXII.46P,PORT,OPC=R,E(0,1),FAN=R,13,ADDON 2,5      PAGE  33

      0595  F0          SENDHEX MOV     A,@R0           END-OF-DATA?
      0596  C6 9D               JZ      SENHEX          YES
      0598  94 12               CALL    OUTHEX          SEND HEX
      059A  18                  INC     R0
      059B  A4 95               JMP     SENDHEX
      059D  83          SENHEX  RET
                        *
                        *
                        *
      059E  F0          SENDBUF MOV     A,@R0           END-OF-DATA?
      059F  C6 AF               JZ      SENDBEX         YES
      05A1  D3 20               XRL     A,#' '          SKIP BLANKS
      05A3  C6 AC               JZ      SENDB4
      05A5  F0                  MOV     A,@R0
      05A6  6A                  ADD     A,R2            ACCRUE HASH TOTAL
      05A7  57                  DA      A
      05A8  AA                  MOV     R2,A
      05A9  F0                  MOV     A,@R0
      05AA  84 5B               CALL    OUTCHAR         SEND CHARACTER
      05AC  18          SENDB4  INC     R0
      05AD  A4 9F               JMP     SENDBUF
      05AF  83          SENDBEX RET
                        *
                        *
                        *
      05B0  B9 26       CLRBACK MOV     R1,#BACKSW
      05B2  B1 00               MOV     @R1,#0
      05B4  83                  RET
LINE  ADDR  B1 B2 B3 B4 ERROR   RDXII.46P,PORT,OPC=R,E(0,1),FAN=R,13,ADDON 2,5      PAGE  34

                        *
                        * INTERRUPT OCCURS ON ZERO LEVEL OF START/STOP ASYNC START BIT
                        * THE ASYNC DATA IS DEMODULATED AS START, 7 DATA, EVEN PARITY.
                        * IT PLACES GOOD CHARACTERS IN THE RECEIVE BUFFER OVERWRITING
                        * ANY OLD CHARACTER.
                        *
```

```
1404                        * THE MAIN PROGRAM POLLS RECEIVE BUFFER FOR DATA = NON-NULL CHARACTER.
1405                        * IF IT IS NECESSARY TO CLEAR (NULL) THE RECEIVE BUFFER, THEN IT MUST
1406                        * DONE IN ONE INDIVISIBLE INSTRUCTION OR DISABLE INTERRUPTS FOR THE
1407                        * TIME REQUIRED. THE FORMER IS PREFERRED USING A 'XCH @R' INSTRUCTION
1408                        * WITH THE ACCUMALATOR NULL.
1409                        *
1410  05B5  99 7F           INT      ANL    P1,#-1-OFFPEP    TURN OFF IN CASE RECEIVE DATA HANGS US UP
1411  05B7  D5                       SEL    RB1              RB1 RESERVED FOR INTERRUPT
1412  05B8  AA                       MOV    R2,A             SAVE ACCUMALATOR
1413                        * START BIT CENTER (ALLOW FOR INT,JMP CYCLES)
1414  05B9  BF 4D           INTLP    MOV    R7,#77           WAIT FOR CENTER OF START BIT
1415  05BB  EF BB                    DJNZ   R7,$             (12+(77*2)*2.5)=415.0US
1416  05BD  86 C1                    JNI    INTDAT           START BIT
1417  05BF  A4 E9                    JMP    INTERR           IGNORE BAD CHARACTERS
1418                        * 1ST DATA BIT CENTER
1419  05C1  97              INTDAT   CLR    C                PARITY FLIP-FLOP
1420  05C2  BE 08                    MOV    R6,#8            7 DATA BITS + 1 PARITY
1421  05C4  BF A3                    MOV    R7,#163          WAIT FOR CENTER OF NEXT BIT
1422  05C6  EF C6                    DJNZ   R7,$             (7+(163*2)*2.5)=832.5US
1423                        * EACH DATA BIT CENTER
1424  05C8  86 CF           INTDLP   JNI    INTDA10
1425  05CA  43 01                    ORL    A,#1             '1' BIT RECEIVED
1426  05CC  A7                       CPL    C                TOGGLE PARITY
1427  05CD  A4 D4                    JMP    INTDA14
1428  05CF  53 FE           INTDA10  ANL    A,#-1-1          '0' BIT RECEIVED
1429  05D1  00                       NOP
1430  05D2  00                       NOP
1431  05D3  00                       NOP
1432  05D4  00              INTDA14  NOP
1433  05D5  77                       RR     A                SHIFT BIT AROUND FOR NEXT
1434  05D6  BF A0                    MOV    R7,#160          WAIT FOR CENTER OF NEXT BIT
1435  05D8  EF D8                    DJNZ   R7,$             (13+(160*2)*2.5)=832.5US
1436  05DA  EE C8                    DJNZ   R6,INTDLP
1437                        * STOP BIT CENTER (15+(160*2)*2.5)=837.5US
1438  05DC  F6 E9                    JC     INTERR  PARITY ERROR - EVEN PARITY WILL DROP THRU ON BREAK
1439  05DE  53 7F                    ANL    A,#127           MASK OFF PARITY
1440  05E0  AB                       MOV    R3,A             SAVE RECEIVED CHARACTER
1441  05E1  D3 03                    XRL    A,#ETX           IF RESET CHARACTER
1442  05E3  C6 EB                    JZ     INTRST           GOTO RESTART PROGRAM
1443  05E5  B9 20                    MOV    R1,#INCHAR       ELSE
1444  05E7  FB                       MOV    A,R3
1445  05E8  A1                       MOV    @R1,A            STORE RECEIVED CHARACTER IN RECEIVE BUFFER
1446  05E9  FA              INTERR   MOV    A,R2             RESTORE ACCUMALATOR
1447  05EA  93                       RETR
1448                        * SET UP STACK FOR 'RETR' SO RETURNS TO ADDRESS ZERO OF PROGRAM
1449                        * WITH PSW C, AC, F0, AND BS ALL ZERO.
1450                        * 'RETR' REQUIRED TO ALLOW ANY MORE INTERRUPTS.
1451  05EB  B9 08           INTRST   MOV    R1,#STACK        POINT TO RETURN STACK
1452  05ED  27                       CLR    A
1453  05EE  A1                       MOV    @R1,A            SET RETURN PC

LINE  ADDR  B1 B2 B3 B4 ERROR   RDXIL.46P,POPI,UPC=R,E(0,1),FAN=8,13,ADDON 2,5          PAGE   35

1454  05EF  19                       INC    R1
1455  05F0  A1                       MOV    @R1,A            SET RETURN PSW, PC
1456  05F1  17                       INC    A                BUMP STACK POINTER
1457  05F2  D7                       MOV    PSW,A            SET STACK POINTER
1458  05F3  93                       RETR                     (SP)<==(SP-1) PC<==((SP)) (PSW4-7)<==((SP))

LINE  ADDR  B1 B2 B3 B4 ERROR   RDXIL.46P,POPI,UPC=R,E(0,1),FAN=8,13,ADDON 2,5          PAGE   36

1460                        *
1461  05F4  B9 23           SETCPTR  MOV    R1,#CHARPTR      INIT CHARACTER DECODE POINTER
1462  05F6  B1 29                    MOV    @R1,#CHARBEG
1463  05F8  83                       RET
1464                        *
1465                        *
1466                        *
1467  05F9  B9 23           SETAPTR  MOV    R1,#CHARPTR      INIT CHARACTER DECODE POINTER
1468  05FB  B1 36                    MOV    @R1,#CHARADD
1469  05FD  83                       RET

LINE  ADDR  B1 B2 B3 B4 ERROR   FLXIL.46P,POPI,UPC=R,E(0,1),FAN=8,13,ADDON 2,5          PAGE   37

1471  05FE                           PAGE   256
1473                        *
1474  0600  B9 26           SETBACK  MOV    R1,#PACKSW
1475  0602  B1 FF                    MOV    @R1,#255
1476  0604  83                       RET

LINE  ADDR  B1 B2 B3 B4 ERROR   RDXIL.46P,POPI,UPC=R,E(0,1),FAN=8,13,ADDON 2,5          PAGE   38

1478                        *
1479                        *
1480                        * WHILE NOT ERROR
1481                        *              IF PTR > EOD=(3+24+5)
1482                        *              THEN ERROR ELSE
1483                        *                                \
1484                        *                                 \
1485                        *                                  \
1486                        *                           G(+24+5+24)T
1487                        *                              / \
1488                        *                             /   \
1489                        *                            /     \
```

```
                                *                 /   G(+24)
                                *                /   /  \
                                *               /   /    \
                                *              /   /      \          THE TREE LOOKS FOR OUTSIDE FRAMING
                                *             /   /'  G(+26)         OF THE COUNTS WORKING TOWARDS THE
                                *            /   /   /  \            CENTER, IE., CHECK FOR LEFT GUARD,
                                *           /   /   /    \           RIGHT GUARD, AND THEN CENTER GUARD
                                *          /   /   /      \          OF LARGEST BARCODE 1ST. THEN TRY
                                *       G(+10+5+16)T     UPC-A       NEXT LARGEST BARCODE.
                                *          /  \          EAN-13
                                *         /    \
                                *        /      \
                                *       /   G(+16)
                                *      /   /  \                      NOTE:
                                *     /   /    \                     THE DIRECTION OF A UPC-E CODE
                                *    /   /      \                    IS AMBIGUOUS WHEN THE 1ST (LEFT-
                                *   /   /   G(+16)                   MOST) CHARACTER IS A 4 OR 6. BY
                                *  /   /   /  \                      FRAMING A FORWARD CODE 1ST IT IS
                                *  /   /   /    \                    POSSIBLE ON A DECODE ERROR TO RE
                                *  /   /   /      EAN-8              FRAME CORRECTLY.
                                *   G(+24+2)T
                                *   /  \
                                *  /    \
                                * /  G(±24)                          G = GUARD FUNCTION
                                *  /   /  \                                  FINDS 3 GUARD BARS @R1.
                                * /   /    \                                 RETURNS PTR TO RIGHT GUARD
                                * G(+2)     \                                BAR. RETURNS ERROR IF NOT
                                *  / \     UPC-E                             GUARD BARS.
                                * /   \    FORWARD
                                * /    \
                                * PTR+1  UPC-E                       T = TEST FOR THAT MANY COUNTS
                                *        BACKWARD                        BETWEEN PTR AND EOC.
                                *
                                * ENDWHILE
                                *
                                *
                                *               DECISION TREE FOR DETERMINING BARCODE TYPE
                                *
LINE  ADDR  B1 B2 B3 B4 ERROR   ROXII.48P,POP1,UPC-A,E(0,1),EAN-8,13,ADDON 2,5          PAGE   39

                                *
                                *
                                *       Q = (1) QUIET ZONE              G = (3) END GUARD BARS
                                *       A = (3) ADDON GUARD BARS        N = (4) NUMERIC DIGIT
                                *       C = (5) CENTER GUARD BARS       D = (2) ADDON DELINEATOR
                                *       Z = (6) ZERO SUPPRESSED CENTER GUARD BARS
                                * (N) = NUMBER OF COUNTS
                                *
                                * UPC-A/EAN-13            QGNNNNNNCNNNNNNGQ
                                * UPC-E FORWARD           QGNNNNNNZQ
                                * UPC-E BACKWARD          QZNNNNNNGQ
                                * EAN-8                   QGNNNNCNNNNGQ
                                * ADDON-2                 QANDNQ
                                * ADDON-5                 QANDNDNDNDNQ
                                *
                                * THE BARCODE COUNTS ARE SCANNED TO FIND THE 'G' AND 'C' PATTERN.
                                * FROM THIS PATTERN A PARTICULAR BARCODE FORMAT IS ASSUMED.
                                * THE ABOVE DECISION TREE IS USED TO IDENTIFY THE PATTERN.
                                *
      0005  B8 25               FRAME   MOV     R0,#EODPTR      GET EODPTR FOR END-OF-COUNTS TESTS
      0007  F0                          MOV     A,@R0
      0008  AA                          MOV     R2,A
      0009  B8 22               FRAMLP4 MOV     R0,#FRAMPTR     PTR IS SAVED TO ALLOW FRAMING RE-SEARCHES
      000B  F0                          MOV     A,@R0           FROM POSITION OF LAST FRAME
      000C  A9                          MOV     R1,A            CURRENT FRAMING PTR TO R1
                                * ENOUGH COUNTS FOR ANY KIND OF BARCODE?
      000D  F9                  FRAMLP6 MOV     A,R1
      000E  37                          CPL     A               DON'T NEED 'INC A' BECAUSE OF R2, # VALUES
      000F  6A                          ADD     A,R2            ADD EOD ADDR
      0010  E6 6C                       JNC     FRAMERR         CHECK FOR MINIMUM COUNTS (SHORTEST
      0012  03 DF                       ADD     A,#-(3+24+6)    CODE) LEFT TO SEARCH
      0014  E6 6C                       JNC     FRAMERR
                                * FIND LEFT END OF FRAME.
      0016  D4 91                       CALL    LEFTGRD         CHECK LEFT GUARD AND QUIET ZONE
      0018                              JERR    FRAMLP6
      001A  F9                          MOV     A,R1
      001B  A0                          MOV     @R0,A           SAVE LAST FRAMING PTR
      001C  03 02                       ADD     A,#2            BUMP FRAMING PTR TO 1ST COUNT
      001E  A8                          MOV     R0,A            R0 PTR TO 1ST COUNT
                                * UPC-A OR EAN-13?
      001F  03 35                       ADD     A,#24+5+24      BUMP PTR TO RIGHT SIDE OF CODE COUNTS
      0021  A9                          MOV     R1,A
      0022  03 03                       ADD     A,#3            6N+C+6N+G+Q
      0024  37                          CPL     A               ARE THEIR ENOUGH COUNTS FOR THIS CODE TYPE
      0025  6A                          ADD     A,R2
      0026  E6 38                       JNC     FR4C4           NOT ENOUGH - TRY NEXT SHORTEST CODE
      0028  D4 8A                       CALL    RITEGRD         LOOK FOR GUARD AND QUIET ZONE ON RIGHT END
      002A                              JERR    FR4C4
      002C  F8                          MOV     A,R0
      002D  03 18                       ADD     A,#24
      002F  A9                          MOV     R1,A
      0030  D4 7F                       CALL    CNTRGRD         CHECK CENTER GUARD PATTERN
      0032                              JERR    FR4C4
      0034  BF 00                       MOV     R7,#0           UPC-A OR EAN-13
      0036  C4 0A                       JMP     FRAMOK
                                * EAN-8?
```

```
LINE  ADDR  B1 B2 B3 B4 ERROR   RDXIT.40P,PORT,UPC-A,E(0,1),FAN-8,13,ADDON 2,5              PAGE   40

1588  0038  F0                  FR4C4   MOV   A,R0
1589  0039  03 25                       ADD   A,#16+5+16     BUMP PTR TO RIGHT SIDE OF CODE COUNTS
1590  003B  A9                          MOV   R1,A
1591  003C  03 03                       ADD   A,#3           4N+C+4N+G+0
1592  003E  37                          CPL   A              ARE THEIR ENOUGH COUNTS FOR THIS CODE TYPE
1593  003F  6A                          ADD   A,R2
1594  0040  F6 52                       JNC   FRGO7          NOT ENOUGH - TRY NEXT SHORTEST CODE
1595  0042  D4 8A                       CALL  RITEGRD        LOOK FOR GUARD AND QUIET ZONE ON RIGHT END
1596  0044                              JERR  FRGO7
1598  0046  F0                          MOV   A,R0
1599  0047  03 10                       ADD   A,#16
1600  0049  A9                          MOV   R1,A
1601  004A  D4 7F                       CALL  CNTRGRD        CHECK CENTER GUARD PATTERN
1602  004C                              JERR  FRGO7
1604  004E  BF 01                       MOV   R7,#1          FAN=8
1605  0050  C4 6A                       JMP   FRAMOK
1606                                * UPC-E FORWARD?
1607  0052  F8                  FRGO7   MOV   A,R0
1608  0053  03 1B                       ADD   A,#24+3        BUMP PTR TO RIGHT SIDE OF CODE COUNTS
1609  0055  A9                          MOV   R1,A           THEIR ARE ENOUGH COUNTS BECAUSE OF MIN TEST
1610  0056  D4 8A                       CALL  RITEGRD        LOOK FOR GUARD AND QUIET ZONE ON RIGHT END
1611  0058                              JERR  FRAMER4
1613  005A  F8                          MOV   A,R0           CHECK ZERO GUARD - RIGHT 3 COUNTS
1614  005B  03 18                       ADD   A,#24
1615  005D  A9                          MOV   R1,A
1616  005E  D4 7F                       CALL  CNTRGRD        CHECK FOR CENTER GUARD PATTERN ON RIGHT
1617  0060                              JERR  FRZOG
1619  0062  BF 03                       MOV   R7,#3          UPC-E FORWARD
1620  0064  C4 6A                       JMP   FRAMOK
1621                                * UPC-E BACKWARD?
1622  0066  D4 6F                   FRZOG   CALL  FRAMBZ
1623  0068                              JERR  FRAMER4
1625  006A                          FRAMOK  RETOK
1628  006C                          FRAMERR RETERR
LINE  ADDR  B1 B2 B3 B4 ERROR   RDXIT.40P,PORT,UPC-A,E(0,1),FAN-8,13,ADDON 2,5              PAGE   41

1633                                *
1634                                * TRY TO FRAME A BACKWARD UPC-E
1635                                *
1636  006F  F0                  FRAMBZ  MOV   A,R0           LOOK FOR ZERO GUARD ON LEFT END OF COUNTS
1637  0070  03 FF                       ADD   A,#-2          LEFT 3 COUNTS ALREADY CHECKED
1638  0072  A9                          MOV   R1,A           THEIR ARE ENOUGH COUNTS BECAUSE OF MIN TEST
1639  0073  03 05                       ADD   A,#5           ADJUST R0 BECAUSE OF ZERO GUARDS ON LEFT
1640  0075  A8                          MOV   R0,A
1641  0076  D4 7F                       CALL  CNTRGRD        CHECK FOR CENTER GUARD PATTERN ON LEFT
1642  0078                              JERR  FRBZEX
1644  007A  BF 02                       MOV   R7,#2          UPC-E BACKWARD
1645  007C                              RETOK
1648  007E  83                  FRBZEX  RET
1649                                *
1650                                * TEST FOR 3 SETS OF GUARD BARS
1651                                *
1652  007F  D4 98               CNTRGRD CALL  GUARD          CHECK GUARD - LEFT 3 COUNTS
1653  0081                              JERR  ZGRDEX
1655  0083  D4 98                       CALL  GUARD          CHECK GUARD - MIDDLE 3 COUNTS
1656  0085                              JERR  ZGRDEX
1658  0087  C4 98                       JMP   GUARD          CHECK GUARD - RIGHT 3 COUNTS
1659  0089  83                  ZGRDEX  RET
1660                                *
1661                                * TEST FOR GUARD BARS AND RIGHT QUIET ZONE
1662                                *
1663  008A  D4 98               RITEGRD CALL  GUARD          CHECK GUARD
1664  008C                              JERR  RITGEX
1666  008E  C4 C6                       JMP   QUIETR
1667  0090  83                  RITGEX  RET
1668                                *
1669                                * CHECK FOR GUARD BARS AND LEFT QUIET ZONE
1670                                *
1671  0091  D4 98               LEFTGRD CALL  GUARD          CHECK LEFT GUARD AND QUIET ZONE
1672  0093                              JERR  LEFGEX
1674  0095  C4 BC                       JMP   QUIETL         CHECK FOR LEFT QUIET ZONE
1675  0097  83                  LEFGEX  RET
LINE  ADDR  B1 B2 B3 B4 ERROR   RDXIT.40P,PORT,UPC-A,E(0,1),FAN-8,13,ADDON 2,5              PAGE   42

1677                                *
1678                                * GUARD RETURNS A POINTER TO THE RIGHT BAR OF 3 GUARD BARS
1679                                * STARTING AT INITIAL VALUE OF POINTER.
1680                                *
1681                                * ON ENTRY:
1682                                * R1 POINTS TO BEGIN OF GUARD BAR TEST LOCATION
1683                                *
1684                                * ON EXIT:
1685                                * R1 = R1+1
1686                                * IF NOT GUARD BARS THEN ERROR SET.
1687                                * IF GUARD BARS THEN ERROR NOT SET.
1688                                *
1689                                * GUARD BARS = 3 COUNTS WHERE:
1690                                *       1ST-% <= 3RD COUNT <= 1ST+%, 2ND COUNT SKIPPED
1691                                *       IF %=0 THEN % IS MADE 1L OF 1. THIS ENSURES THAT
1692                                *       COMPARISONS OF SMALL (<4) COUNTS ARE MADE WITH A TOLERANCE OF
1693                                *       AT LEAST +/-1.
1694                                *
1695  0098  F1                  GUARD   MOV   A,@R1          1ST COUNT
1696  0099  77                          RR    A              50%
1697  009A  53 3F                       ANL   A,#03          MASK OFF HIGH 2 BITS
1698  009C  96 9F                       JNZ   GARD2          IF % OF COUNT=0
```

```
1699  009E  17                 INC    A                THEN MAKE IT 1
1700  009F  AE         GARD2   MOV    R6,A
1701  00A0  61                 ADD    A,@R1
1702  00A1  AD                 MOV    R5,A             1ST COUNT + %
1703  00A2  FE                 MOV    A,R6
1704  00A3  37                 CPL    A
1705  00A4  17                 INC    A
1706  00A5  61                 ADD    A,@R1
1707  00A6  AE                 MOV    R6,A             1ST COUNT - %
1708  00A7  19                 INC    R1               SKIP 2ND COUNT
1709  00A8  19                 INC    R1
1710  00A9  F1                 MOV    A,@R1            3RD COUNT
1711  00AA  C9                 DEC    R1               (LEAVE R1 POINTING AT MIDDLE GUARD BAR)
1712  00AB  37                 CPL    A
1713  00AC  6E                 ADD    A,R6
1714  00AD  F6 B9              JC     GARDERR          ERROR - 3RD COUNT < 1ST-%
1715  00AF  19                 INC    R1
1716  00B0  F1                 MOV    A,@R1
1717  00B1  C9                 DEC    R1
1718  00B2  37                 CPL    A
1719  00B3  17                 INC    A
1720  00B4  6D                 ADD    A,R5
1721  00B5  E6 B9              JNC    GARDERR          ERROR - 3RD COUNT > 1ST+%
1722  00B7                     RETURN
1725  00B9                     GARDERR RETERR
LINE  ADDR  B1 B2 B3 B4 ERROR  RDXIL.46P,PORT,UPC-A,E(0,1),FAN-8,13,ADDON 2,5        PAGE  43

1730                           *
1731                           * QUIET COMPARES A GUARD COUNT TO THE COUNT WHERE THE QUIET ZONE SHOULD
1732                           * BE THE COMPARISON IS DONE BY ADDING THE 2 GUARD COUNTS NEXT TO THE
1733                           * QUIET ZONE TO TAKE ADVANTAGE OF DELTA DISTANCE. THIS COUNT IS SHIFTED
1734                           * LEFT TO MAKE IT 4 MODULES WIDE. THE QUIET ZONE COUNT SHOULD BE AT LEAS
1735                           * 4.5 TIMES 1 MODULE. IN THIS CASE, WE ARE COMPARING THE QUIET ZONE COUN
1736                           * TO (4 1-MODULE COUNTS)+1.
1737                           *
1738  00BC  C9         QUIETL  DEC    R1
1739  00BD  C9                 DEC    R1
1740  00BE  F1                 MOV    A,@R1            LEFT QUIET ZONE COUNT
1741  00BF  AF                 MOV    R7,A
1742  00C0  19                 INC    R1
1743  00C1  F1                 MOV    A,@R1            1ST GUARD COUNT
1744  00C2  19                 INC    R1
1745  00C3  61                 ADD    A,@R1            PLUS 2ND GUARD COUNT
1746  00C4  C4 D3              JMP    QUIETC
1747  00C6  19         QUIETR  INC    R1
1748  00C7  19                 INC    R1
1749  00C8  F9                 MOV    A,R1             SAVE RIGHT QUIET ZONE ADDR FOR ADDON
1750  00C9  B9 24              MOV    R1,#ADDPTR
1751  00CB  A1                 MOV    @R1,A
1752  00CC  A9                 MOV    R1,A
1753  00CD  F1                 MOV    A,@R1            RIGHT QUIET ZONE COUNT
1754  00CE  AF                 MOV    R7,A
1755  00CF  C9                 DEC    R1
1756  00D0  F1                 MOV    A,@R1            1ST GUARD COUNT
1757  00D1  C9                 DEC    R1
1758  00D2  61                 ADD    A,@R1            2ND GUARD COUNT
1759  00D3  F6 DE      QUIETC  JC     QUIETER          OVERFLOW ON SUM OF 2 GUARD COUNTS
1760  00D5  F7                 RLC    A                2(ACCUMALATOR) = 4*GUARD COUNT
1761  00D6  F6 DE              JC     QUIETER          OVERFLOW
1762  00D8  37                 CPL    A
1763  00D9  6F                 ADD    A,R7
1764  00DA  E6 DE              JNC    QUIETER          QUIET COUNT < 4*GUARD COUNT
1765  00DC                     RETURN
1768  00DE           QUIETER   RETERR
LINE  ADDR  B1 B2 B3 B4 ERROR  RDXIL.46P,PORT,UPC-A,E(0,1),FAN-8,13,ADDON 2,5        PAGE  44

1773                           *
1774                           * QUIETA COMPARES THE DELINEATOR COUNTS AT R1 TO THE COUNT AT R1+5
1775                           * WHICH IS WHERE THE QUIET ZONE SHOULD BE. THE 2 DELINEATOR COUNTS
1776                           * ARE SUMMED AND MULTIPLIED BY 2 TO GIVE A 4 MODULE COUNT. THIS COUNT
1777                           * IS THEN COMPARED TO THE QUIET ZONE COUNT.
1778                           *
1779  00E1  F1         QUIETA  MOV    A,@R1            1ST DELINEATOR COUNT
1780  00E2  19                 INC    R1
1781  00E3  61                 ADD    A,@R1            PLUS 2ND DELINEATOR COUNT
1782  00E4  F6 F6              JC     QUAERR           OVERFLOW
1783  00E6  AF                 MOV    R7,A             SAVE SUM
1784  00E7  F9                 MOV    A,R1
1785  00E8  03 05              ADD    A,#5
1786  00EA  A9                 MOV    R1,A
1787  00EB  FF                 MOV    A,R7
1788  00EC  97                 CLR    C
1789  00ED  F7                 RLC    A                2(SUM)
1790  00EE  F6 F6              JC     QUAERR
1791  00F0  37                 CPL    A                NEGATE SUM
1792  00F1  61                 ADD    A,@R1            PLUS QUIET ZONE COUNT
1793  00F2  E6 F6              JNC    QUAERR
1794  00F4                     RETURN
1797  00F6           QUAERR    RETERR
1801                           *
1802                           * PUT EOD INTO COUNT BUFFER AND SAVE EOD ADDR
1803                           *
1804  00F9  B0 D0      CNTEOD  MOV    @R0,#EOD         WRITE END-OF-COUNTS
1805  00FB  B9 25              MOV    R1,#EODPTR       SAVE EOD ADDR
1806  00FD  F8                 MOV    A,R0
1807  00FE  A1                 MOV    @R1,A
1808  00FF  83                 RET
```

```
LINE  ADDR  B1 B2 B3 B4 ERROR   RDXIT.46P,PORT,UPC-A,E(0,1),FAN-R,13,ADDON 2,5          PAGE  45

      0700                              PAGE     256              NEXT PAGE

                                *
                                * TRY TO DECODE AN ADDON CODE OF 2 OR 5 CHARACTERS
                                *
      0700  B8 26               DECDADD MOV      R0,#BACKSW       FORWARD OR BACKWARD?
                                 IF DEBUG
                                 ENDIF
      0702  F0                          MOV      A,@R0
      0703  96 0D                       JNZ      DECDKAD          BACKWARDS
                                * FORWARD SCAN - SETUP POINTERS AND COUNTS FOR RIGHT, FORWARD ADDON
      0705  B8 24                       MOV      R0,#ADDPTR       POINT TO LEFT END OF RIGHT, FORWARD ADDON
      0707  F0                          MOV      A,@R0
      0708  B8 22                       MOV      R0,#FRAMPTR      FRAMPTR = RIGHT QUIET ZONE
      070A  A0                          MOV      @R0,A            EODPTR = ENDPTR
      070B  E4 1C                       JMP      DECDAD2
                                * BACKWARD SCAN - SETUP POINTERS AND COUNTS FOR LEFT, BACKWARDS ADDON
      070D  B9 22               DECDKAD MOV      R1,#FRAMPTR      FRAMPTR = BEGINNING OF COUNTS
      070F  23 3C                       MOV      A,#CNTREG
      0711  21                          XCH      A,@R1
      0712  07                          DEC      A
      0713  B8 25                       MOV      R0,#EODPTR       EODPTR = FRAMPTR-1
      0715  A0                          MOV      @R0,A
      0716  07                          DEC      A
      0717  A9                          MOV      R1,A             POINT R1 AT RIGHT QUIET ZONE OF ADDON
      0718  B8 3C                       MOV      R0,#CNTREG       POINT R0 AT LEFT END OF ADDON
      071A  94 CE                       CALL     SWAPIP           SWAP COUNTS THAT REPRESENT ADDON END-FOR-END
                                * WHICH TYPE OF ADDON IF ANY?
      071C  B8 22               DECDAD2 MOV      R0,#FRAMPTR      FRAMPTR POINTS TO LEFT QUIET ZONE OF ADDON
      071E  B9 25                       MOV      R1,#EODPTR       EODPTR POINTS TO RIGHT QUIET ZONE OF ADDON
                                 IF DEBUG
                                 ENDIF
                                * ENOUGH COUNTS FOR ADDON-2?
      0720  F0                          MOV      A,@R0
      0721  03 0E                       ADD      A,#14            ADDON-2 IS 14 COUNTS
      0723  F6 7A                       JC       DECADER          OVERFLOW OF POINTER
      0725  37                          CPL      A
      0726  61                          ADD      A,@R1
      0727  E6 7A                       JNC      DECADER          NOT ENOUGH COUNTS FOR ADDON-2 OR 5
      0729  F0                          MOV      A,@R0            SETUP POINTER FOR QUIET ZONE TEST
      072A  03 08                       ADD      A,#8             POINT TO LAST ADDON-2 DELINEATOR PAIR
      072C  A9                          MOV      R1,A
      072D  D4 E1                       CALL     QUIETA
      072F                              JERR     DECDAD4
                                * TRY DECODING ADDON-2
      0731  B4 F9               DECAD2  CALL     SETAPTR          INIT ADDON CHARACTER BUFFER POINTER
      0733  B9 22                       MOV      R1,#FRAMPTR      ADJUST PTR 2 COUNTS LEFT OF 1ST CHAR
      0735  F1                          MOV      A,@R1
      0736  03 02                       ADD      A,#2             INC PTR PAST QUIET ZONE AND 1 GUARD
      0738  A8                          MOV      R0,A             R0 POINTS TO ADDON COUNTS
      0739  54 45                       CALL     CHAD2IS
      073B                              JERR     DECADER
                                * DO ADDON-2 MOD CHECK
      073D  74 C4                       CALL     MCHKAD2          DO MOD CHECK ON ADDON-2 CODE
      073F                              JERR     DECADER          CHECK ERROR
      0741  23 04                       MOV      A,#ADDON2
      0743  F4 76                       JMP      DECDADT

LINE  ADDR  B1 B2 B3 B4 ERROR   RDXIT.46P,PORT,UPC-A,E(0,1),FAN-R,13,ADDON 2,5          PAGE  46

                                * ENOUGH COUNTS FOR ADDON-5?
      0745  B9 25               DECDAD4 MOV      R1,#EODPTR
      0747  F0                          MOV      A,@R0
      0748  03 20                       ADD      A,#32            ADDON-5 IS 32 COUNTS
      074A  F6 7A                       JC       DECADER          OVERFLOW OF POINTER
      074C  37                          CPL      A
      074D  61                          ADD      A,@R1
      074E  E6 7A                       JNC      DECADER          NOT ENOUGH COUNTS FOR ADDON-2
                                * TEST FOR ADDON-5 QUIET ZONE
      0750  F0                          MOV      A,@R0
      0751  03 1A                       ADD      A,#26
      0753  A9                          MOV      R1,A
      0754  D4 E1                       CALL     QUIETA
      0756                              JERR     DECADER
                                * TRY DECODING ADDON-5
      0758  B4 F9               DECAD5  CALL     SETAPTR          INIT ADDON CHARACTER BUFFER POINTER
      075A  B9 22                       MOV      R1,#FRAMPTR      ADJUST PTR 2 COUNTS LEFT OF 1ST CHAR
      075C  F1                          MOV      A,@R1
      075D  03 02                       ADD      A,#2             INC PTR PAST QUIET ZONE AND 1 GUARD
      075F  A8                          MOV      R0,A
      0760  54 43                       CALL     CHAD3IS          R0 POINTS TO ADDON COUNTS
      0762  54 45                       CALL     CHAD2IS
      0764                              JERR     DECADER          ERROR ON DECODE OF ADDON-5
                                * DO ADDON-5 MOD CHECK
      0766  94 93                       CALL     DIRAD5           GET CHECK CHAR PER DIRECTION BITS
      0768                              JERR     DECADER          ERROR, TRY DECODING ADDON-2
      076A  37                          CPL      A                OR
      076B  17                          INC      A                ADJUST RETURNED CHECK CHARACTER
      076C  03 0A                       ADD      A,#10            TO ANALOGOUS 10
      076E  B8 BF                       MOV      R0,#.LOW.CHKAD5  ADDON-5 CHECK MULTIPLIER TABLE
      0770  74 7D                       CALL     MCHKAD5          AND PASS IT TO THE MODULO CHECK ROUTINE
      0772                              JERR     DECAFER          CHECK ERROR, TRY ADDON-2
      0774  23 08                       MOV      A,#ADDON5
      0776  F4 06               DECDADT CALL     TYPECK           TYPE CHARACTER .OR. ADDON TYPE
      0778                              RETOK
      077A  84 0C               DECADER CALL     CHADEOD
      077C                              RETERR
```

```
LINE  ADDR  B1 B2 B3 B4 ERROR   RDXIT.48P,PORT,UPC-A,E(0,1),EAN-8,13,ADDON 2,5          PAGE   47

                                *
      077F                      INIT
                                * INIT THOSE THINGS NORMALLY HANDLED BY HARDWARE RESET
                                * INCASE OF WARM RESET CAUSED BY RECEIPT OF AN ETX CHARACTER.
      077F  99 00                       ANL     P1,#0           ALL PORT BITS TO '0'
      0781  9A 00                       ANL     P2,#0           ALL PORT BITS TO '0'
      0783  B9 20                       MOV     R1,#INCHAR      NULL-OUT COMMUNICATION BUFFER
      0785  B1 00                       MOV     @R1,#NULL
      0787  89 65                       ORL     P1,#RECHARG+CLOCK+GREEN+RED     BOTH LITES ON
                                * TRANSMIT DATA TO MARK
                                * ENABLE BAR AND TRIGGER INPUT BITS BY OUTPUTTING A '1'
                                * ENABLE TRANSMIT DATA - RECEIVE DATA ALWAYS ENABLED
      0789  8A 60                       ORL     P2,#TXD+BARBIT+TRIGR
                                * 3 LONG BEEPS (IF NOT PORTABLE)
      078B                              JPORT   INIT2
      078D  94 00                       CALL    BEEP            BEEP 100MS
      078F  94 12                       CALL    DELAY50         WAIT 50MS
      0791  94 00                       CALL    BEEP
      0793  94 12                       CALL    DELAY50
      0795  94 00                       CALL    BEEP
      0797  99 BF                       ANL     P1,#-1-GREEN    TURN OFF GOOD READ LITE TILL ACK RECEIVED
      0799                      INIT2
                                * SEND HELLO TO HOST
      0799  23 07               INITLP2 MOV     A,#BEL
      079B  B4 5B                       CALL    OUTCHAR
                                * TILL GOOD RESPONSE
      079D  BC 1E                       MOV     R4,#30          LOOP TIMER = 0.5 SEC
      079F  B4 35               INITLP4 CALL    GETCHAR         GET RECEIVED CHARACTER
      07A1  D3 06                       XRL     A,#ACK
      07A3  C6 AB                       JZ      INIT4           EXIT WHEN ACK RECEIVED
      07A5  ED 9F                       DJNZ    R5,INITLP4
      07A7  EC 9F                       DJNZ    R4,INITLP4
      07A9  E4 99                       JMP     INITLP2         RE-SEND 'HELLO'
      07AB                      INIT4
      07AB  89 40                       ORL     P1,#GREEN       TURN ON GOOD READ LITE
      07AD  83                          RET

LINE  ADDR  B1 B2 B3 B4 ERROR   RDXIT.48P,PORT,UPC-A,E(0,1),EAN-8,13,ADDON 2,5          PAGE   48

                                *
                                * IF NOT PORTABLE THEN WAIT FOR TRIGGER SWITCH TO BE RELEASED FOR 100MS.
                                * RETURN WHEN TRIGGER SWITCH IS DEPRESSED.
                                *
      07AE                      WAIT
                                * WAIT FOR TRIGGER TO BE RELEASED
      07AE  BE 0C               WAITOF  MOV     R6,#12          100MS COUNTER
      07B0  F4 CB               WAITLP2 CALL    TRIGGER         GET TRIGGER SWITCH
      07B2  96 AE                       JNZ     WAITOF          TRIGGER SWITCH ON - START 100MS OVER
      07B4  EF B0                       DJNZ    R7,WAITLP2
      07B6  EE B0                       DJNZ    R6,WAITLP2
                                * WAIT FOR TRIGGER OR DC2 (HANDLE DISABLE CHARACTER)
      07B8  99 DF               WAITON  ANL     P1,#-1-RED      IF DISABLE RECEIVED THEN
      07BA  B4 35                       CALL    GETCHAR         WAIT AT 'GETCHAR' WITH READY LITE OFF
      07BC  89 20                       ORL     P1,#RED         UNTIL ENABLE IS RECEIVED.
      07BE  D3 12                       XRL     A,#DC2          EXIT IF DC2 RECEIVED
      07C0  C6 CA                       JZ      WAITRET
      07C2  BF 00                       MOV     R7,#0           DELAY SO THAT DUTY CYCLE OF LOOP
      07C4  EF C4                       DJNZ    R7,$            HAS LITE ON MOST OF TIME.
      07C6  F4 CB                       CALL    TRIGGER         OFF FOR 100MS - WAIT FOR ON
      07C8  C6 B8                       JZ      WAITON
      07CA  83                  WAITRET RET
                                *
                                * READ TRIGGER SWITCH - RETURN TRUE/FALSE IN ACCUMALATOR
                                *
      07CB  0A                  TRIGGER IN      A,P2            TRIGGER SWITCH PORT
      07CC  37                          CPL     A               TRIGGER SWITCH IS NEGATIVE LOGIC
      07CD  53 20                       ANL     A,#TRIGR        MASK OFF ALL BUT TRIGGER SWITCH BIT
      07CF  83                          RET
                                *
                                *
                                *
      07D0  B9 27               TYPESTR MOV     R1,#CHARTYP
      07D2  43 30                       ORL     A,#'0'          MAKE ASCII NUMERIC
      07D4  A1                          MOV     @R1,A
      07D5  83                          RET
                                *
                                *
                                *
      07D6  B9 27               TYPEOR  MOV     R1,#CHARTYP
      07D8  41                          ORL     A,@R1           .OR. TYPE CHARACTER WITH ADDON CODE IN ACCUM
      07D9  A1                          MOV     @R1,A
      07DA  83                          RET
                                *
                                *
                                *
      07DB  B9 28               F1STR   MOV     R1,#CHARF1      STORE EAN-13 F1 CHARACTER
      07DD  A1                          MOV     @R1,A           OR UPC-E NUMBER SYSTEM NUMBER
      07DE  83                          RET
                                *
                                *
                                *
      07DF  B9 2F               CHK2STR MOV     R1,#CHARBEG+6   STORE UPC-E CHECK DIGIT TO RIGHT
      07E1  A1                          MOV     @R1,A           OF ADDONDD.
      07E2  19                          INC     R1
      07E3  B1 00                       MOV     @R1,#EOD        STORE EOD
```

```
LINE  ADDR  B1 B2 B3 B4 ERROR   RDX11.46P,PORT,UPC-A,E(0,1),EAN-8,13,ADDON 2,5                PAGE   49

      07F5  B3                          RET
                                *
                                *
                                 IF (5-1)/(6*256)
                                 ENDIF
      07E6                      END
      07E6                      RDX11    END     END-BEGIN
LINE  ADDR  B1 B2 B3 B4 ERROR   RDX11.46P,PORT,UPC-A,E(0,1),EAN-8,13,ADDON 2,5                PAGE   50

                                *
                                *                SPARKLE/TERMINAL INTERFACE DESCRIPTION
                                *
                                *
                                *            BARCODE          ---------          ----------
                                *         : :  : :::          :         :  LINK   :          :
                                *         : :  : :::------>: SPARKLE :<--------->: TERMINAL :
                                *         : :  : :::          :         :         :          :
                                *                             ---------          ----------
                                *
                                *SPARKLE         IS THE HAND HELD BARCODE READER.
                                *
                                *TERMINAL         IS ANY DEVICE WHICH WILL RECEIVE THE DECODED
                                *                 BARCODE TRANSMITTED BY SPARKLE.
                                *
                                *LINK             IS THE INTERFACE OVER WHICH DATA FLOWS BETWEEN
                                *                 SPARKLE AND TERMINAL.  DATA TRANSMITTED BY
                                *                 SPARKLE TO THE TERMINAL IS CALLED TRANSMIT
                                *                 DATA (TXD).  DATA TRANSMITTED BY THE TERMINAL TO
                                *                 SPARKLE IS CALLED RECEIVE DATA (RXD).
                                *
LINE  ADDR  B1 B2 B3 B4 ERROR   RDX11.46P,PORT,UPC-A,E(0,1),EAN-8,13,ADDON 2,5                PAGE   51

                                *
                                *SPARKLE OPERATION
                                *                 SPARKLE READS BARCODES PLACED IN FRONT OF IT WHEN THE
                                *                 TRIGGER SWITCH IS DEPRESSED BY THE OPERATOR.  SPARKLE
                                *                 WILL THEN TURN OFF THE READY AND ERROR LIGHTS AND FLASH
                                *                 A BRIGHT, SHORT DURATION LIGHT TO ILLUMINATE AND READ
                                *                 THE BARCODE IN FRONT OF IT.  THE BARCODE MUST BE IN THE
                                *                 FIELD OF VIEW OF SPARKLE WHICH IS 2.5".  EACH CONTRASTING
                                *                 EDGE IN THE FIELD OF VIEW IS STORED AS A COUNT IN SPARKLE'S
                                *                 MEMORY.  SPARKLE CAN STORE 190 COUNTS.  THE COUNTS ARE
                                *                 STORED FROM LEFT TO RIGHT AS THE OPERATOR WOULD VIEW THE
                                *                 BARCODE. IT IS IMPORTANT TO NOTE THAT ANY EXTRANEOUS EDGES
                                *                 TO THE LEFT OF THE BARCODE THAT ARE IN SPARKLE'S FIELD OF
                                *                 VIEW WILL USE UP COUNTS SUBTRACTING FROM THE STORAGE
                                *                 AVAILABLE FOR THE ACTUAL BARCODE'S COUNTS.
                                *
                                *
                                *                    BARCODE          SPARKLE
                                *                                 ----------------
                                *                       :       :                  \
                                *                       :<-----:-L LIGHT SOURCE     \
                                *                       :------:--->: SENSOR ARRAY   \
                                *                       :       :                     \
                                *                               ------------           \
                                *                       :       :           \           \
                                *                       :<---->:             \           \
                                *                        FOCUS                \           \
                                *                       .0 TO .5"              \           \
                                *                                               \           \
                                *                                                ---------
                                *
                                *                 SPARKLE WILL TRY TO DECODE THE BARCODE.  IF SUCCESSFULL,
                                *                 IT WILL TRANSMIT THE DECODED BARCODE TO THE TERMINAL.  IF
                                *                 SPARKLE IS UNSUCCESSFULL OR THE TERMINAL INDICATES A BAD
                                *                 READ THEN SPARKLE WILL RE-FLASH AND DECODE THE BARCODE
                                *                 UPTO 20 TIMES AT A RATE OF 8 TIMES PER SECOND FOR AS LONG
                                *                 AS THE TRIGGER SWITCH IS DEPRESSED.  AFTER A GOOD READ
                                *                 SPARKLE WILL TURN THE READY LIGHT ON AND EMIT A SHORT BEEP.
                                *                 AFTER AN UNSUCCESSFULL READ SPARKLE WILL TURN ON THE READY
                                *                 AND ERROR LIGHTS - NO BEEP.  AFTER A BARCODE READ ATTEMPT
                                *                 THE TRIGGER SWITCH MUST BE RELEASED FOR 100MS BEFORE SPARKLE
                                *                 WILL INITIATE ANOTHER BARCODE READ CYCLE.
                                *
                                *
LINE  ADDR  B1 B2 B3 B4 ERROR   RDX11.46P,PORT,UPC-A,E(0,1),EAN-8,13,ADDON 2,5                PAGE   52

                                *
                                *LINK ELECTRICAL SPECIFICATION
                                *                 REFER TO THE SCHEMATIC DIAGRAM FOR SPARKLE.  DATA
                                *                 IS RECEIVED/DRIVEN BY A SN75117N OVER A BALANCED
                                *                 2-WIRE SHIELDED, TWISTED WIRE PAIR WITH A 120 OHM
                                *                 TERMINATION RESISTOR.  A LOW LEVEL (START BIT/SPACE)
                                *                 IS 0V.  A HIGH LEVEL (STOP BIT/MARK) IS +5V.
                                *
                                *LINK DATA FORMAT
                                *                 START/STOP ASYNC,
                                *                 7 BIT ASCII,
                                *                 EVEN PARITY,
                                *                 1 STOP BIT,
                                *                 1200 BAUD.
```

```
*
*
*LINK DATA PROTOCOL
*               SPARKLE SUPPORTS HALF-DUPLEX DATA COMMUNICATION, IE.,
*               IT CANNOT RECEIVE AND TRANSMIT DATA SIMULTANEOUSLY.
*               THEREFORE, THE TERMINAL MUST NOT TRANSMIT TO SPARKLE
*               WHILE SPARKLE IS TRANSMITTING A CHARACTER.  IF IT DOES,
*               THEN THE TWO DATA CHARACTERS WOULD BE WIRE-ORED CAUSING
*               AN ERROR OR MISSED CHARACTER FOR THE TERMINAL AND
*               SPARKLE.  THE LEADING EDGE OF THE RXD START BIT CAUSES
*               AN INTERRUPT TO SPARKLE WHICH CAUSES SPARKLE TO
*               PROCESS THE RECEIVED CHARACTER.  CHARACTERS WITH PARITY
*               OR FRAMING ERRORS AND CHARACTERS THAT ARE NOT PART OF
*               THE PROTOCOL SET ARE IGNORED.
*
*               THE TERMINAL CAN "LOCK-UP" SPARKLE BY HOLDING RXD LOW.
*               SPARKLE WILL REMAIN DEDICATED TO RXD (IT WILL NOT BE
*               ABLE TO CONTINUE PROCESSING OR RESPOND TO OPERATOR
*               REQUESTS) UNTIL RXD GOES HIGH.  SPARKLE DOES DISABLE
*               THE RXD INTERRUPT WHILE IT IS TRANSMITTING A
*               CHARACTER; BETWEEN CHARACTERS IT IS ENABLED.
*
*               ANY CHARACTER TRANSMITTED BY THE TERMINAL TO SPARKLE
*               WHILE THE INTERRUPT IS DISABLED WILL CAUSE AN INTERRUPT
*               WHEN ITS DATA BIT STREAM GOES LOW AFTER THE INTERRUPT
*               IS ENABLED.  THIS WILL MOST LIKELY BE DEMODULATED AS AN
*               ERROR BY SPARKLE BECAUSE OF THE LOSS OF START BIT EDGE
*               SYNCHRONIZATION.

LINE  ADDR  B1 B2 B3 B4 ERROR   RDX16,46P,PORT,UPC=A,E(0,1),FAN=R,13,ADDON 2,5        PAGE   53

*
*LINK PROTOCOL CHARACTER SET
*               HEX ASCII USE
*               03  ETX   RESET SPARKLE - FROM TERMINAL
*               05  ENQ   SEND ID - FROM TERMINAL
*               06  ACK   MESSAGE OK - FROM TERMINAL
*               07  BEL   POWER UP MESSAGE - FROM SPARKLE
*               0A  LF    LINE FEED - FROM SPARKLE
*               0D  CR    CARRIAGE RETURN - FROM SPARKLE
*               11  DC1   ENABLE SPARKLE - FROM TERMINAL
*               12  DC2   INITIATE READ CYCLE - FROM TERMINAL
*               13  DC3   DISABLE SPARKLE - FROM TERMINAL
*               15  NAK   MESSAGE NOT OK - FROM TERMINAL
*               30  0     ALPHANUMERIC AND SPECIAL - FROM SPARKLE
*               .   .     .
*               .   .     .
*               .   .     .
*               5A  Z     ALPHANUMERIC AND SPECIAL - FROM SPARKLE
*
*
*         POWER UP
*               WHEN POWERED UP SPARKLE WILL TURN ON THE READY AND ERROR
*               LIGHTS THEN BEEP 3 TIMES.  AFTER THIS, SPARKLE WILL
*               TRANSMIT AN ASCII BEL CHARACTER EVERY 500MS UNTIL AN
*               ASCII ACK IS RECEIVED.  SPARKLE WILL THEN TURN OFF THE
*               ERROR LIGHT AND BE READY TO READ BARCODES.
*
*         DC1, DC3
*               TRANSMITTING A DC3 TO SPARKLE WILL DISABLE SPARKLE FROM
*               TRANSMITTING DATA OR READING BARCODES UNTIL A DC1 IS
*               RECEIVED.  ANY TIME SPARKLE IS WAITING FOR A DC1 THE READY
*               LIGHT WILL BE OFF; THE ERROR LIGHT MAY BE ON OR OFF
*               DEPENDING ON THE STATUS OF THE LAST BARCODE READ.
*
*         DC2
*               WHEN WAITING FOR THE TRIGGER TO BE DEPRESSED, SPARKLE
*               WILL RESPOND TO RECEIVING A DC2 THE SAME AS THE TRIGGER
*               BEING DEPRESSED.
*
*         ETX
*               AN ASCII ETX RECEIVED AT ANY TIME WILL CAUSE SPARKLE TO
*               RESET THE SAME AS IF POWERED OFF THEN ON.
*
*         ENQ
*               IF AN ENQ IS RECEIVED, SPARKLE WILL SEND A MESSAGE INDICATING
*               THE PROGRAM NAME AND VERSION.

LINE  ADDR  B1 B2 B3 B4 ERROR   RDX16,46P,PORT,UPC=A,E(0,1),FAN=R,13,ADDON 2,5        PAGE   54

*
*LINK BARCODE FORMAT
*               A DECODED BARCODE IS TRANSMITTED AS A SEQUENCE OF ASCII
*               CHARACTERS AS FOLLOWS:
*
*
*               DECODED BARCODE CHARACTER STREAM
*
*                       T B...B H RL
*
*               WHERE:
*               T IS THE BARCODE TYPE - 1 ASCII CHARACTER.
*               B IS THE NUMERIC CONTENT OF THE BARCODE.
*               H IS AN ASCII MODULOUS 10 HASH OF T AND B.
*               R IS AN ASCII CR.
*               L IS AN ASCII LF.
*
```

```
2193              *
2194              *              TYPE (T)                      FORMAT (P...P)
2195              *              0 = UPC SHORT                 NDDDDDC
2196              *              1 = EAN SHORT                 FNDDDDDC
2197              *              2 = UPC LONG                  NDDDDDDDDDDC
2198              *              3 = EAN LONG                  FNDDDDDDDDDDC
2199              *              4 = UPC SHORT ADDON=2         NDDDDDDCAA
2200              *              5 = EAN SHORT ADDON=2         FNDDDDDCAA
2201              *              6 = UPC LONG ADDON=2          NDDDDDDDDDDCAA
2202              *              7 = EAN LONG ADDON=2          FNDDDDDDDDDDCAA
2203              *              8 = UPC SHORT ADDON=5         NDDDDDDCAAAAA
2204              *              9 = EAN SHORT ADDON=5         FNDDDDDCAAAAA
2205              *              : = UPC LONG ADDON=5          NDDDDDDDDDDCAAAAA
2206              *              ; = EAN LONG ADDON=5          FNDDDDDDDDDDCAAAAA
2207              *              * = BAD (PORTABLE ONLY) (NO DATA)
2208              *
2209              *
2210              *                   WHERE:
2211              *                   N IS THE NUMBER SYSTEM DIGIT
2212              *                   D ARE THE BARCODE DIGITS
2213              *                   C IS THE CHECK DIGIT
2214              *                   F IS THE EAN FLAG 1
2215              *                   A ARE THE ADDON CODE DIGITS
2216              *

LINE  ADDR  B1 B2 B3 B4 ERROR   RDXII.46P,PORT,UPC=A,E(0,1),EAN=8,13,ADDON 2,5          PAGE   55

2218              *
2219              *
2220              *         BARCODE TRANSMISSION
2221              *              THE DECODED BARCODE DATA STREAM IS TRANSMITTED AS A
2222              *              CONTINUOUS CHARACTER STREAM.  AFTER SPARKLE HAS
2223              *              TRANSMITTED THE BARCODE IT WILL WAIT FOR EITHER AN
2224              *              ASCII ACK OR NAK FROM THE TERMINAL.  IF A VALID ACK
2225              *              IS RECEIVED THEN SPARKLE WILL INDICATE A GOOD READ.
2226              *              IF A NAK OR NO VALID RESPONSE IS RECEIVED WITHIN HALF
2227              *              OF A SECOND THEN SPARKLE WILL CONSIDER THE READ TO BE
2228              *              BAD.  IF SPARKLE IS IN THE PORTABLE MODE (TO STRAPPED
2229              *              LOW), THEN SPARKLE WILL RE-SEND THE DATA ON A NAK AFTER
2230              *              A 10MS DELAY RATHER THAN RE-READ THE BARCODE.
2231              *
2232              *
2233              *
2234              *         1         2         3         4         5         6         7
2235              *...5....0....5....0....5....0....5....0....5....0....5....0....5....0..

LINE  ADDR  B1 B2 B3 B4 ERROR   RDXII.46P,PORT,UPC=A,E(0,1),EAN=8,13,ADDON 2,5          PAGE   56

2237              *
2238              *
2239              * FOR                                  FOR 2'S COMP VALUE IN ACCUMULATOR
2240              *       CPL     A                      JC = A<=B; JNC A>B
2241              *       INC     A                      FOR 2'S COMP VALUE NOT IN ACCUMULATOR
2242              *       ADD     A,B                    JC = A<B; JNC = A=>B
2243              * OR
2244              *       MOV     A,#-VALUE
2245              *       ADD     A,B
2246              * THEN
2247              *       JC      A<=B
2248              *       JNC     A>B
2249              *
2250              * FOR
2251              *       ADD     A,#-VALUE
2252              * THEN
2253              *       JC      A=>B
2254              *       JNC     A<B
2255              *
2256              *
2257  07E6         END

                                RDXII.46P,PORT,UPC=A,E(0,1),EAN=8,13,ADDON 2,5          PAGE   57

                          CROSS REFERENCE

LABEL       VALUE       REFERENCE

ACK         0006       -122    599    601   1946
ADDON2      0004       -150   1868
ADDON5      0008       -151   1906
ADDPTR      0024       -172   1750   1821
ADJ2        00C2        365    367   -369
ADJ4        00C4        366   -370
ADJEX       00C8        363   -373
ADJLP       00B7       -362    372
ADJUST      00B5        212   -361
BACKCHR     00B0       -153    760
BACKS=      0020       -174   1394   1474   1815
BARBIT      0010       -119    282   1929
BEEP        0409        220  -1041   1933   1935   1937
BEEPER      0080       -106   1042   1045   1410
BEEPIP      0402      -1042   1049
BEGIN       0000       -192   2017
BEGIN2      0005        193   -197
BEL         0007       -132   1941
```

```
C1EQ1     0282     667   670  -690
C2EQ1     028E     689  -700
C3EQ1     02A5     673   676  -718
C3EQ2     02A7     717  -719
CHAD2TS   0245    -645  1861  1892
CHAD3TS   0243    -644  1891
CHADEOD   04DC     555 -1244  1911
CHAR      0249     633   634   635   636   637   638  -648
CHAR2     0299     679  -709
CHAR4     0281     699   708  -729
CHAR41S   0236     476   477  -635
CHAR6     020B     756   761  -766
CHAR61S   0232     436   439   494   560  -634
CHARADD   0036    -182   589   948  1002  1155  1163  1244  1466
CHARBEG   0029    -179   442   447   450   452   480   485   512
                   522   570   572  1125  1146  1228  1462  2007
CHARER1   02D3     659  -762
CHARERR   02D4     654   664   688   715  -763
CHAREX    02E3     649  -779
CHARF1    0028    -176   465   951  2001
CHARI     0247     644   645  -646
CHARPTR   0023    -171   767  1461  1467
CHARS     0027    -170   587
CHARTYP   0027    -177   551  1987  1994
CHKA13    03A3     460  -983
CHKAD5    03BF    -992  1902
CHKER     03A1     486  -982
CHKZ012   03B4     530  -986
CHKZ3     03B7     532  -989
CHKZ4     03AC     534  -986
CHKZ59    03A8     530  -985
CHKZSTR   07DF    1132  1140 -2007
CHRTABB   0355     758  -889
CHRTABF   0346     752  -877
CLOCK     0001    -113   256   258   259   263   265   272   276
                   296  1925
CLRBACK   05B0     426 -1394
CNTBEG    003C    -185   253   323   326   361   417  1072  1626
                  1635
CNTEND    0100    -186   291
CNTEOD    06F9     299   352 -1604
CNTRGRD   067F    1582  1601  1616  1641 -1652
CR        000D    -140  1316
DC1       0011    -126  1309
DC2       0012    -128  1970
DC3       0013    -130  1297  1299
DCHRLP2   04A4   -1170  1176
DEBUG     0000      -3   202   213   419   544   556   584   764
                   775   856   867   976  1166  1186  1195  1206
                  1226  1616  1640
DECAD2    0731   -1856
DECAD5    0758   -1886
DECADER   077A    1845  1848  1863  1867  1874  1877  1884  1894
                  1898  1905 -1911
DECBKAD   0700    1819 -1827
DECDAD2   071C    1825 -1838
DECDAD4   0745    1854 -1871
DECDADD   0700     542 -1815
DECDADT   0776    1869 -1907
DECDERR   01BC     423   455   456   459   463   479   483   508
                   511   515   521  -549
DECDOK    01BA    -543
DECDT     01B4     471   473   491  -539
DECODE    0100     215  -416
DECODLP   0104    -418   441   540
DECTAB    0114     429  -432
DELAY     041C    1055  1057 -1059
DELAY1    041A     606 -1058
DELAY4    0416     234 -1056
DELAY50   0412   -1054  1934  1936
DELP2     041D   -1060  1064
DELP4     041F   -1061  1063
DELTA1    044A     657   662 -1094
DELTERR   0466    1100 -1118
DELTOK    0464    1105  1109  1113 -1115
DIRAD2    0490    1000 -1163
DIRAD5    0493   -1155  1696
DIRC12    0479    1131 -1135
DIRCEX    04CB    1216 -1221
DIRCHR    04A1    1127  1148  1157 -1165
DIRCHRE   0487     457 -1146
DIRCHRZ   0467     497   574 -1125
DIRCLP    04C2   -1215  1220
DIRCOMP   04C2     451   573 -1214
DIRERR    04B0    1189 -1198
DIRTABS   0373    -925  1158
DIRTABE   0369    -913  1149
DIRTABZ   035E    -901  1128  1136
DIRTS4    04B6    1194 -1197
DIRTSEX   04C0    1193 -1205
DIRTSLP   04B2   -1191  1195  1197
DIRTS1    04AE     443   453   461 -1185
DMPLP2    0430    1070 -1074  1086
DMPLP4    0432   -1075  1084
DMPLP6    0434   -1076  1082
DUMP6     043E    1080 -1082
DUMPC4    0428   -1069
```

```
DUMPCNTS   042C    -1071
DUMPEX     0448     1076 -1087
FAN        0001    -147   472   490
FANS       0153     433  -470
END        07F6    -2016  2017
ENQ        0005    -133  1300  1302
EOD        0004    -143   554   774  1034  1245  1604  2016
EODPTR     0025    -173  1548  1605  1631  1639  1671
ESF        0167     484  -486
ETX        0003    -135  1441
FISTR      07D6     425  1134  1142  1151 -2001
FILT2      00A0     329  -338
FILT4      00A3     337  -340
FILT6      00A5     339  -341
FILTEOD    00B2     331   343  -351
FILTER     0088     211  -323
FILTEX     00B3     325  -352
FILTLP     0094    -330   345   350
FILTNXT    00AC     333  -346
FINDERR    032F     796  -836
FINDT      0300     650  -792
FINDTLP    0304    -794   799
FLASH      0010    -109   263   265
FR4C4      0638     1575  1576  1584 -1586
FRAMBZ     066F     506  1622 -1630
FRAME      0605     421 -1546
FRAMERR    066C     1558  1560 -1626
FRAMLP4    0609    -1551  1612  1624
FRAMLP6    060D    -1555  1564
FRAMOK     066A     1586  1605  1620 -1625
FRAMPTR    0022    -170   416   502  1551  1623  1627  1636  1657
                    1687
FRBZEX     067E     1643 -1648
FRGBZ      0652     1594  1597  1603 -1607
FRZ6G      0666     1616 -1622
GARD2      069F     1696 -1700
GARDERR    0689     1714  1721 -1725
GETCH2     0546     1301 -1304
GETCHAR    0535     598 -1288  1945  1966
GETCLP2    054A     1298 -1307  1310
GREEN      0040    -107   209   225   236  1925  1938  1952
GUARD      0698     1652  1655  1656  1663  1671 -1695
HEXTAB     0525     1273  1278 -1283
IDMSG      03E6    -1034  1314
INCHAR     0020    -167  1294  1443  1923
INIT       077F     197 -1916
INIT2      0799     1932 -1939
INIT4      07A6     1947 -1951
INITLP2    0799    -1941  1950
INITLP4    079F    -1945  1948  1949
INT        05B5     195 -1410
INTDAT     05C1     1416 -1419
INTDAT0    05CF     1424 -1426
INTDAT4    05D4     1427 -1432
INTDLP     05C6    -1424  1436
INTERR     05E9     1417  1436 -1440
INTLP      05B9    -1419
INTRST     05E6     1442 -1451
LEFGEX     0697     1673 -1675
LEFIGRD    0691     1562 -1671
LF         000A    -141  1316
LONG       0002    -149   470   472
MAD2ERR    03D9     1014 -1016
MCHK2      0391     955  -962
MCHK4      0398     963  -967
MCHKAD2    03C4    -1000  1865
MCHKAD5    037D    -948  1903
MCHKEX     03A0     971  -975
MCHKLP2    0386     950  -953   966
MCHKLP4    038C    -956   960
MODCHK     0382     461   489   537  -951
NAK        0015    -124   602
NULL       0000    -137  1924
OUT2       0572     1340 -1343
OUT4       0576     1342 -1346
OUT6       0583     1351 -1354
OUT8       0587     1353 -1357
OUTABEX    03E5     1026 -1032
OUTCDAS    0504    -1254
OUTCHAR    0556     594  1029  1254  1256  1261  1265  1275  1280
                    1317 -1325  1387  1942
OUTCLIN    050E    -1265
OUTDASH    0586    -1255
OUTERR     0500    -1251
OUTHEX     0512     1077 -1270  1371
OUTID      0551     1304 -1314
OUTLINE    0555     595  1085  1087  1266 -1316
OUTLP      0568    -1339  1348
OUTSP      050A     1081  1083  1252 -1260
OUTTAB     03DC    -1026  1031  1315
QUAERR     06F6     1782  1790  1793 -1797
QUIETA     06E1    -1779  1652  1682
QUIETC     06D3     1746 -1759
QUIETER    06DE     1759  1761  1764 -1766
QUIETL     06BC     1674 -1738
QUIETR     06C6     1666 -1747
R4R7ERR    00D2     384  -406
```

```
R4VSR7    00C9    -379   685   713
RAMBEG    0020    -159   166
RAMEND    0100    -160
RDCLRA    0049    -258   260   261
RDXIL     07E6   -2017
READ      0036     210  -246
READ2     0060     279  -281
READ6     0070     285  -293
READEX    0084     292  -298
READLP    0058    -269   293   294
RECHANG   0004    -111   255   272   275   296  1925
RED       0020    -108   209  1925  1967  1969
RITEGRD   008A    1576  1595  1610 -1663
RITGFX    0090    1665 -1667
ROMBEG    0000    -156   191
SAMPLE    0008    -110   270   271
SCAN      0007    -201   227   237
SCAN2     0006     205  -207
SCAN4     0010     217  -220
SCANLP2   0011    -210   235
SCNERR2   0029     219   222  -228
SCNERR4   0037     229   233  -236
SEND      0200     220  -583   607
SENDP4    05AC    1381 -1388
SENDREX   05AF    1379 -1390
SENDBUF   0596     586   590 -1376  1389
SENDFHR   0220     605  -612
SENDHEX   0595   -1369  1373
SENDOK    0230     600  -618
SENDR4    0227     603  -606
SENDRLP   0215    -596   609   610   611
SENHEX    0590    1370 -1374
SETAPTR   05F9   -1467  1856  1886
SETBACK   0600     449   487   569 -1474
SETCPTR   05F4     427   565 -1461
SHORT     0000    -148   490   536
SP        0020    -142  1260
STACK     0008    -165  1451
START     0002    -112   255   257   263   266
SWAP      04CC     448   486   571 -1225
SWAPEX    04D8    1233 -1240
SWAPLP    04CE   -1229  1239  1836
TABSFND   0343     852  -862
TABSLP2   0336    -849   854
TABSRCH   0332     753   759  -846  1129  1139  1150  1159
TRIGGER   07C8     228  1962  1974 -1980
TRIGR     0020    -118  1929  1982
TRYS      0021    -168   207   230
TXD       0080    -116  1334  1341  1343  1352  1354  1360  1929
TXEN      0040    -117  1332  1363
TYPEOK    07D6    1907 -1994
TYPESTR   07D0     541 -1987
UEC012    01AE     526  -536
UEC3      01A6     527  -532
UEC4      01AA     529  -534
UECC      01B0     531   533   535  -537
UECHK     0194     500   516  -522
UEF2      0179     496  -502
UELB      0129     445  -447
UELEANL   014F     466  -472
UELF      0136     440  -457
UPC       0000    -146   470   536
UPCBFX    01DA     566  -575
UPCDR     01C6     509   519  -565
UPCEANL   0116     432  -438
UPCEB     0190     434  -519
UPCEF     016F     435  -494
VECTOR3   0003    -157   194
VECTOR7   0007    -156
WAIT      07AE     206 -1959
WAITLP2   07B0   -1962  1964  1965
WAITOF    07AE   -1961  1963
WAITON    07B8   -1967  1975
WAITRET   07CA    1971 -1976
ZGRDEX    0089    1054  1057 -1059

                     ***** ERROR LIST *****

LINE  ADDR  ERR

ASSEMBLER ERRORS =     0
```

What we claim:

1. A portable instant reader comprising:

a hand-held reader unit, said hand-held reader unit having a portion thereof defining at least in part an illumination window, a flashable illuminator disposed near said illumination window and means for producing a flash of light therethrough;

said hand-held reader unit having a portion thereof defining at least, in part, a light receiving window for receiving reflections of light emitted through said illumination window;

a photodetector positioned within said hand-held reader in the path of light rays reflected into and through said light receiving window;

a light gathering means positioned between said light receiving window and said photodetector for receiving a light pattern from said light receiving window and focusing the same onto said photodetector;

said light gathering means comprising a lens system with a sensing field in front of said window having a width of at least about fifty millimeters, said photodetector having an image plane for receiving an image of a pattern in said sensing field, and said light gathering means comprising a lens system providing a resolution at the image plane of at least forty line pairs per millimeter with a depth of focus of at least ten millimeters in front of said window.

2. A portable instant reader in accordance with claim 1 with electronic means for reading a light pattern received by the photodetector, for assessing the validity of information represented thereby, and for automatically repeating the actuation of the flashable illuminator in the absence of a valid reading.

3. A portable instant reader according to claim 2, with an optical system comprising said lens system having a reading capability at a distance in front of said window of at least about twenty millimeters, and with an optimum focal plane about six millimeters in front of said window.

4. A portable instant reader comprising:

a hand-held unit having illumination and light receiving window means;

a flash illuminating device positioned behind said window means;

said flash illuminating device and window means being configured to distribute light across a surface containing information being read by said reader, said window means being configured to receive light reflected from the surface;

a photodetector disposed within the reader;

lens means for casting an image of light received through said window means onto said photodetector;

said flash illuminating device comprising elliptical-effect reflector means having a light source at a near focal point thereof, and having a second focal point disposed in front of said window means, such that the elliptical axis for said elliptical-effect reflector means extends obliquely relative to said window means.

5. A portable instant reader according to claim 4 with said elliptical-effect reflector means having its second focal point lying generally in a sensing field region aligned with said lens means.

6. A portable instant reader according to claim 4 with said lens means having an optical axis extending through said window means and through a sensing field region in front of said window means and intersecting said elliptical axis at a substantial distance from said window means.

7. An electroptical pattern recognition reader comprising:

a flashable illuminator;

means for triggering the flashable illuminator;

means for positioning the flashable illuminator in such relation to a pattern so as to illuminate the same and develope a reflected light signal therefrom upon the triggering of said flashable illuminator;

an optoelectronic spatial sensor means;

lens means for producing an image of said pattern from said reflected light signal and focusing the same onto said optoelectronic spatial sensor means;

said lens means providing a resolution of at least about forty line pairs per millimeter for patterns at any depth over a distance of about ten millimeters along the optical axis of the lens means and external to the reader.

8. A reader according to claim 7, with said lens means having effective marginal rays, directed at angles of about plus and minus fifteen degrees to the optical axis.

9. In a portable bar code reader a hand-held bar code reader unit having an elongated relatively narrow hand grip portion for grasping in the hand of a user and having an enlarged reader head portion of greater width than said hand grip portion, said elongated hand grip portion having a length and cross sectional configuration so as to be grasped by the hand with all fingers in gripping relation thereto, said reader head portion having extended window means with a width dimension greater than the width of said hand grip portion which is to be gripped by the fingers of a hand, extended light source means in said reader head portion for producing a sheet of light energy directed outwardly from the reader head portion through said window means over substantially the entire width of said window means so as to flood a bar code sensing region in front of said window means having a width dimension approximately equal to the width of said window means, having a depth dimension equal to at least about ten millimeters and a height dimension equal to at least about one millimeter, such that a bar code pattern in the sensing region will reflect light from said extended light source means along an optical axis directed generally normal to said window means, and lens means for focusing bar code patterns in said sensing region onto an image plane in said reader unit with a resolution of about forty line pairs per millimeter.

10. The method of reading bar code patterns which comprises:

(a) receiving a light image from a sensing region having a width dimension greater than the length of the total bar code pattern and of a substantial height dimension greater than one millimeter, (b) converging the rays of said light image to pass through a narrow non-circular aperture, (c) focusing the light image onto a light receiving region of a photodetector having a resolution sufficient to sense a predetermined bar code, and (d) reading out the individual elements of the light image focused on the photodetector for processing into bar code data.

11. The method of claim 10, where the photodetector has a predetermined operative length dimension in a direction of high resolution along which the focussed light image is to impinge, the converging of the rays of said light image being such as to pass through an aperture having a width dimension substantially not greater than two millimeters, said method further comprising causing the rays of the light image passing through said aperture to diverge as they are focused so as to impinge over substantially the entire operative length dimension of the light receiving region of the photodetector, while blocking from the photodetector all light rays not passing through said aperture.

12. The method of claim 10, said method further comprising directing light rays reflected from a sensing region having a depth of at least about ten millimeters through said aperture, and onto said photodetector with a depth of focus of at least about ten millimeters and a resolution of about forty line pairs per millimeter.

13. The method of claim 10, said method further comprising filtering out a long wavelength region of the spectrum of light energy from the sensing region prior to passage of the light energy through said aperture.

14. The method of claim 12, said method further comprising filtering out a long wavelength region of the spectrum of light energy from the sensing region prior to passage of the light energy through said aperture.

15. In a portable reader according to claim 9, said lens means focusing patterns with said resolution of about forty line pairs per millimeter over a depth range of about ten millimeters in said sensing region, and means comprising said reader unit for reading patterns with marked curvature with said resolution of about forty line pairs per millimeter over said depth range of about ten millimeters.

16. In a portable reader according to claim 9, said reader head portion having a first mirror means spaced from said window means along said optical axis for receiving reflected light from a pattern in the sensing region and for re-reflecting such light along a second optical axis directed generally toward said window means, and having a second mirror means nearer to said window means than said first mirror means, said second mirror means being disposed relative to said second optical axis so as to direct light from the first mirror means along a third optical axis toward said lens means, and said lens means being located more remote from said window means than said second mirror means.

17. In a portable reader according to claim 16, said lens means having stop aperture means providing an aperture for light directed parallel to the third axis with a width dimension in a lateral direction which corresponds with the high resolution direction of a pattern in the sensing region, said width dimension of said aperture being not more than about two millimeters.

18. In a portable reader according to claim 15, said lens means having stop aperture means with an aperture of a width dimension of not more than about two millimeters in a lateral direction corresponding to the high resolution direction of the pattern.

19. In a portable reader according to claim 17, the lens means causing lateral marginal rays of the light energy from the second mirror means which lie in a lateral plane corresponding to the high resolution direction of the pattern to converge in the vicinity of said aperture and thereafter to diverge so as to occupy a laterally extended region at the image plane of the reader unit, said second mirror means having an operative width between the lateral marginal rays generally corresponding to the lateral extent of the image of the pattern at said image plane of the reader unit.

20. In a portable reader according to claim 9, said lens means having stop aperture means with an aperture having a width dimension in a lateral direction which corresponds with the high resolution direction of a pattern in the sensing region, and having a height dimension in a direction at right angles to said lateral direction, and corresponding to a longitudinal direction of an elongated pattern in the sensing region, the ratio of the height dimension of said aperture to said width dimension being at least about two to one.

* * * * *